(12) United States Patent
Murata

(10) Patent No.: US 8,746,820 B2
(45) Date of Patent: Jun. 10, 2014

(54) NAIL PRINT APPARATUS AND PRINT CONTROLLING METHOD

(75) Inventor: Yoshiyuki Murata, Chichibu (JP)

(73) Assignee: Casio Computer Co., Ltd., Tokyo (JP)

( * ) Notice: Subject to any disclaimer, the term of this patent is extended or adjusted under 35 U.S.C. 154(b) by 328 days.

(21) Appl. No.: 13/286,508

(22) Filed: Nov. 1, 2011

(65) Prior Publication Data

US 2012/0113171 A1     May 10, 2012

(30) Foreign Application Priority Data

Nov. 4, 2010 (JP) ................................ 2010-247091
Dec. 28, 2010 (JP) ................................ 2010-291771

(51) Int. Cl.
| | |
|---|---|
| *A45D 29/00* | (2006.01) |
| *B41J 3/00* | (2006.01) |
| *B41J 3/407* | (2006.01) |
| *A45D 34/04* | (2006.01) |

(52) U.S. Cl.
CPC ................ *B41J 3/407* (2013.01); *A45D 34/04* (2013.01); *A45D 2029/005* (2013.01)
USPC ............................................... 347/2; 132/73

(58) Field of Classification Search
USPC ............................................... 347/2; 132/73
See application file for complete search history.

(56) References Cited

U.S. PATENT DOCUMENTS

| | | | |
|---|---|---|---|
| 6,065,969 A | 5/2000 | Rifkin et al. | |
| 6,067,996 A * | 5/2000 | Weber et al. | 132/73 |
| 2012/0103210 A1* | 5/2012 | Hashimoto | 101/35 |

FOREIGN PATENT DOCUMENTS

| | | | |
|---|---|---|---|
| CA | 2329805 A1 | 2/2000 | |
| JP | 2000-301778 A | 10/2000 | |
| JP | 2002-172018 A | 6/2002 | |
| JP | 2003-534083 A | 11/2003 | |
| JP | 2005-185709 A | 7/2005 | |
| WO | WO 00/36949 | * 6/2000 | ............ A45D 29/00 |

OTHER PUBLICATIONS

Japanese Office Action dated Jan. 22, 2013 (and English translation thereof) in counterpart Japanese Application No. 2010-291771.
Japanese Office Action dated Jan. 22, 2013 (and English translation thereof) in counterpart Japanese Application No. 2010-247091.
Chinese Office Action dated Jan. 3, 2014 (and English translation thereof) in counterpart Chinese Application No. 201110345111.2.

* cited by examiner

*Primary Examiner* — Julian Huffman
(74) *Attorney, Agent, or Firm* — Holtz Holtz Goodman & Chick PC

(57) ABSTRACT

Disclosed is a nail print apparatus including: a photographing section which photographs a plurality of fingers and a nail section of each finger to obtain a finger image; a finger type detecting section which detects a type of each finger from the finger image; a first storage controlling section which stores the type of finger detected by the finger type detecting section corresponded with the nail image; a design specifying section which receives specification of a design image to be printed; a second storage controlling section which stores the design image specified on the design specifying section; a combined nail image generating section which combines the design image with the nail image for each type of finger to generate a combined nail image; and a print controlling section which controls printing of the combined nail image on the nail chip sheet.

4 Claims, 37 Drawing Sheets

FIG. 6

| FINGER TYPE (521A) | FINGER NUMBER (521B) | CHARACTER (JAPANESE HIRAGANA/ JAPANESE KATAKANA / CHINESE CHARACTER/ SYMBOL) (521C) ||||||| PICTURE, ETC. (521D) |||
|---|---|---|---|---|---|---|---|---|---|---|---|
| THUMB | 1 | あ | い | う | ... | ア | イ | ... | D1 | D2 | ... Dn |
| INDEX FINGER | 2 | あ | い | う | ... | ア | イ | ... | D1 | D2 | ... Dn |
| MIDDLE FINGER | 3 | あ | い | う | ... | ア | イ | ... | D1 | D2 | ... Dn |
| RING FINGER | 4 | あ | い | う | ... | ア | イ | ... | D1 | D2 | ... Dn |
| LITTLE FINGER | 5 | あ | い | う | ... | ア | イ | ... | D1 | D2 | ... Dn |
| THUMB | 1 | | | — | | | | | | D1 HEART | |
| INDEX FINGER | 2 | | | — | | | | | | D2 FACE | |
| MIDDLE FINGER | 3 | | | — | | | | | | D3 SUN | |
| RING FINGER | 4 | | | — | | | | | | D4 MOON | |
| LITTLE FINGER | 5 | | | — | | | | | | D1 HEART | |

Rows 1–5: 521a
Rows 6–10: 521b
Whole table: 521
ROM: 52

FIG. 7

| | FINGER TYPE | FINGER NUMBER | CHARACTER (JAPANESE HIRAGANA/ JAPANESE KATAKANA / CHINESE CHARACTER/ SYMBOL) | PICTURE ETC. | NAIL AREA IMAGE | COMBINED NAIL IMAGE | COORDINATES | CORRESPONDING DIAGRAM |
|---|---|---|---|---|---|---|---|---|
| | | | RAM | | | | | |
| 531a | THUMB | 1 | ド | — | G1 | T1 | X1, Y1 | FIG. 26 |
| | INDEX FINGER | 2 | レ | — | G2 | T2 | X1, Y2 | |
| | MIDDLE FINGER | 3 | ミ | — | G3 | T3 | X1, Y3 | |
| | RING FINGER | 4 | ファ | — | G4 | T4 | X1, Y4 | |
| | LITTLE FINGER | 5 | ソ | — | G5 | T5 | X1, Y5 | |
| 531b | THUMB | 1 | — | D1 HEART | G1 | T1 | X1, Y1 | FIG. 27 |
| | INDEX FINGER | 2 | — | D2 FACE | G2 | T2 | X1, Y2 | |
| | MIDDLE FINGER | 3 | — | D3 SUN | G3 | T3 | X1, Y3 | |
| | RING FINGER | 4 | — | D4 MOON | G4 | T4 | X1, Y4 | |
| | LITTLE FINGER | 5 | — | D1 HEART | G5 | T5 | X1, Y5 | |
| 531c | THUMB | 1 | ド/ファ/シ | — | G1 | T1 | X1, Y1 | |
| | INDEX FINGER | 2 | レ/ソ/ド | — | G2 | T2 | X1, Y2 | |
| | MIDDLE FINGER | 3 | ミ/ラ | — | G3 | T3 | X1, Y3 | |
| | RING FINGER | 4 | — | — | G4 | T4 | X1, Y4 | |
| | LITTLE FINGER | 5 | — | — | G5 | T5 | X1, Y5 | |
| 531d | THUMB | 1 | — | RED | G1 | T1 | X1, Y1 | |
| | INDEX FINGER | 2 | — | BLUE | G2 | T2 | X1, Y2 | |
| | MIDDLE FINGER | 3 | — | YELLOW | G3 | T3 | X1, Y3 | |
| | RING FINGER | 4 | — | PURPLE | G4 | T4 | X1, Y4 | |
| | LITTLE FINGER | 5 | — | BROWN | G5 | T5 | X1, Y5 | |

| | | FINGER NUMBER | FINGERTIP OF OTHER PERSON | | FINGERTIP OF ONESELF | | NAIL IMAGE OF OTHER PERSON AFTER ADJUSTMENT (ADJUSTED NAIL IMAGE) | COMBINED NAIL IMAGE |
|---|---|---|---|---|---|---|---|---|
| | FINGER TYPE | | NAIL IMAGE | OUTLINE | NAIL IMAGE | OUTLINE | | |
| OTHER PERSON a | THUMB | 1 | Ga1 | Ra1 | G1 | R1 | Ia1 (ADJUST Ga1) | Ia1+R1 |
| | INDEX FINGER | 2 | Ga2 | Ra2 | G2 | R2 | Ia2 (ADJUST Ga2) | Ia2+R2 |
| | MIDDLE FINGER | 3 | Ga3 | Ra3 | G3 | R3 | Ia3 (ADJUST Ga3) | Ia3+R3 |
| | RING FINGER | 4 | Ga4 | Ra4 | G4 | R4 | Ia4 (ADJUST Ga4) | Ia4+R4 |
| | LITTLE FINGER | 5 | Ga5 | Ra5 | G5 | R5 | Ia5 (ADJUST Ga5) | Ia5+R5 |
| OTHER PERSON b | THUMB | 1 | Gb1 | Rb1 | G1 | R1 | Ib1 (ADJUST Gb1) | Ib1+R1 |
| | INDEX FINGER | 2 | Gb2 | Rb2 | G2 | R2 | Ib2 (ADJUST Gb2) | Ib2+R2 |
| | MIDDLE FINGER | 3 | Gb3 | Rb3 | G3 | R3 | Ib3 (ADJUST Gb3) | Ib3+R3 |
| | RING FINGER | 4 | Gb4 | Rb4 | G4 | R4 | Ib4 (ADJUST Gb4) | Ib4+R4 |
| | LITTLE FINGER | 5 | Gb5 | Rb5 | G5 | R5 | Ib5 (ADJUST Gb5) | Ib5+R5 |
| OTHER PERSON c | THUMB | 1 | Gc1 | Rc1 | G1 | R1 | Ic1 (ADJUST Gc1) | Ic1+R1 |
| | INDEX FINGER | 2 | Gc2 | Rc2 | G2 | R2 | Ic2 (ADJUST Gc2) | Ic2+R2 |
| | MIDDLE FINGER | 3 | Gc3 | Rc3 | G3 | R3 | Ic3 (ADJUST Gc3) | Ic3+R3 |
| | RING FINGER | 4 | Gc4 | Rc4 | G4 | R4 | Ic4 (ADJUST Gc4) | Ic4+R4 |
| | LITTLE FINGER | 5 | Gc5 | Rc5 | G5 | R5 | Ic5 (ADJUST Gc5) | Ic5+R5 |
| OTHER PERSON d | THUMB | 1 | Gd1 | Rd1 | G1 | R1 | Id1 (ADJUST Gd1) | Id1+R1 |
| | INDEX FINGER | 2 | Gd2 | Rd2 | G2 | R2 | Id2 (ADJUST Gd2) | Id2+R2 |
| | MIDDLE FINGER | 3 | Gd3 | Rd3 | G3 | R3 | Id3 (ADJUST Gd3) | Id3+R3 |
| | RING FINGER | 4 | Gd4 | Rd4 | G4 | R4 | Id4 (ADJUST Gd4) | Id4+R4 |
| | LITTLE FINGER | 5 | Gd5 | Rd5 | G5 | R5 | Id5 (ADJUST Gd5) | Id5+R5 |

OTHER PERSON

ONESELF

ONESELF

NAIL PRINT APPARATUS AND PRINT CONTROLLING METHOD

BACKGROUND OF THE INVENTION

1. Field of the Invention

The present invention relates to a nail print apparatus and a print controlling method.

2. Description of the Related Art

Conventionally, there is known a nail print apparatus in order to print a design image such as character or picture on a finger nail of a person as described in Japanese Unexamined Patent Application Publication (Translation of PCT Application) No. 2003-534083.

A nail print apparatus is an apparatus which photographs a nail on which printing is performed with a photographing section to detect a nail area which is to be a print target and a design image selected by a user is printed using a print head, etc. of an ink jet method on the detected nail area.

By using such apparatus, nail print can be easily enjoyed without going to a nail salon, etc.

However, there is a problem that, as in conventional nail print apparatuses where printing is performed by spraying ink directly on an upper surface of a nail of a person, the user needs to wait with the finger fixed without movement during the print operation, and this is a heavy burden on the user.

Moreover, when printing is performed using a print head of an ink jet method, there is a possibility that ink mist spreads around the nail, and there is a possibility that the ink attaches to the finger and the finger becomes dirty when printing is performed.

Further, when printing is performed directly on the nail, when the user desires to change the printed design image to a different design image, the user needs to erase the printed image using a nail polish remover, etc. and this is troublesome. Therefore, there is a problem that the user cannot easily change nail print according to the user's fashion or mood to enjoy different styles.

In a conventional nail print apparatus, the printable nail design can be selected from a range set in advance in the apparatus, and it is difficult for the user (hereinafter referred to as "self" or "oneself") to choose the design freely.

Even if the user can set the nail design freely, process such as the user making the desired design is necessary, and this is troublesome for the user.

There is a desire of the user to apply a nail design of other person such as celebrities, friends, etc. with nail section on which excellent nail design is applied on their own nail section. However, even if a user has a desire to copy the nail design of other person, in order to set the nail design of other person to reproduce the design on the user's nail section, the user needs to perform complicated operation of switches, etc. Therefore, there is a problem that nail design cannot be easily enjoyed without performing complicated operation.

SUMMARY OF THE INVENTION

The present invention has been made in consideration of the above situation, and one of the main objects is to provide a nail print apparatus and a print control method in which a print substance such as ink is not directly applied to the nail of the user so that the burden of the user is reduced and the user can enjoy nail print easily.

Another one of the main objects of the present invention is to provide a nail print apparatus and a print control method in which a nail design applied on a nail section of other person (for example, celebrities, friends, etc.) can be printed on the nail section of the user or a nail chip sheet by an easy method.

In order to achieve any one of the above advantages, according to an aspect of the present invention, there is provided a nail print apparatus including:

a photographing section which photographs a plurality of fingers and a nail section of each finger to obtain a finger image including a nail image of the nail section of the plurality of fingers;

a finger type detecting section which detects a type of each finger from the finger image of the plurality of fingers photographed by the photographing section;

a first storage controlling section which stores the type of finger detected by the finger type detecting section corresponded with the nail image of the nail section photographed by the photographing section;

a design specifying section which receives specification of a design image to be printed;

a second storage controlling section which stores the design image specified on the design specifying section;

a combined nail image generating section which combines the design image stored by control of the second storage controlling section with the nail image for each type of finger stored by control of the first storage controlling section to generate a combined nail image; and a print controlling section which controls printing of the combined nail image combined by the combined nail image generating section on the nail chip sheet.

According to an aspect of the present invention, there is provided a nail print apparatus including:

a first image obtaining section which obtains a finger image including a nail image of a plurality of nail sections of a first person;

a second image obtaining section which obtains a finger image including a nail image of a plurality of nail sections of a second person;

a finger type detecting section which detects a type of each finger from the finger image of the plurality of fingers of the first person obtained by the first image obtaining section and the finger image of the plurality of fingers of the second person obtained by the second image obtaining section;

a storage controlling section which stores the type of finger detected by the finger type detecting section corresponded with the nail image of the nail section obtained by the first image obtaining section and the second image obtaining section for each of the first person and the second person;

an adjusted nail image generating section which adjusts the nail image of the first person stored by the control of the storage controlling section to match the nail image of the corresponding finger of the second person to generate an adjusted nail image; and a print controlling section which controls printing of the adjusted nail image generated by the adjusted nail image generating section on the nail section of the corresponding finger of the second person.

According to the present invention, the user can easily make a nail chip with an outline form which fits the outline form of a nail section of the user without troubling the user. With this, the burden of the user such as the finger becoming dirty by the ink or the print substance when nail print is performed, or waiting without moving the finger while print operation is performed can be omitted. Moreover, nail print can be enjoyed by simply attaching a nail chip on which the design is printed on the user's nail section. Consequently, by changing and attaching a different nail chip, the user can easily change the nail print according to the user's fashion or mood, and the user can enjoy different styles.

According to the present invention, a nail design applied on a nail section of other person (for example, celebrities, friends, etc.) can be printed on the user's nail section or a nail chip sheet as is with a simple method without troubling the user. Therefore, the user can easily copy the excellent nail design of other person and enjoy different styles.

BRIEF DESCRIPTION OF THE DRAWINGS

The present invention and the above-described objects, features and advantages thereof will become more fully understood from the following detailed description with the accompanying drawings and wherein;

FIG. 6 is a memory configuration diagram showing a ROM;

FIG. 7 is a memory configuration diagram showing a RAM;

FIG. 30 is a diagram of a memory configuration of a RAM in the nail print apparatus of a second embodiment of the present invention;

DETAILED DESCRIPTION OF THE PREFERRED EMBODIMENTS

Preferred embodiments for carrying out the present embodiment are described in detail with reference to the attached drawings. However, the scope of the invention is not limited to the embodiments and the illustrated examples.

First Embodiment

First, the first embodiment of a nail print apparatus of the present invention is described with reference to FIG. 1 to FIG. 29.

Figure 1:
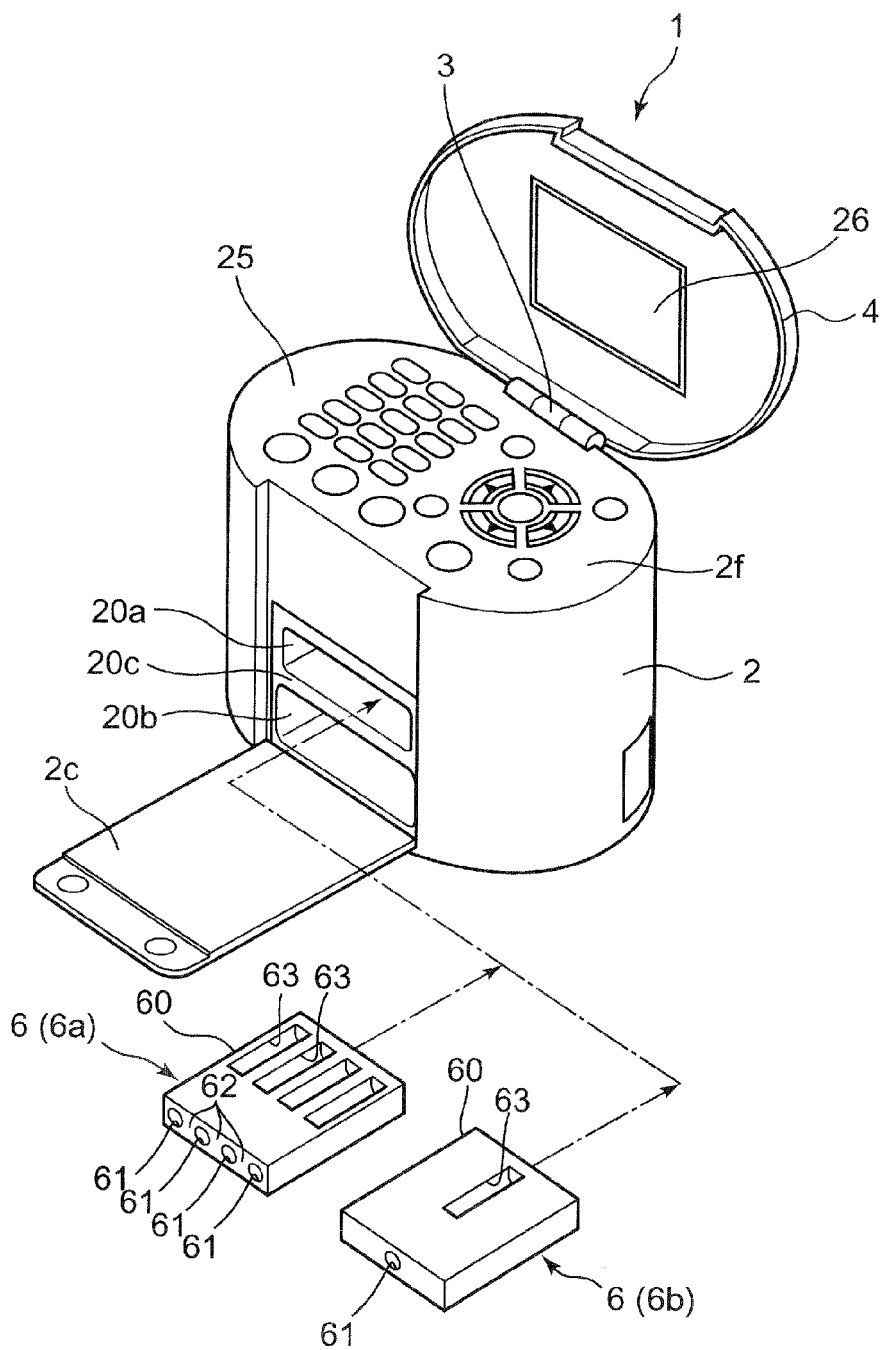
FIG. 1 is a conceptual perspective view of a first embodiment of a nail print apparatus of the present invention in a state where a cover is open.
Figure 2:
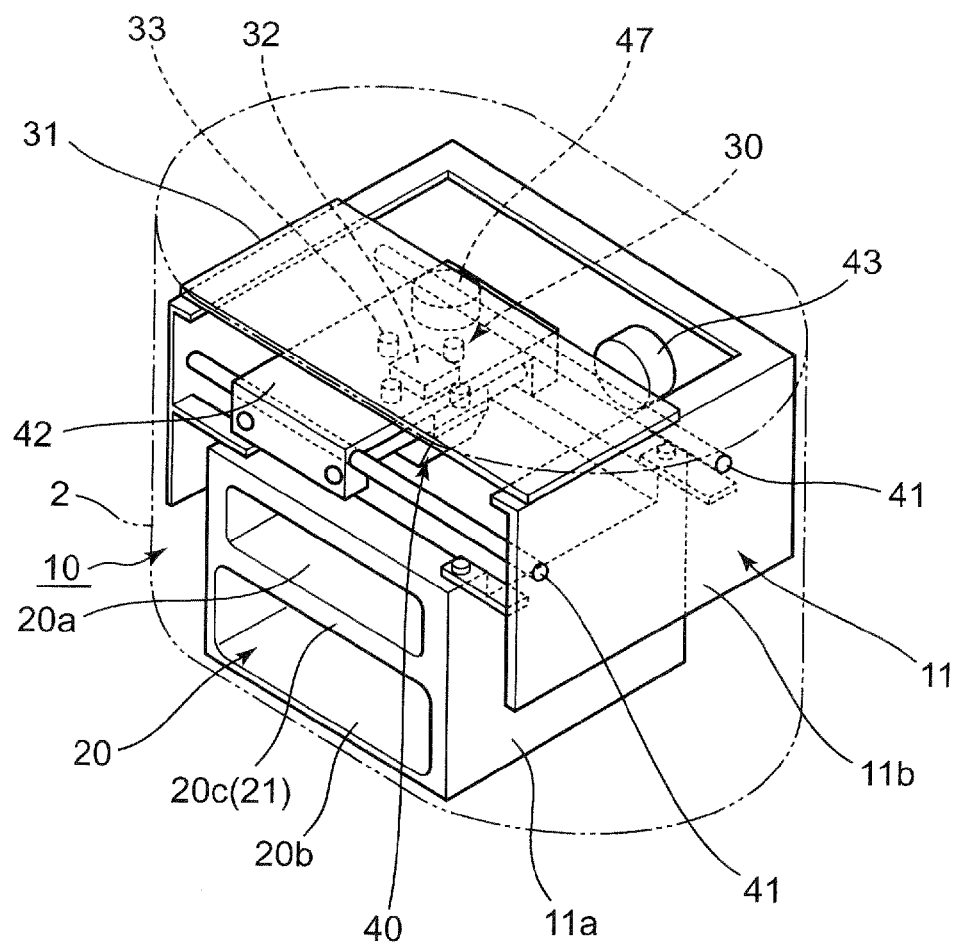
FIG. 2 is a conceptual perspective view of an apparatus main body of the nail print apparatus shown in FIG. 1.

FIG. 1 is a perspective view showing an outside appearance of a nail print apparatus of the present embodiment and FIG. 2 is a perspective view showing an inner configuration of the nail print apparatus.

The nail print apparatus 1 of the present embodiment is an apparatus which can generate a nail chip 70 (see FIG. 25, etc.) which can be attached to a nail section of a finger. As shown in FIG. 1, the nail print apparatus 1 includes, for example, a case main body 2, a cover 4, a print apparatus main body 10 including, for example, a first finger inserting section 20a which is a finger inserting section in which a finger (target finger U1) corresponding to a nail which is a target of collection of information necessary to generate the nail chip 70 is inserted, a finger holding member 6 configured so as to be able to be inserted in and removed from the first finger inserting section 20a, and the like.

A case main body 2 and a cover 4 are connected to each other through a hinge 3 provided in a rear edge section of the upper surface of the case main body 2.

The case main body 2 is formed in an oval shape from a planar view. An opening/closing plate 2c is provided so as to be able to fold up and down on a front side of the case main body 2. The opening/closing plate 2c is connected to the case main body 2 through a hinge (not shown) provided in a lower edge section of the front face of the case main body 2. The opening/closing plate 2c is for opening and closing the front face of the case main body 2. The nail print apparatus 1 is used with the front face of the case main body 2 in an open state. A later described operation section 25 is provided on a top panel 2f of the case main body 2. A display section 26 is provided on an inner face of the cover 4.

As shown in FIG. 2, the print apparatus main body 10 of the nail print apparatus 1 is stored in the case main body 2. The print apparatus main body 10 includes, a print finger fixing section 20 composing a print finger fixing section, a photographing section 30 composing a photographing section, a printing section 40 composing a printing section, a controlling device 50 composing a controlling section (see FIG. 5), an operation section 25 and a display section 26. Among the above, the print finger fixing section 20, the photographing section 30, the printing section 40 and the controlling device 50 are provided in a device casing 11.

The device casing 11 is composed of a lower device casing 11a and an upper device casing 11b. The lower device casing 11a is formed in a box shape and is provided at the bottom of the inside of the case main body 2. The upper device casing 11b is provided above the lower device casing 11a and at the top of the inside of the case main body 2.

The print finger fixing section 20 is provided in the lower device casing 11a of the device casing 11. The print finger fixing section 20 is composed of the first finger inserting section 20a, a second finger inserting section 20b and a grabbing section 20c provided in the lower device casing 11a.

The first finger inserting section 20a is a finger inserting section to insert a finger (hereinafter referred to as "target finger U1", see FIG. 17, etc.) corresponding to a nail T which is to be a target of collection of information necessary to generate the nail chip 70 (see FIG. 25) attached to the nail section of the finger. In the present embodiment, the target finger U1 is inserted in the first finger inserting section 20a in a state held by a later described finger holding member 6. Below, regarding nail T, the thumb nail is to be T1, the index finger nail is to be T2, the middle finger nail is to be T3, the ring finger nail is to be T4, and the little finger nail is to be T5 (see FIG. 26, etc.). However, when simply referred to as "nail T", this collectively refers to the above nail T. Regarding the target finger U1, the thumb is to be U1-1, the index finger is to be U1-2, the middle finger is to be U1-3, the ring finger is to be U1-4, and the little finger is to be U1-5 (see FIG. 26, etc.) However, when simply referred to as "target finger U1", this collectively refers to the above target finger U1.

The second finger inserting section 20b is a finger inserting section for inserting a non-target finger U2 other than the target finger U1.

Figure 17:
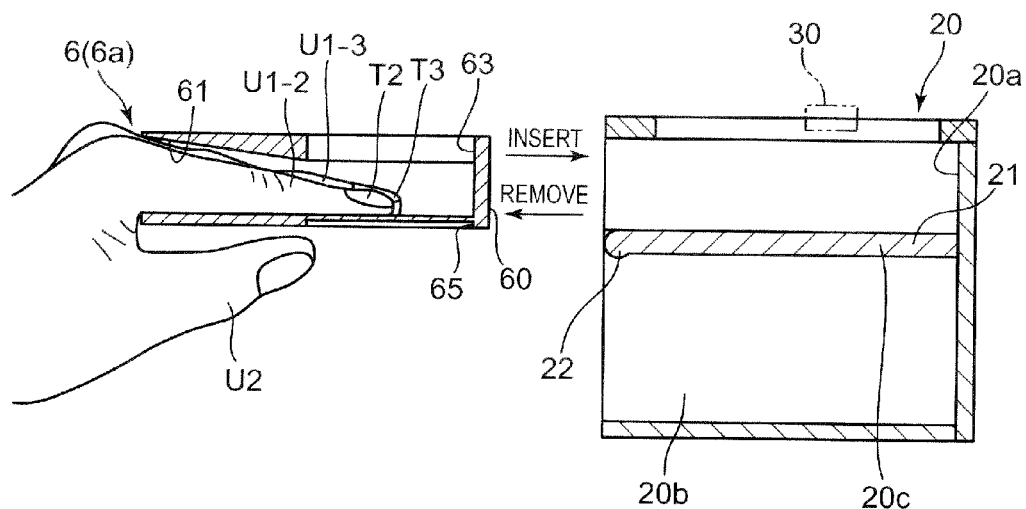
FIG. 17 is a side sectional view showing a print finger fixing section of the nail print apparatus of FIG. 1 and a finger holding member for four fingers inserted in a first finger inserting section.
Figure 18:
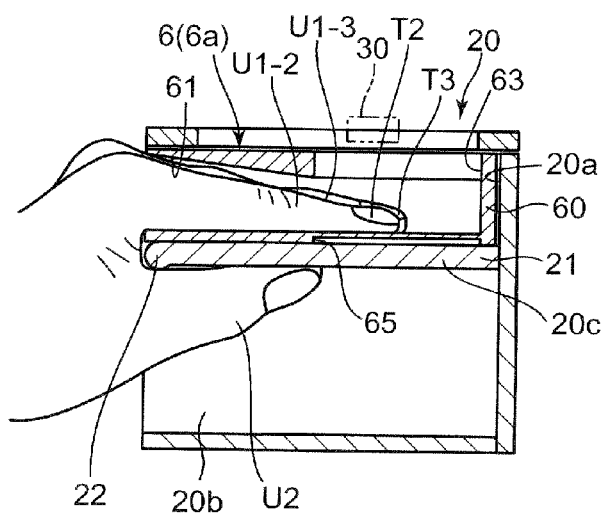
FIG. 18 is a side sectional view showing a state of the finger holding member for four fingers inserted in the first finger inserting section of the print finger fixing section of the nail print apparatus of FIG. 1.
Figure 19:
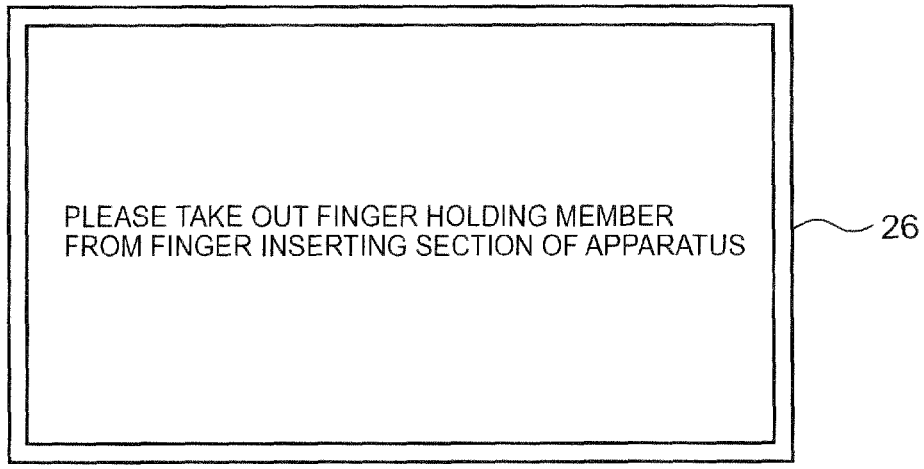
FIG. 19 is a diagram showing an example of a holding member removing instruction screen on the display section.
Figure 20:
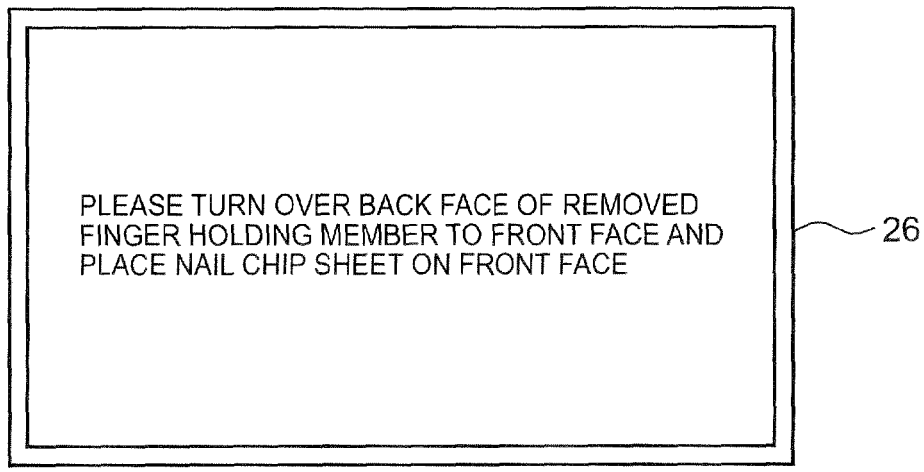
FIG. 20 is a diagram showing an example of a sheet placing instruction screen on the display section.
Figure 21:
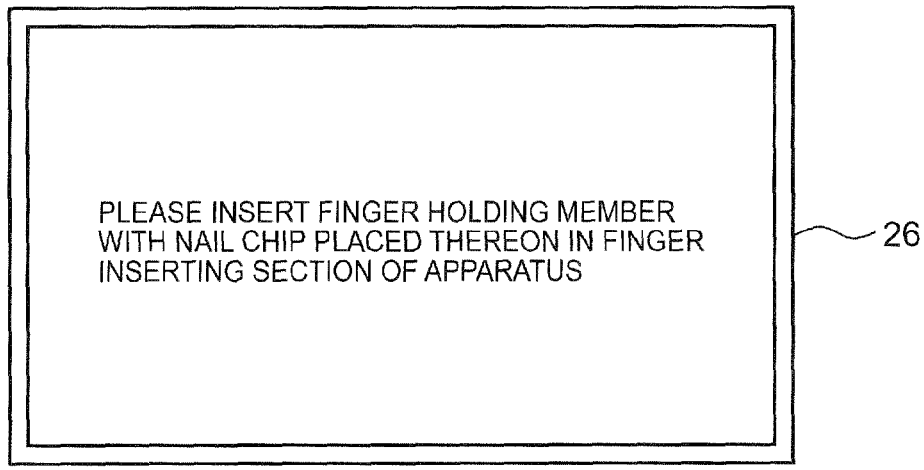
FIG. 21 is a diagram showing an example of a holding member reinserting instruction screen on the display section.

The grabbing section 20c is a portion which can be pinched with the target finger U1 inserted in the first finger inserting section 20a and the non-target finger U2 inserted in the second finger inserting section 20b (see FIG. 17 to FIG. 18). The grabbing section 20c is composed of a partition wall 21 dividing the first finger inserting section 20a and the second finger inserting section 20b.

The second finger inserting section 20b and the grabbing section 20c do not have to be provided. However, by providing the above, the finger holding member 6 inserted in the first finger inserting section 20a and the target finger U1 held by the finger holding member 6 become stable, and the above sections are very effective for fixing the target finger U1.

The upper surface of the partition wall 21 composes a flat finger holding member placing face. The finger holding member placing face is for placing the finger holding member 6 inserted in the first finger inserting section 20a. When the second finger inserting section 20b and the grabbing section 20c are not provided, the finger holding member placing face is composed of a floor face of the first finger inserting section 20a.

A bulging section 22 is formed at an edge section on the finger holding member inserting side of the partition wall 21 (see FIG. 17 to FIG. 18). The bulging section 22 is formed in a portion where the base of target finger U1 and the non-target finger U2 touch when the finger holding member 6 is deeply inserted in the first finger inserting section 20a and the non-target finger U2 is deeply inserted in the second finger inserting section 20b. The bulging section 22 is wrapped by the base of the target finger U1 and the non-target U2 when the partition wall 21 (grabbing section 20c) is pinched by the target finger U1 and non-target finger U2. Here, "wrap" means the base of the target finger U1 and the non-target finger U2 is in contact with the bulging section 22 and can grab the bulging section 22. By wrapping the bulging section 22, the wrist swinging right and left and the wrist swinging up and down can be suppressed and the hand can be stabilized.

As shown in FIG. 17 to FIG. 18, when the bulging section 22 is seen from a cross section along an inserting direction of the finger holding member 6 (a side view), the bulging section 22 is a circle bulging downward from the bottom face of the partition wall 21. The shape of the bulging section 22 is not limited to a circle cross section and can be a non-circle shape such as an oval cross section, a polygon shape cross section, etc. In short, the shape can be any shape which can be wrapped by the base of the target finger U1 and the non-target finger U2.

The size of the bulging section 22, in other words, the thickness of the thickness direction of the partition wall 21 is preferably about 1 to 2 cm so that the base of the target finger U1 and the non-target finger U2 are in enough contact with the bulging section 22, the thickness of the partition wall 21 is preferably about 0.5 to 1 cm smaller than the thickness of the bulging section 22 so that the ball of the finger is securely pressured to the partition wall 21.

Next, the photographing section 30 is described. As shown from FIG. 2 to FIG. 4, the photographing section 30 is provided in the upper device casing 11b of the device casing 11.

In other words, a camera 32 including a pixel of about two million pixels or more and a driver is provided on the bottom face of a center section of a substrate 31 provided in the upper device casing 11b. An illuminating lamp 33 of a white color LED, etc. is provided so as to surround the camera 32 on the substrate 31.

The photographing section 30 is composed including the camera 32 and the illuminating lamp 33. The photographing section 30 is a photographing section which illuminates the target finger U1 with the illuminating lamp 33 and photographs the target finger U1 with the camera 32 to photograph a finger image including a nail image of a nail section of a finger which is information necessary for generating the nail chip 70 and to import the image data. The photographing section 30 is connected to a later described controlling section 51 of the controlling device 50 and is controlled by the controlling section 51.

Figure 3:
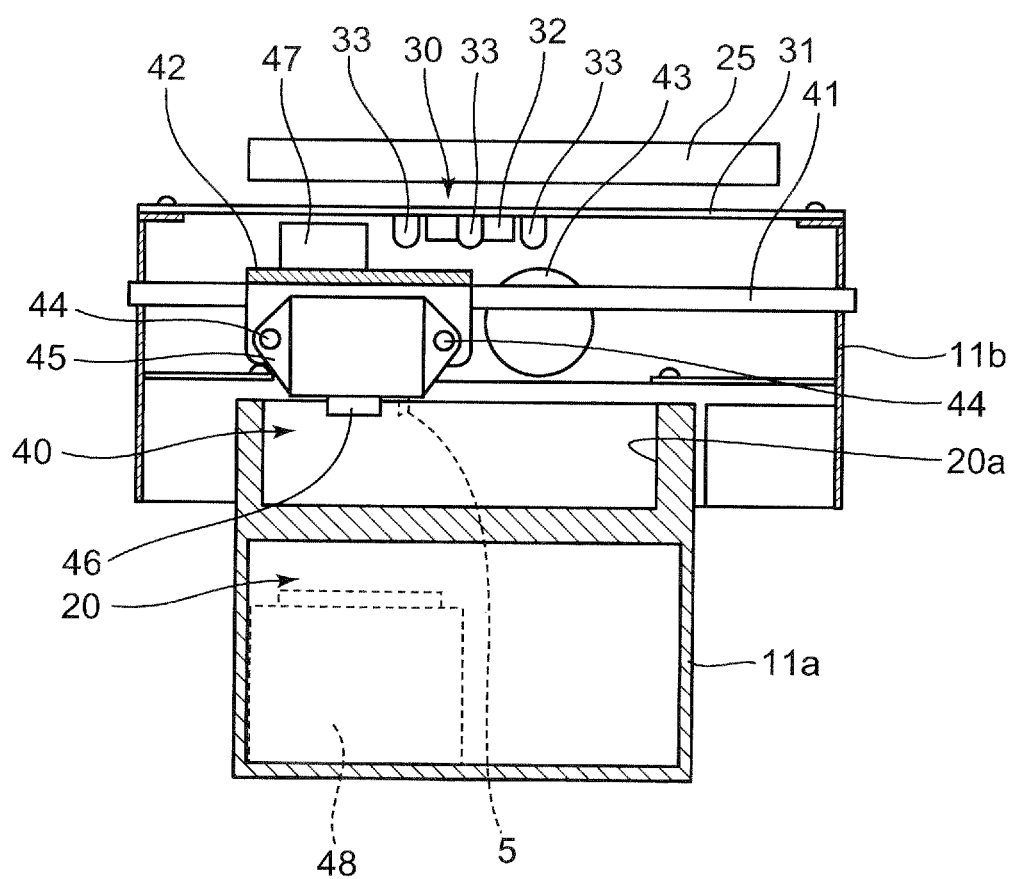
FIG. 3 is a cross sectional view of the apparatus main body shown in FIG. 2 seen from a front side.
Figure 4:
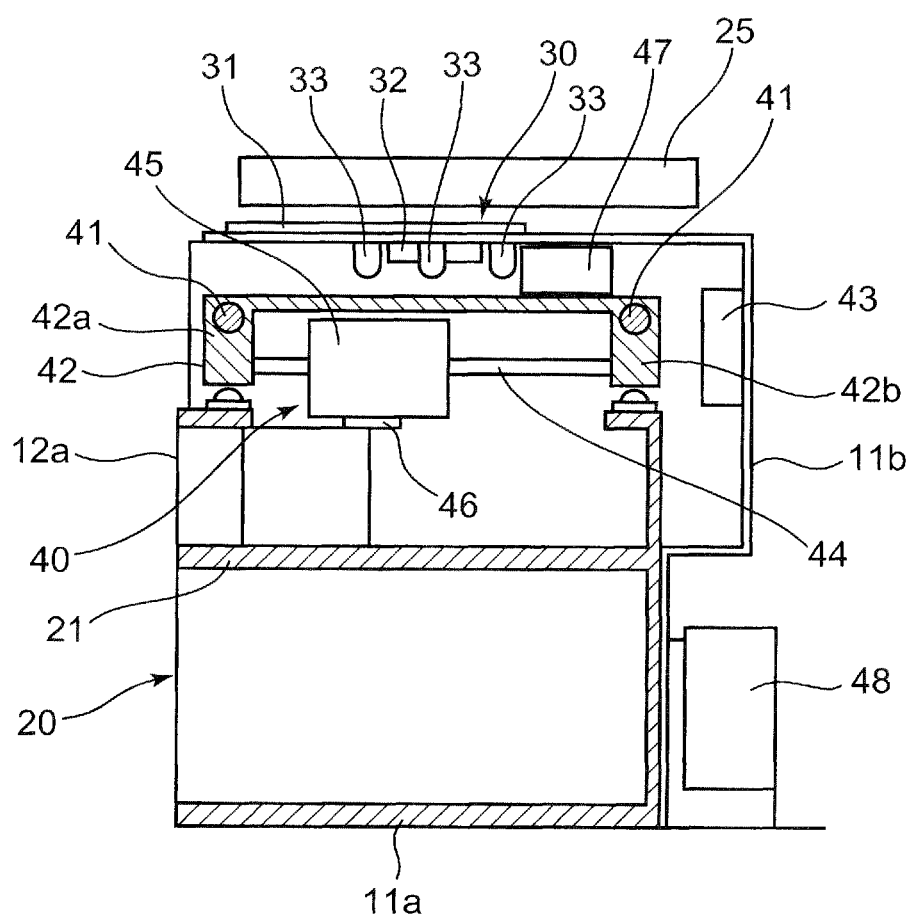
FIG. 4 is a cross sectional view of the apparatus main body shown in FIG. 2 seen from the right side.

The printing section 40 is a printing section for printing on a nail chip sheet 7 (see FIG. 9B) for generating a nail chip 70 based on the nail image photographed by the photographing section 30 and as shown from FIG. 2 to FIG. 4, the printing section 40 is provided in the device casing 11 (mainly the upper device casing 11b).

In other words, two guide rods 41 are provided parallel on both side plates of the upper device casing 11b. A main carriage 42 is provided on the guide rod 41 so as to be able to slide. Two guide rods 44 are provided parallel on the front wall 42a and the rear wall 42b of the main carriage 42. A sub-carriage 45 is provided on the guide rod 44 so as to be able to slide. A print head 46 is mounted to a center section of the bottom face of the sub-carriage 45.

In the present embodiment, the print head 46 is a print head of an ink jet method which performs printing by making fine drops with ink and spraying the ink directly on the medium to be printed. The recording method of the print head 46 is not limited to the ink jet method and other various types of print methods such as heat sensitive printing method can be employed.

The main carriage 42 is connected to a motor 43 through a power transmitting section (not shown) and the main carriage 42 moves in the left and right direction along the guide rod 41 by a positive rotation and a negative rotation of the motor 43. The sub-carriage 45 is connected to a motor 47 through a power transmitting section (not shown) and the sub-carriage 45 moves in the front and back direction along the guide rod 44 by a positive rotation and a negative rotation of the motor 47. With the movement of the main carriage 42 and the sub-carriage 45 and the ejection of ink from the print head 46, printing on the nail chip sheet 7 placed on a sheet positioning section 65 (see FIG. 9A, etc.) of the finger holding member 6 is possible.

An ink cartridge 48 to supply ink to the print head 46 is provided in the lower device casing 11a. The ink cartridge 48 is connected to a print head 46 through an ink supplying pipe which is not shown and ink is suitably supplied to the print head 46. A configuration where the ink cartridge is mounted to the print head 46 itself is possible.

The printing section 40 includes the above guide rod 41, the main carriage 42, the motor 43, the guide rod 44, the sub-carriage 45, the print head 46, the motor 47, the ink cartridge 48, etc. The motor 43, the print head 46 and the motor 47 of the printing section 40 are connected to the later described controlling section 51 of the controlling device 50 and controlled by the controlling section 51.

The operation section 25 is an input section for the user to perform various input operations. The operation section 25 is provided on the top panel 2f of the case main body 2. The operation section 25 of the present embodiment is provided with a power source key 25a, a camera key 25b, a printing key 25c, a stop key 25d, a character input key 25e, a selection key 25f, a cursor key 25g, an enter key 25h, etc.

Here, the character input key 25e, the selection key 25f and the cursor key 25g are keys used for selecting the design to be printed, etc. The enter key 25h is a key used for confirming the deign selected by the character input key 25e, selection key 25f and the cursor key 25g. The power source key 25a is a key for turning the power source of the nail print apparatus 1 ON and OFF. The camera key 25b is a key which is to be a trigger to start photographing by the photographing section 30. The printing key 25c is a key which is to be a trigger to start the printing processing. The stop key 25d is a key used to stop the printing processing.

In the present embodiment, the design specifying section to specify the design image to be printed is composed of the operation section 25 and the later described design setting section 511.

The display section 26 is composed of, for example a liquid crystal panel (LCD: liquid crystal display) and is a display section for performing various display when the printing processing is performed, etc. The display section 26 is not limited to a liquid crystal panel.

A touch panel may be composed as one with the surface of the display section 26. In this case, various input can be performed by touching the surface of the display section 26 with a stylus pen (not shown), fingertip, etc. and the display section 26 includes the functions similar to the operation section 25.

In the present embodiment, the display section 26 displays, for example, a design mode selection screen (see FIG. 13) which prompts to a user selection of a design mode, a design selection screen (see FIG. 14) which prompts to a user selection of design when an arbitrary design mode is selected, a design confirmation screen which displays a design combined image in which the selected design is overlapped on the user's finger and which prompts confirmation to the user, and other various instructions screens (FIG. 15, FIG. 16, FIG. 19 to FIG. 21).

Figure 13:
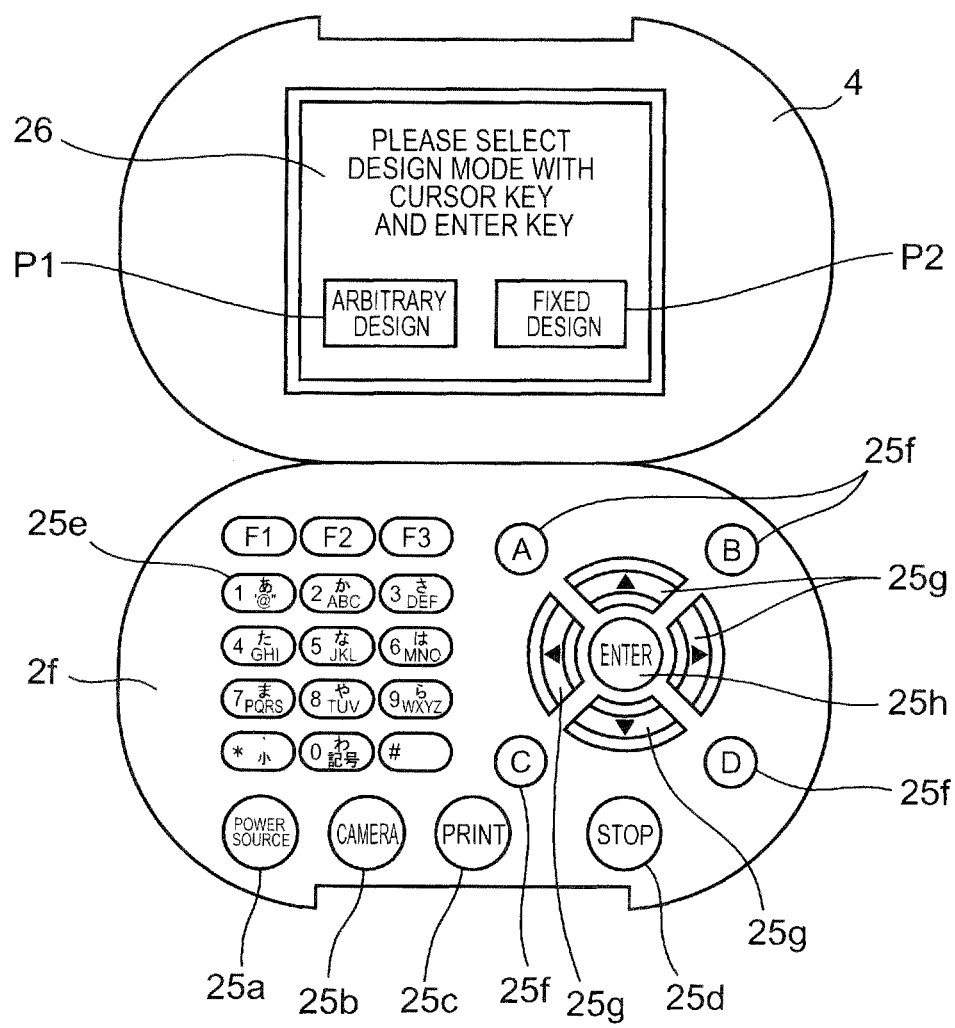
FIG. 13 is a diagram showing an example of an operation section and a design mode selection screen on a display section.
Figure 14:
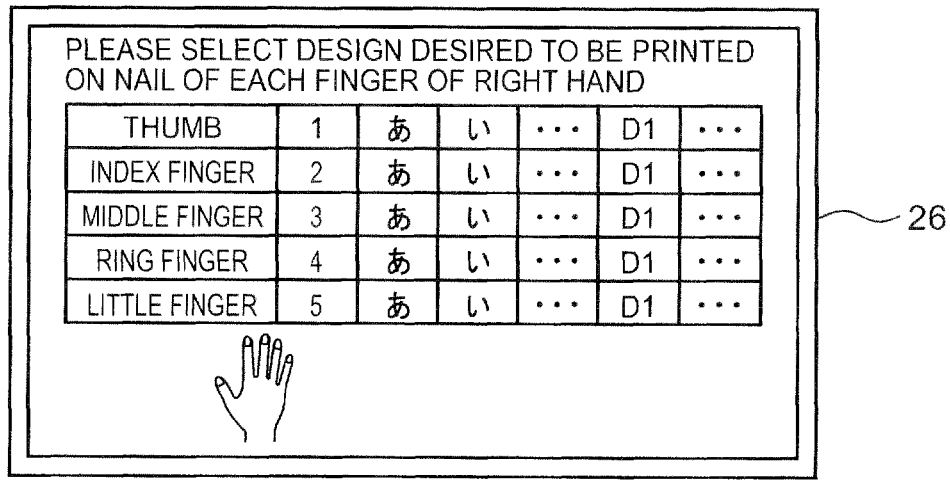
FIG. 14 is a diagram showing an example of the operation section and the design selection screen on the display section.

As shown in FIG. 13, the design mode selection screen of the present embodiment displays an arbitrary design mode key P1 for selecting an arbitrary design mode in which the user can select a design arbitrarily and a fixed design mode key P2 for selecting a fixed design mode in which a previously set fixed design is assigned to each finger. The user selects either one of the arbitrary design mode key P1 or the fixed design mode key P2 and the arbitrary design mode or the fixed design mode can be selected. When the arbitrary design mode is selected, the user can select a desired design for each finger from the previously prepared plurality of designs.

Figure 5:
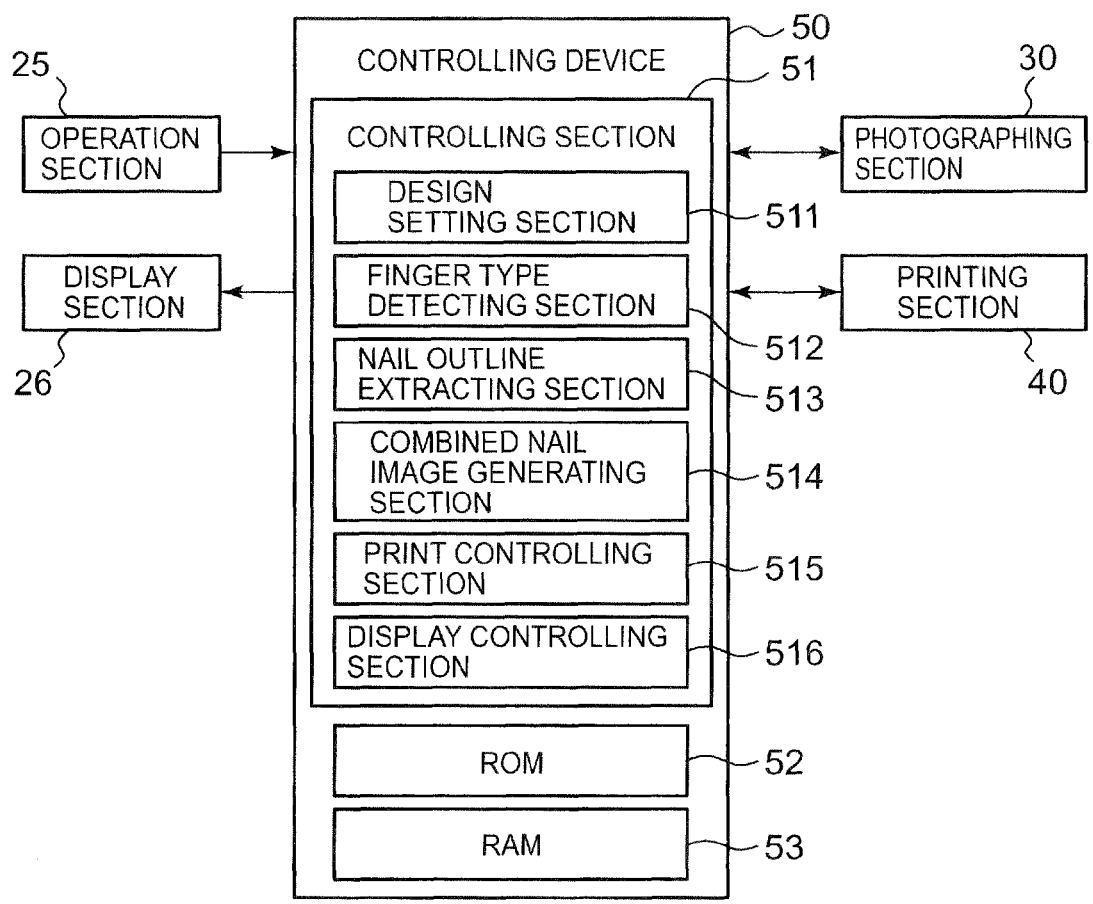
FIG. 5 is a block diagram showing the nail print apparatus shown in FIG. 1.

The controlling device 50 is provided in the upper device casing 11b. The controlling device 50 is provided on the substrate 31 and as shown in FIG. 5, the controlling device 50 is a computer including a controlling section 51 composed of a CPU (Central Processing Unit), etc. which is not shown, a ROM (Read Only Memory) 52 and a RAM (Random Access Memory) 53 as a storage section, and the like. The storage section is not limited to a ROM 52 and a RAM 53 in the controlling device 50, and other storage sections can be provided.

The controlling section 51 functionally includes, a design setting section 511, a finger type detecting section 512, a nail outline extracting section 513, a combined nail image generating section 514, a print controlling section 515, a display controlling section 516 and the like. The functions as the design setting section 511, the finger type detecting section 512, the nail outline extracting section 513, the combined nail image generating section 514, the print controlling section 515, the display controlling section 516, etc. are realized in conjunction with programs stored in the CPU and the ROM 52.

The design setting section 511 assigns and sets a design which is composed of one of a character, picture, etc. (including nail image) or a combination of the above (hereinafter referred to as simply "design") to be printed on the nail chip 70 for each finger. The design setting section 511 composes a design setting section for specifying a design image to be printed together with the above described operation section 25, etc.

The design setting section 511 also functions as a second storage controlling section which stores the design image set by the design specifying section in the storage section such as the RAM 53, etc.

The finger type detecting section 512 is a finger type detecting section which detects a type of each finger from a finger image of a plurality of fingers photographed by the photographing section 30. The finger type detecting section 512 detects the finger type of each finger image based on the position, length, width, etc. of the finger image. The detecting method of the finger type is not limited to the example illustrated here.

The finger type detecting section 512 also functions as a first storage controlling section which stores in the storage section such as the RAM 53, etc. the finger type detected based on the finger image corresponded with the nail image of the nail section photographed by the photographing section 30 for each nail.

The nail outline extracting section 513 is a nail outline extracting section which extracts an outline of the nail section from the nail image of the nail section included in the finger image photographed by the photographing section 30. The nail outline extracting section 513 is not a necessary component of the present invention, and a configuration in which the nail outline extracting section 513 is not provided and a processing is performed without extracting the outline of the nail section can be composed.

The combined nail image generating section 514 is a combined nail image generating section which combines the design image stored in the storage section such as the RAM 53, etc. by the control of the design setting section 511 as the second storage controlling section with the nail image for each type of finger stored in the storage section such as the RAM 53, etc. by the control of the finger type detecting section 512 as the first storage controlling section to generate a combined nail image. In the present embodiment, the nail outline extracting section 513 extracts the outline of the nail section from the nail image and the combined nail image generating section 514 combines the outline of the nail section extracted by the nail outline extracting section 513 with the design image to generate the combined nail image.

The print controlling section 515 is a print controlling section which generates print data by positioning the combined nail image for each finger generated by the combined nail image generating section 514 so that there is a certain degree of space between the combined nail image of each finger when printed on the nail chip sheet 7, outputs the print data to the printing section 40 and controls the print operation of the printing section 40.

Figure 24:
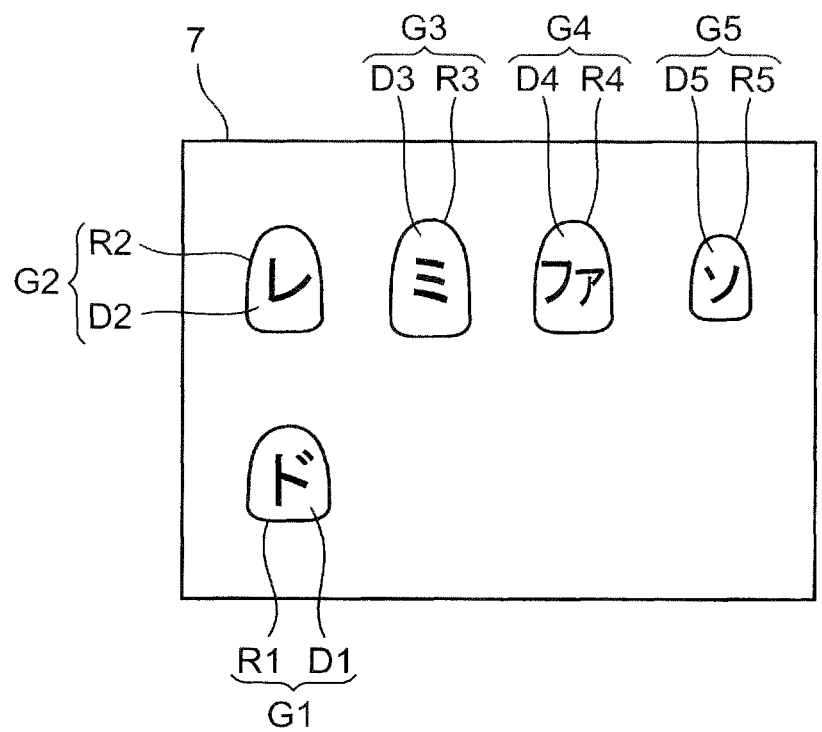
FIG. 24 is a diagram showing a nail chip sheet on which combined nail images for five fingers is printed.

In the present embodiment, the print controlling section 515 adjusts the position of the combined nail image of each finger so that five fingers from the thumb to the little finger of one hand can be printed on one nail chip sheet 7 and generates the print data (see FIG. 24).

The number of fingers of the combined nail images positioned on one nail chip sheet can be set in advance or can be set arbitrarily by the user according to the status of use. For example, the print data can be generated so that only the combined nail images of four fingers excluding the thumb are positioned on one nail chip sheet 7 or the print data can be generated so that the combined nail images of ten fingers are provided on one nail chip sheet after the combined nail images are generated for all ten fingers of both hands.

The display controlling section 516 is a display controlling section which displays various display on the display section 26 as the display section. In the present embodiment, the display controlling section 516 displays on the display section 26 the design mode selection screen, the design selection screen, the design confirmation screen, various instruction screens, and the like as described above.

The ROM 52 as a storage section which stores various programs such as a finger type detecting program for detecting type of each finger from the finger image, a nail outline extracting program for extracting the outline of the nail section, a combined nail image generating program for combining a design image with a nail image (in the present embodiment, an image of a line showing an outline of the nail section) to generate the combined nail image, a print data generating program for generating print data, a printing processing program for performing printing processing, etc. The above programs are executed by the controlling device 50 to centrally control each section of the nail print apparatus 1.

In the present embodiment, the ROM 52 stores data corresponding to the design image printable on the nail chip 70 attached to the nail section. FIG. 6 is a diagram conceptually showing an example of a storage area 521 of the ROM 52.

For example, as shown in FIG. 6, the storage area 521 of the ROM 52 includes, a finger type area 521A, a finger number area 521B, a character area 521C printable on each finger, and picture, etc. area 521D and data of finger type, finger number, character and picture etc. are stored in each area respectively. The data of the finger type and the finger number correspond to each other one piece to one piece. Here, for the right hand, the thumb is set to finger number 1, the index finger is set to finger number 2, the middle finger is set to finger number 3, the ring finger is set to finger number 4, and the little finger is set to finger number 5. Although not illustrated here, for the left hand, for example, the thumb is set to finger number 6, the index finger is set to finger number 7, the middle finger is set to finger number 8, the ring finger is set to finger number 9 and the little finger is set to finger number 10.

An upper field 521*a* shown in FIG. 6 shows data of an arbitrary design for each finger. In the present embodiment, in the nail print apparatus 1, the arbitrary design mode and the fixed design mode can be selected as a design mode (see FIG. 13), and the data of arbitrary design for each finger is data of an arbitrary design image selectable when the arbitrary design mode is selected as the design mode by the user. As data of arbitrary design for each finger, here, data of various characters and pictures are prepared for each finger. Specifically, as data of various characters, data of Japanese Hiragana-type characters, Japanese Katakana-type characters, Chinese characters, symbols are prepared, and as data of various pictures, data of nail images of D1 to Dn corresponding to various pictures, etc. is prepared.

The lower field 521*b* of the same diagram shows data of a fixed design for each finger. The data of a fixed design for each finger is data of a design image assigned to each finger when the fixed design mode is selected as the design mode by the user. As the fixed design for each finger, here, data of pictures, etc. of D1 to D4 are prepared. Specifically, data of D1 (heart) for the thumb of the finger number 1, data of D2 (face) for the index finger of the finger number 2, data of D3 (sun) for the middle finger of the finger number 3, data of D4 (moon) for the ring finger of the finger number 4 and data of D1 (heart) for the little finger of the finger number 5 are prepared in a state corresponded in advance.

The selection of design mode is not a necessary component of the present invention, and for example, a configuration of including either one of the arbitrary design mode or fixed design mode is possible. In this case, the data necessary for each configuration is prepared in the storage area 521 of the ROM 52.

Moreover, the RAM 53 which is a storage section of the present embodiment includes a storage area 531 which stores various data, etc. and a work area (not shown) to expand a program, etc. when various processing is performed by the controlling section 51. The storage area 532 of RAM 53 stores, for example, finger type data detected by the finger type detecting section 512 regarding the plurality of fingers from which the finger image is obtained by the photographing section 30 corresponded with the nail image of the nail section of each finger. The RAM 53 stores data of the design image specified by the design specifying section as to be printed on the nail chip 70 attached to each finger corresponded with information, etc. of finger type.

FIG. 7 is a diagram conceptually showing an example of a storage area 531 of the RAM 53. As shown in FIG. 7, the design data to be printed is selected from the printable design data previously stored in the storage area 521 of the ROM 52 and stored in the storage area 531 of the RAM 53 based on information input from the operation section 25.

As shown in FIG. 7, the storage area 531 of the RAM 53 stores finger type, finger number, character, picture etc., nail area image, combined nail image and coordinates corresponded to each other. First field 531*a*, second field 531*b*, third field 531*c* and fourth field 531*d* of the storage area 531 of the RAM 53 include design information selected in the past.

For example, the first field 531*a* and the second field 531*b* shown in FIG. 7 are described below.

Figure 25:
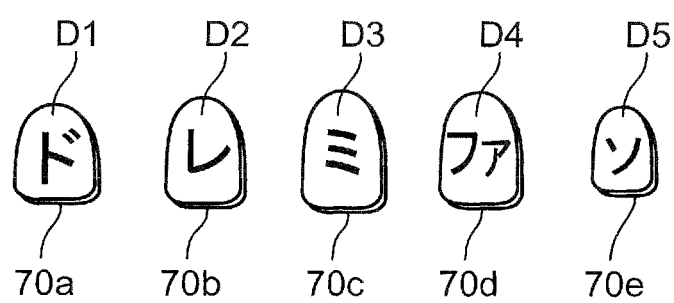
FIG. 25 is a diagram showing a nail chip for five fingers separated from the nail chip sheet shown in FIG. 24.

The first field 531*a* shown in FIG. 7 shows an example in which data of "do" is stored for the thumb of the finger number 1 (in FIG. 24-FIG. 25, data of design image D1), data of "re" is stored for the index finger of the finger number 2 (in FIG. 24-FIG. 25, data of design image D2), data of "mi" is stored for the middle finger of the finger number 3 (in FIG. 24-FIG. 25, data of design image D3), data of "fa" is stored for the ring finger of the finger number 4 (in FIG. 24-FIG. 25, data of design image D4), and data of "so" is stored for the little finger of the finger number 5 (in FIG. 24-FIG. 25, data of design image D5).

The second field 531*b* shown in FIG. 7 shows an example in which data of D1 (heart) is stored for the thumb of the finger number 1, data of D2 (face) is stored for the index finger of the finger number 2, data of D3 (sun) is stored for the middle finger of the finger number 3, data of D4 (moon) is stored for the ring finger of the finger number 4 and data of D1 (heart) is stored for the little finger of the finger number 5.

The storage area 531 of the RAM 53 can store not only design data selected from design data stored in the storage area 531 of the ROM 53, but also new design data added later by the user.

Next, the finger holding member 6 of the present embodiment is described with reference to FIG. 1 and FIG. 8A to FIG. 8D.

As shown in FIG. 1, in the present embodiment, the finger holding member 6*a* for four fingers which holds the four fingers from the index finger to the little finger (U1-2 to U1-5) as target finger U1 and finger holding member 6*b* for thumb which holds the thumb (U1-1) as the target finger U1 can be selectively inserted in the first finger inserting section 20*a*. Hereinafter, when simply finger holding member 6 is referred, this includes the finger holding member 6*a* for four fingers and the finger holding member 6*b* for thumb.

Figure 8A:
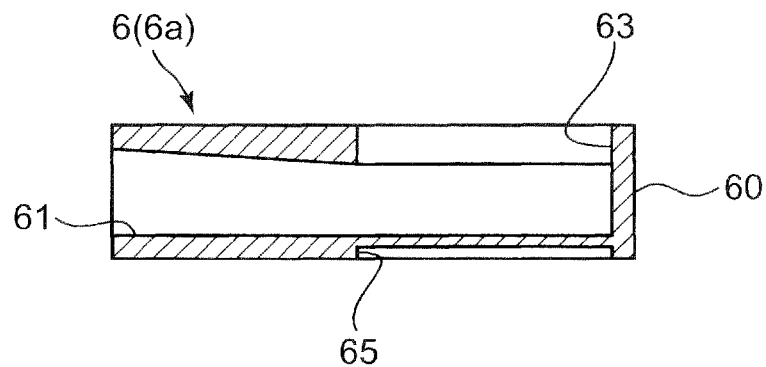
FIG. 8A is a side sectional view of a finger holding member for four fingers.
Figure 8B:
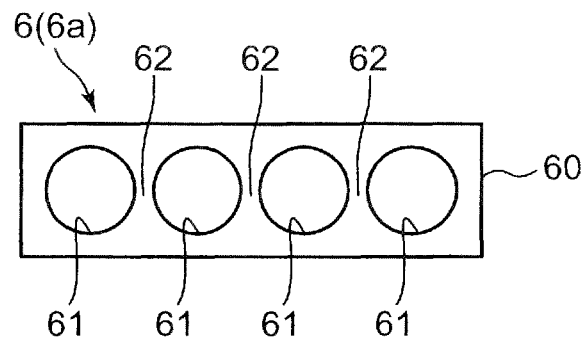
FIG. 8B is a front view of a finger holding member for four fingers.
Figure 8C:
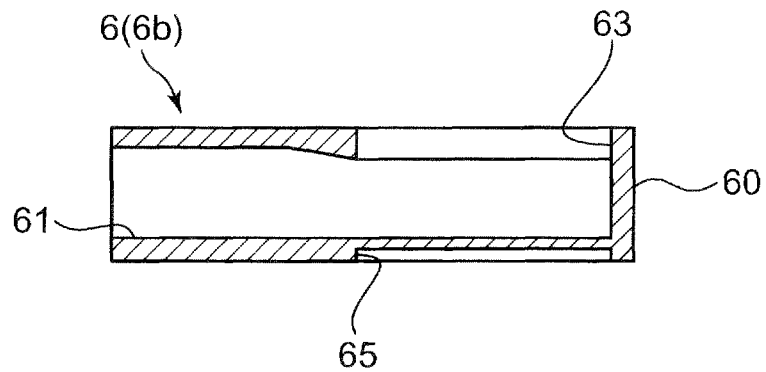
FIG. 8C is a side sectional view of a finger holding member for thumb.
Figure 8D:
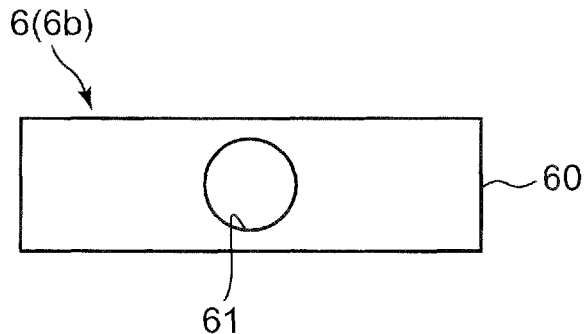
FIG. 8D is a front view of a finger holding member for thumb.

FIG. 8A is a side sectional view of the finger holding member 6*a* for four fingers, and FIG. 8B is a front view of the finger holding member 6*a* for four fingers seen from the inserting direction of the finger. FIG. 8C is a side sectional view of the finger holding member 6*b* for thumb, and FIG. 8D is a front view of the finger holding member 6*b* for thumb seen from the inserting direction of the finger.

As shown in FIG. 1, FIG. 8A and FIG. 8B, the finger holding member 6*a* for four fingers includes a holding member main body 60 which can hold four fingers and the holding member main body 60 is provided with four finger inserting holes 61 as a finger holding section which opens to the front of the finger inserting side of the finger holding member 6*a* for four fingers. The inside upper surface of the finger inserting hole 61 is inclined upward from substantially the center section to the opening side in the finger inserting direction. The shape and configuration of the finger inserting hole 61 is not limited to the illustrated example. However, since the thickness of the finger becomes thicker from the fingertip toward the base, it is preferable to form an inclination in the inside upper surface of the finger inserting hole 61 as shown in the illustrated sample so that it is possible to insert the target finger U1 deep into the finger inserting hole 61 smoothly. Instead of forming an inclination in the inside upper surface of the finger inserting hole 61, a step can be provided in the inside upper surface of the finger inserting hole 61 so that the thickness in the vertical direction is thicker in the opening side than the far side in the finger inserting direction.

A finger dividing section 62 is provided between each finger inserting hole 61 and when the four target fingers U1 (index finger U1-2 to little finger U1-5) are inserted in each finger inserting hole 61, an appropriate space is open between each target finer U1. The thickness of the finger dividing section 62 is not limited. However, when the target finger U1 are too close to each other, it is difficult to understand the outline of the nail section of each target finger U1. Therefore, it is preferable that an appropriate space is kept between the target fingers U1 by the finger dividing section 62 as shown in the present embodiment.

On the front face (face which is the upper side (upper side shown in FIG. 8A and FIG. 8B) when the target finger U1 is inserted) side and the far side in the finger inserting direction of the finger holding member 6*a* for four fingers, in a position corresponding to each finger inserting hole 61, a nail section exposing hole 63 is formed to expose the nail section of each target finger U1 (index finger to little finger) inserted in each finger inserting hole 61.

On the back face (face which is the lower side (lower side shown in FIG. 8A and FIG. 8B) when the target finger U1 is inserted) side and the far side in the finger inserting direction of the finger holding member 6*a* for four fingers, a later described sheet positioning section 65 is formed to place the nail chip sheet 7. The sheet positioning section 65 is a cut out section with a depth substantially the same as the thickness of the nail chip sheet 7 used in the nail print apparatus 1 of the present embodiment. The dimension of the length and the width of the sheet positioning section 65 is the same or somewhat larger than the dimension of the length and the width of the nail chip sheet 7.

As shown in FIG. 1, FIG. 8C and FIG. 8D, the finger holding member 6*b* for thumb includes a holding member main body 60 which can hold the thumb and the holding member main body 60 is provided with finger inserting hole 61 as a finger holding section which opens to the front of the finger inserting side of the finger holding member 6*b* for thumb. The inside upper surface of the finger inserting hole 61 is provided with a step so that the thickness in the vertical direction is thicker in the opening side than the far side in the finger inserting direction. The shape and configuration of the finger inserting hole 61 is not limited to the illustrated example. However, since the thickness of the finger becomes thicker from the fingertip toward the base, it is preferable to form a step in the inside upper surface of the finger inserting hole 61 so that the thickness in the vertical direction is thicker in the opening side as shown in the illustrated sample so that it is possible to insert the target finger U1 (thumb U1-1) deep into the finger inserting hole 61 smoothly. Similar to the finger inserting hole 61 of the finger holding member 6*a* for four fingers, the inside upper surface of the finger inserting hole 61 can be inclined upward from substantially the center section to the opening side in the finger inserting direction.

On the front face (face which is the upper side (upper side shown in FIG. 8C and FIG. 8D) when the target finger U1 is inserted) side and the far side in the finger inserting direction of the finger holding member 6*b* for thumb, in a position corresponding to the finger inserting hole 61, a nail section exposing hole 63 is formed to expose the nail section of the target finger U1 (thumb) inserted in the finger inserting hole 61.

On the back face (face which is the lower side (lower side shown in FIG. 8C and FIG. 8D) when the target finger U1 is inserted) side and the far side in the finger inserting direction of the finger holding member 6*b* for thumb, a later described sheet positioning section 65 is formed to place the nail chip sheet 7. The sheet positioning section 65 is similar to the sheet positioning section 65 provided in the finger holding member 6*a* for four fingers, and therefore the description is omitted.

Figure 9A:
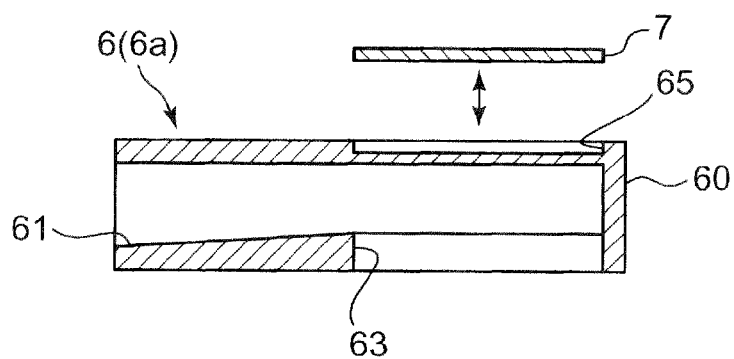
FIG. 9A is a side sectional view of the finger holding member for four fingers in a state turned over.

FIG. 9A is a diagram showing the front and the back of the finger holding member 6*a* for four fingers turned over, and the nail chip sheet 7 placed in the sheet positioning section 65 provided on the back face side of the finger holding member 6*a* for four fingers. As shown in FIG. 9A, when the nail chip sheet 7 is placed on the sheet positioning section 65, the face on the sheet positioning section 65 side of the finger holding member 6*a* for four fingers becomes substantially flat.

Figure 9B:
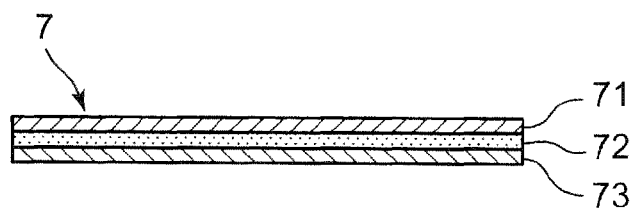
FIG. 9B is a cross sectional view of a nail chip sheet of the present embodiment.

FIG. 9B is a cross sectional view showing the configuration of the nail chip sheet 7 used in the present embodiment. As shown in FIG. 9B, the nail chip sheet 7 is a sheet on a film and is composed by a printed layer 71 on which ink is ejected and printing is performed, an adhesive layer 72 and a peeling layer 73 overlapped in order.

Figure 9C:
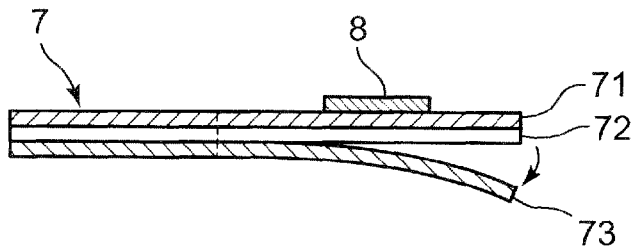
FIG. 9C is a cross sectional view showing a state of peeling a peeling layer after printing on the nail chip sheet.
Figure 9D:
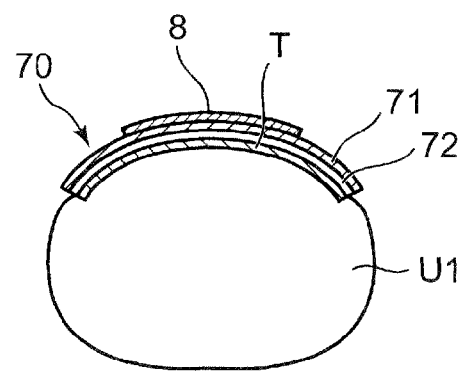
FIG. 9D is a cross sectional view showing a state of a separated nail chip attached on a finger nail.

As shown in FIG. 9C, when the ink is ejected on the nail chip sheet 7, the nail printing layer 8 is formed on the printed layer 71. After printing, the user cuts the nail chip sheet 7 along the line showing the outline of the nail section printed on the nail chip sheet 7 and this becomes the nail chip 70 in a sticker form in a shape to fit the corresponding finger nail T (in FIG. 25, etc. nail chip 70*a* for thumb, nail chip 70*b* for index finger, nail chip 70*c* for middle finger, nail chip 70*d* for ring finger and nail chip 70*e* for little finger). After the user cuts, for example the portion indicated by a dotted line shown in FIG. 9C and forms the nail chip 70 for each nail T, the user peels off the peeling layer 73 of each nail chip 70 to expose the adhesive layer 72, and the user attaches the nail chip 70 on the corresponding nail T. FIG. 9D shows a state where the nail chip 70 is attached on the finger nail T.

Next, the flow of printing processing of the nail print apparatus 1 is described with reference to the flowchart shown in FIG. 10 to FIG. 12 and FIG. 13 to FIG. 27.

Figure 10:
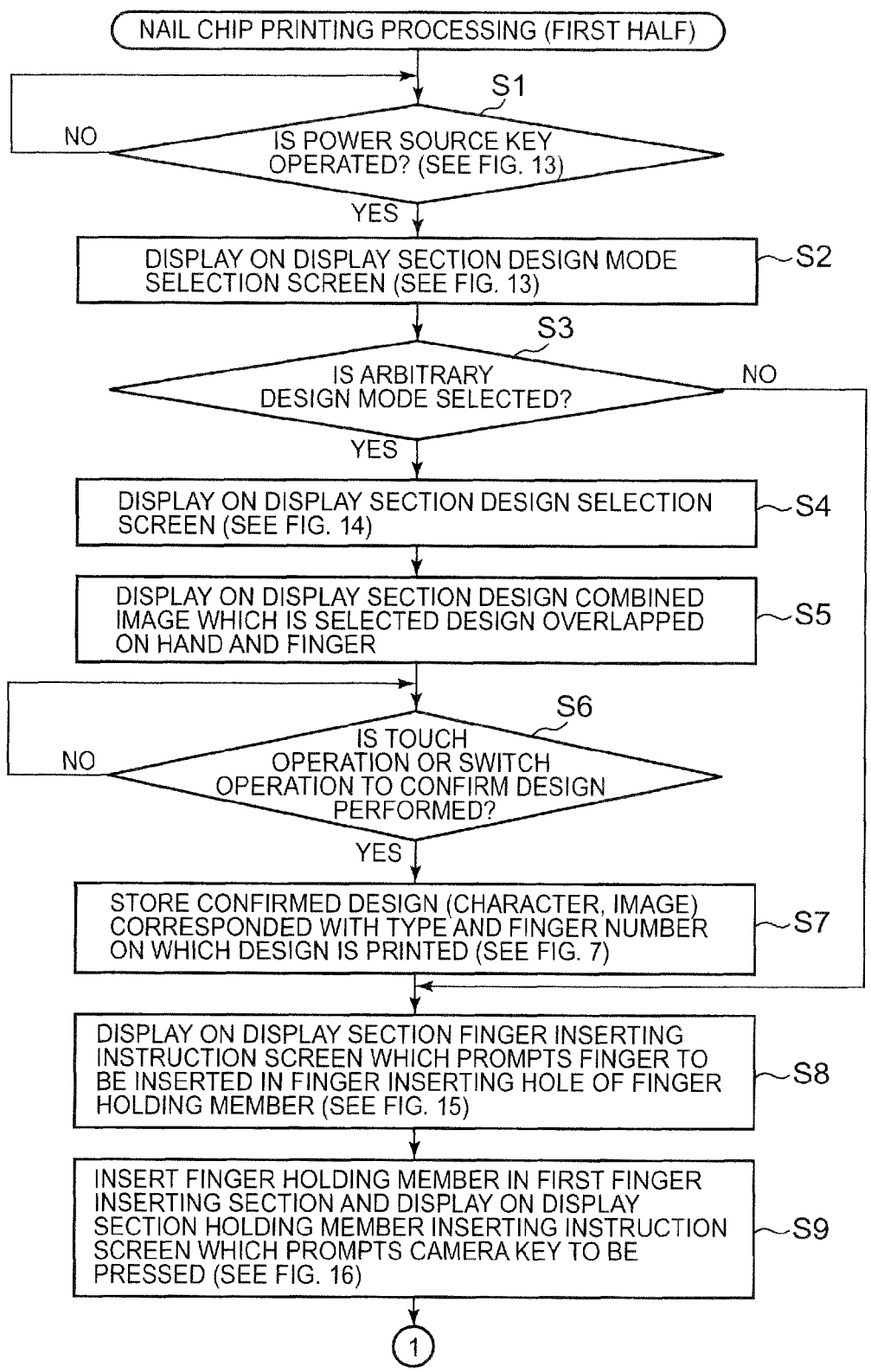
FIG. 10 is a flowchart of a first half of a nail printing processing.
Figure 11:
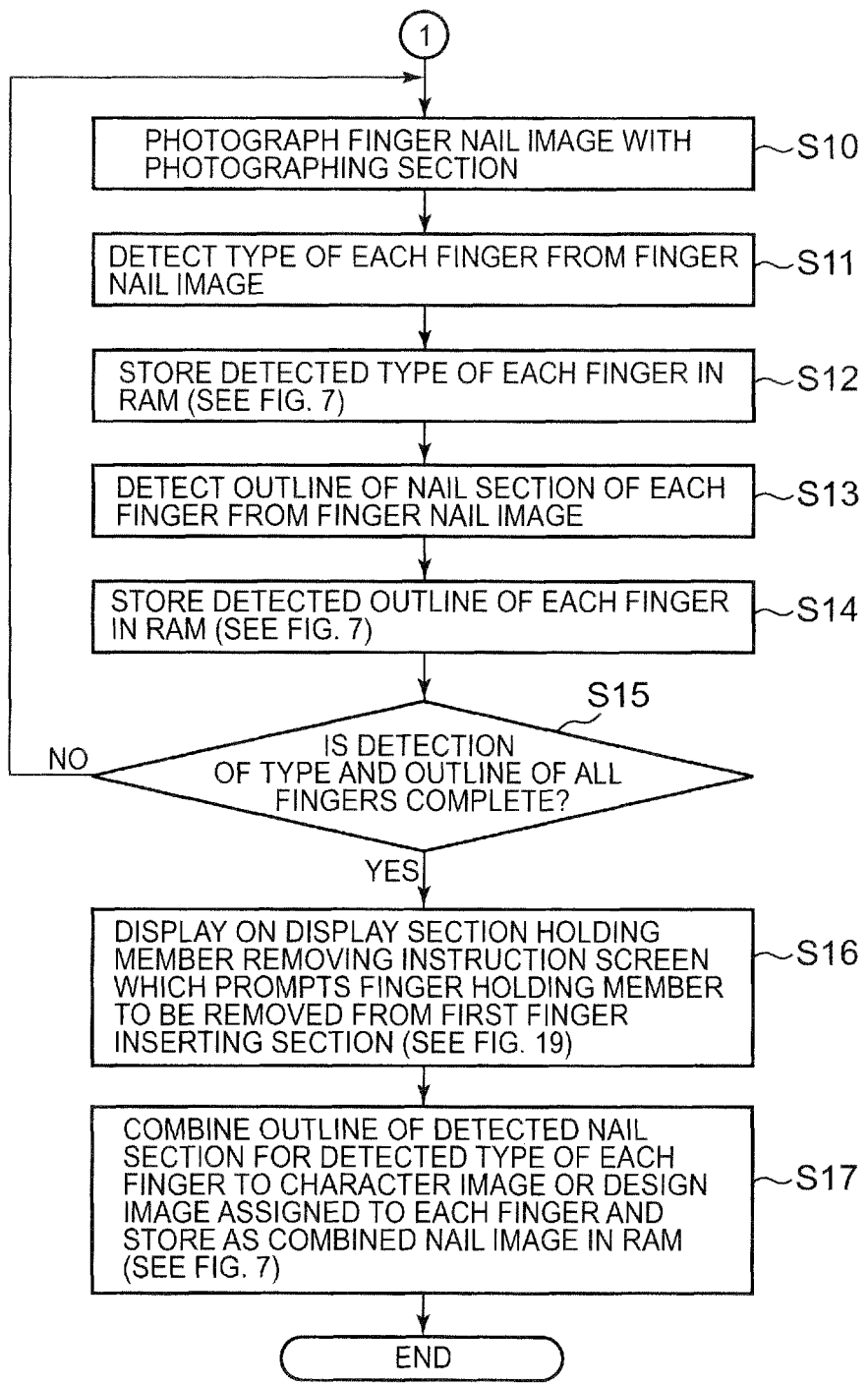
FIG. 11 is a flowchart of a first half of the nail printing processing.

As shown in FIG. 10, in the processing of the first half of the nail chip printing processing, first the controlling section 51 of the nail print apparatus 1 judges whether or not the power source key 25*a* (see FIG. 13) is operated (step S1), and when the power source key 25*a* is not operated (step S1; NO), the judgment of step S1 is repeated. When it is judged that the power source key 25*a* is operated (step S1; YES), the design mode selection screen (see FIG. 13) is displayed on the display section 26 (step S2).

Then, the controlling section 51 judges whether or not the arbitrary design mode is selected on the design mode selection screen (see FIG. 13) (step S3), and when the controlling section 51 judges that the arbitrary design mode is selected (step S3; YES), next, the design selection screen (see FIG. 14) is displayed on the display section 26 (step S4). Then, when the user selects an arbitrary design, the design combined image is displayed on the display section 26 as a screen for confirmation of design in which the selected design is overlapped with the image of the finger (step S5).

The controlling section 51 judges whether or not the touch operation is performed to confirm the design or the switch operation is performed with the key, etc. (step S6) and when the operation is not performed (step S6; NO), the judgment is repeated. Then, when it is judged that the operation to confirm the design is performed (step S6; YES), the confirmed design is stored in the RAM 53 (see FIG. 7) corresponded with the finger type and finger number on which the design is printed (step S7).

When the arbitrary design mode is not selected (step S3; NO), in other words, when the fixed design mode is selected, the processing of step S4 to step S7 is not performed, and the processing advances to the next step.

Figure 15:
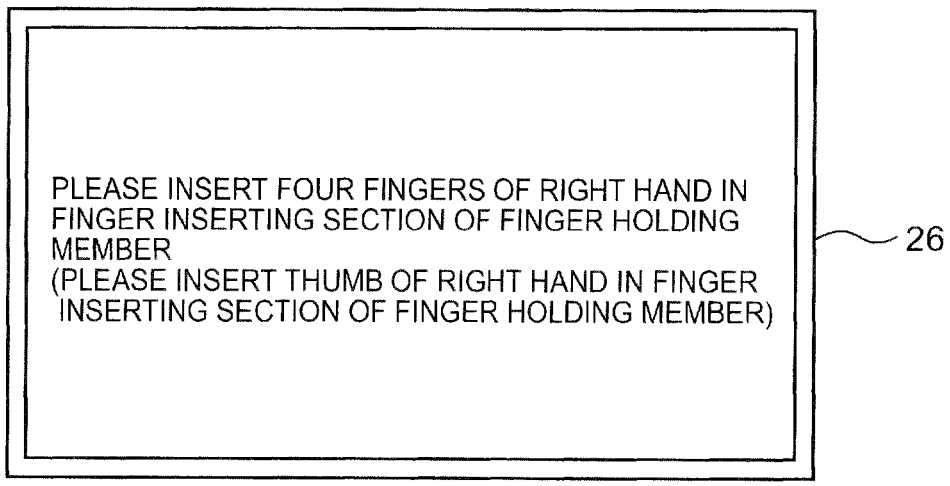
FIG. 15 is a diagram showing an example of a finger inserting instruction screen on the display section.
Figure 16:
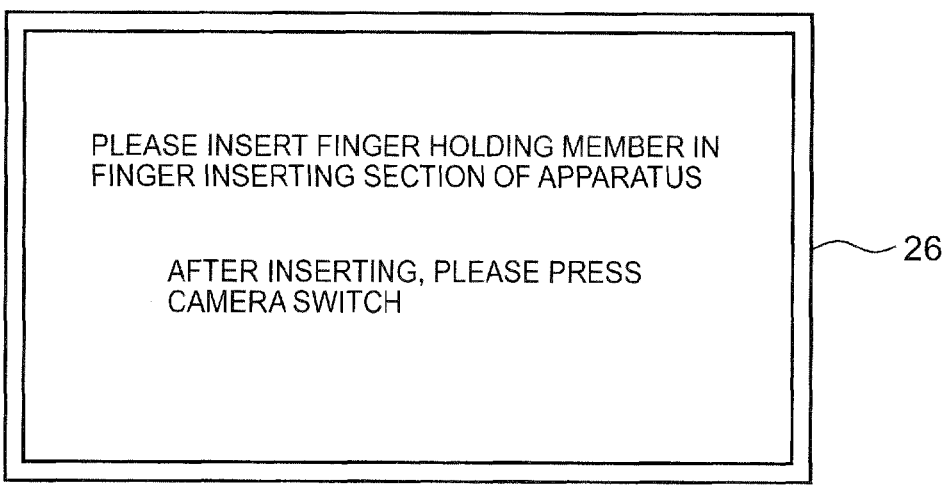
FIG. 16 is a diagram showing an example of a holding member inserting instruction screen on the display section.

Next, the controlling section 51 displays on the display section the finger inserting instruction screen (see FIG. 15) which prompts the finger to be inserted in the finger inserting hole 61 of the finger holding member 6 (step S8). In FIG. 15, the screen displays instruction to insert four fingers of the right hand or the thumb of the right hand, however, the content of the display of the finger inserting instruction screen is not limited to this. For example, the screen can sequentially display instructions such as after the sequence of processing is finished for the four fingers of the right hand, an instruction to insert the thumb of the right hand is displayed, and after the processing of all fingers of the right hand is finished, similar instruction to insert the finger of the left hand is performed.

Then, in a state where the finger is inserted in the finger inserting hole 61, the controlling section 51 displays on the display section 26 the holding member inserting instruction screen (see FIG. 16) to prompt the finger holding member 6 to be inserted in the first finger inserting section 20*a*, as well as to instruct operation of the switch (camera key 25*b*) of the camera 32 after inserting (step S9).

As shown in FIG. 17 to FIG. 18, when the finger holding member 6 is inserted in the first finger inserting section 20*a*, the nail section of the target finger U1 held in the finger holding member 6 is exposed from the nail section exposing hole 63, and is positioned below the photographing section 30 so as to be able to be photographed. The photographing of the finger image by the photographing section 30 is performed in this state where the target finger U1 is held in the finger holding member 6 (step S10 shown in FIG. 11).

When the finger image is photographed by the photographing section 30, the finger type detecting section 512 detects the type of each finger from the finger image (step S11). The finger type detected by the finger type detecting section 512 is stored in the RAM 53 (see FIG. 7) (step S12).

The nail outline extracting section 513 extracts the outline (nail area) of the nail section from the nail image of the nail section included in the finger image (step S13). The outline of the nail section extracted by the nail outline extracting section 513 is stored in the RAM 53 (see FIG. 7) (step S14).

The controlling section 51 constantly judges whether or not the detecting of finger type and outline of the nail section is complete regarding all of the target fingers U1 (step S15), and when the detecting is not complete (step S15; NO) and repeats the processing of step S10 to step S14. When the controlling section 51 judges the detecting of finger type and outline of the nail section is complete regarding all of the target fingers U1 (step S15; YES), the controlling section 51 displays on the display section 26 the holding member removing instruction screen (see FIG. 20) which prompts to the user to take out the finger holding member 6 from the first finger inserting section 20*a* (step S16). Then, the combined nail image generating section 514 combines the outline of the detected nail section with the character image or the design image assigned to each finger for each detected finger type to generate the combined nail image, and the combined nail image is stored in the RAM 53 (see FIG. 7) (step S17).

Figure 12:
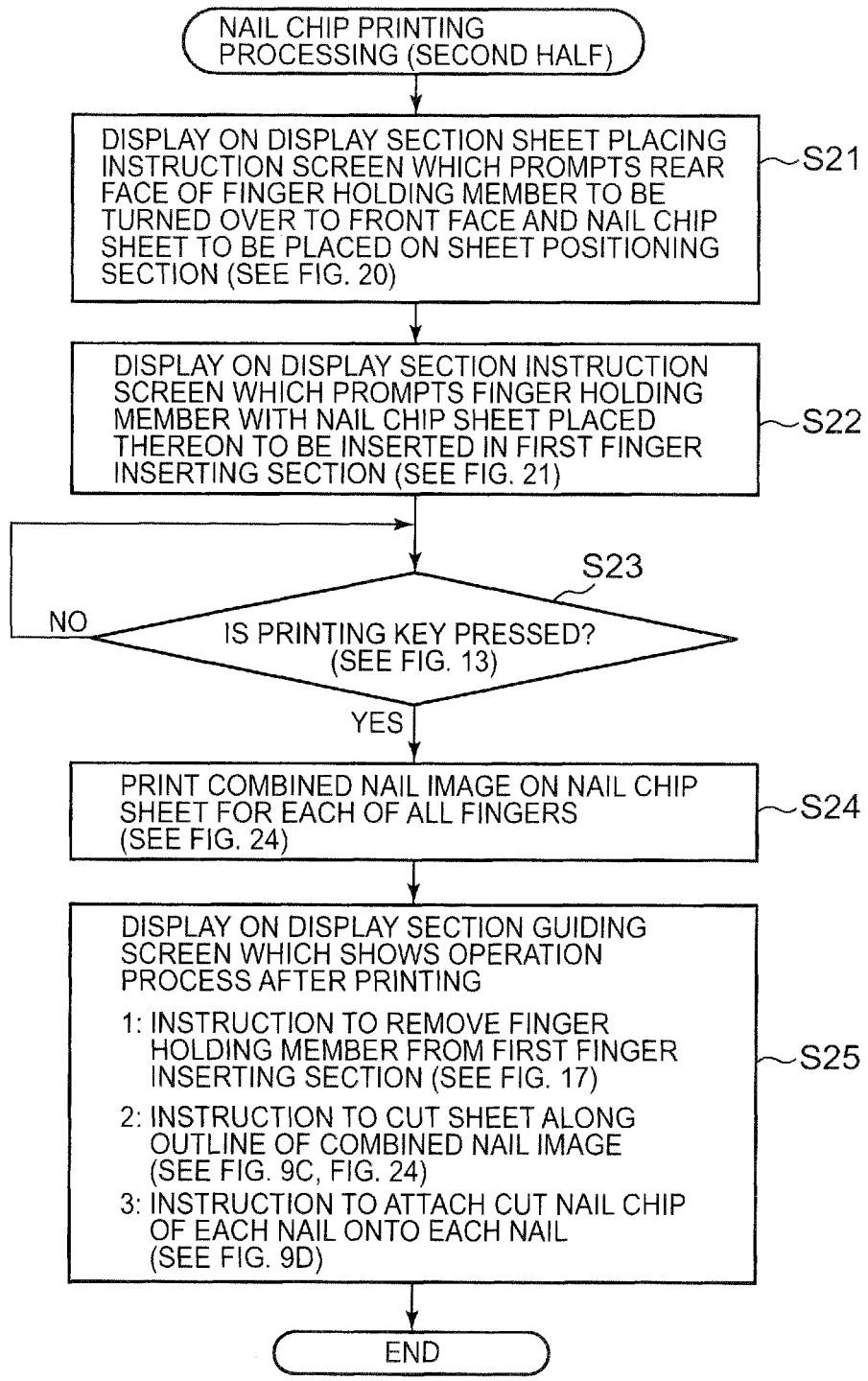
FIG. 12 is a flowchart of a second half of the nail printing processing.

As shown in FIG. 12, in the processing of the second half of the nail chip printing processing, the controlling section 51 displays on the display section 26 a sheet placing instruction screen (see FIG. 20) which prompts the finger holding member 6 to be turned over and the nail chip sheet 7 to be placed on the sheet positioning section 65 (step S21). The controlling section 51 also displays on the display section 26 a holding member reinserting instruction screen (see FIG. 21) which prompts the finger holding member 6 to be inserted in the first finger inserting section 20*a* in a state with the nail chip sheet 7 placed (step S22).

Figure 22:
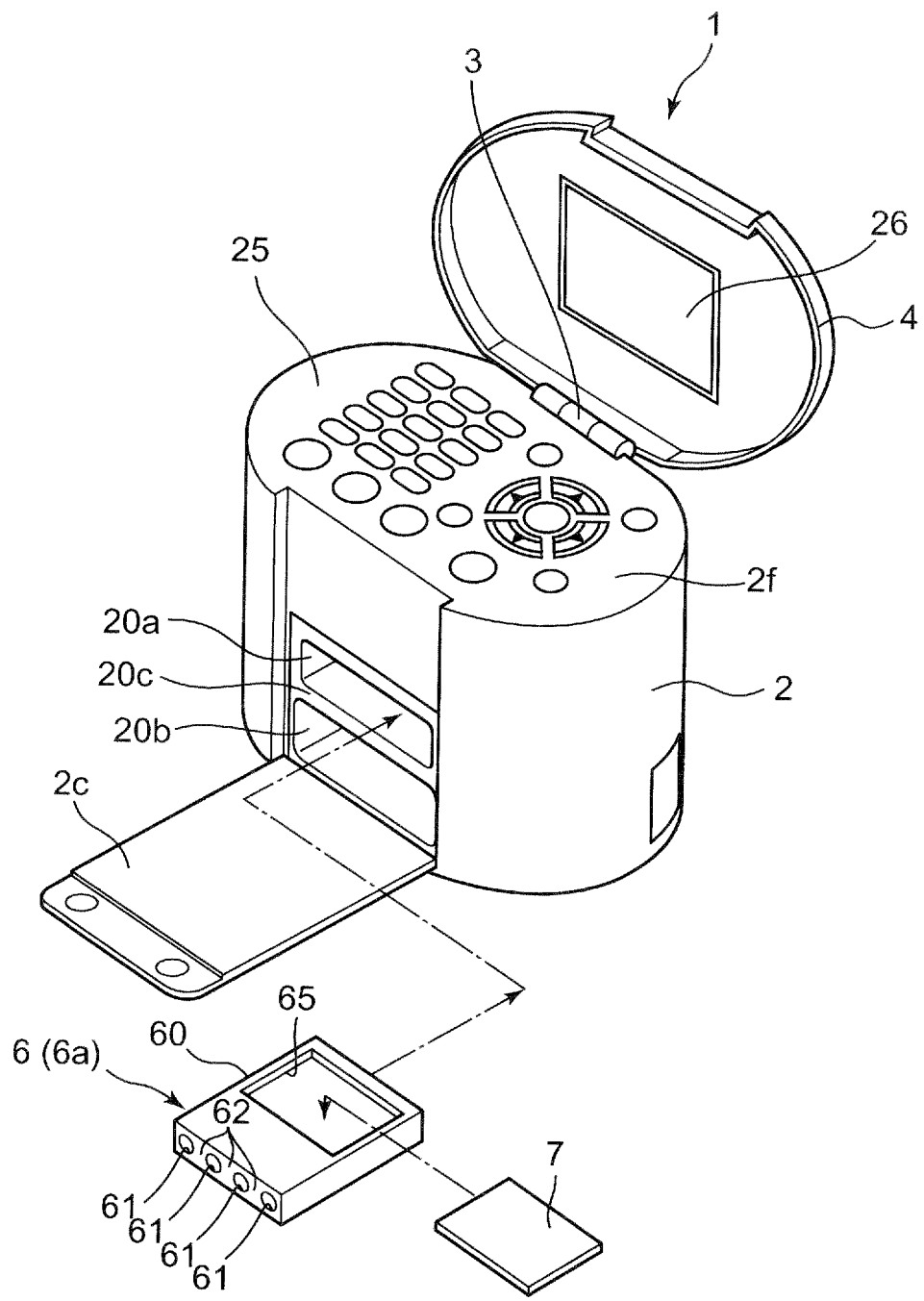
FIG. 22 is a perspective view showing a turned over state of the finger holding member of the nail print apparatus shown in FIG. 1.
Figure 23:
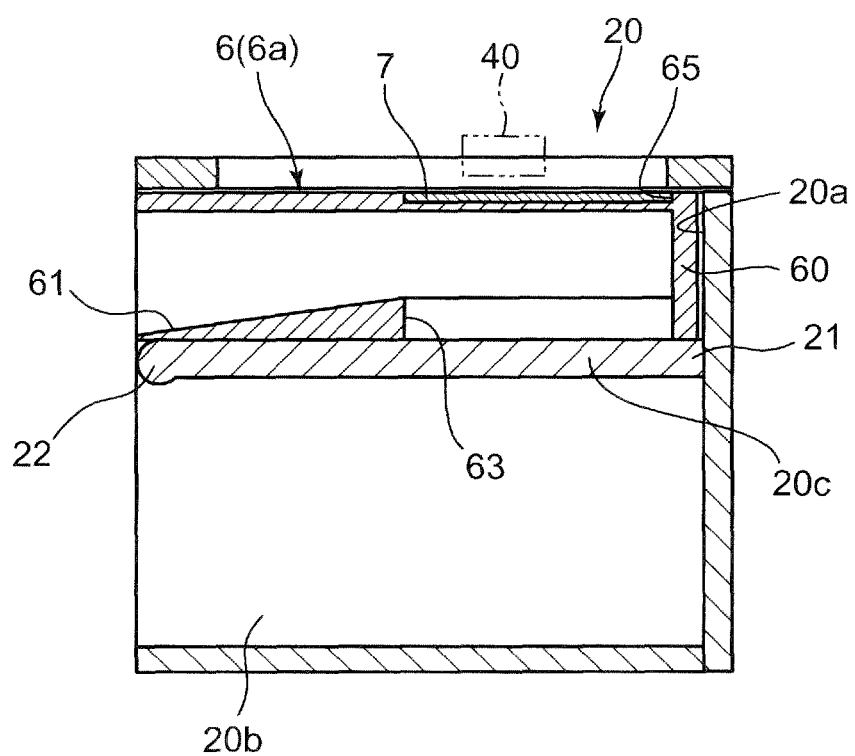
FIG. 23 is a side sectional view showing a state of the finger holding member for four fingers on which the nail chip sheet is placed inserted in the first finger inserting section of the print finger fixing section of the nail print apparatus shown in FIG. 1.

When the holding member reinserting instruction screen (see FIG. 21) is displayed, as shown in FIG. 22, the user turns over the finger holding member 6 and places the nail chip sheet 7 on the sheet positioning section 65. Then, the user inserts the finger holding member 6 in the first finger inserting section 20*a* again so that the sheet positioning section 65 on which the nail chip sheet 7 is placed faces up. FIG. 23 shows the finger holding member 6 inserted in the first finger inserting section 20*a* in a state where the nail chip sheet 7 is placed on the sheet positioning section 65. As shown in FIG. 23, when the finger holding member 6 is inserted in the first finger inserting section 20*a* with the nail chip sheet 7 placed on the sheet positioning section 65, the nail chip sheet 7 is positioned below the printing section 40 and is in a printable state.

The controlling section 51 judges whether or not the printing key 25*c* (see FIG. 13) is operated (step S23) and when the printing key 25*c* is not operated (step S23; NO), the controlling section 51 repeats the judgment. When the printing key 25*c* (see FIG. 13) is operated (step S23; YES), the outline lines R1 to R5 of the combined nail images G1 to G5 are printed for each of all fingers on the nail chip sheet 7 (step S24 and see FIG. 25).

Then, the controlling section 51 displays on the display section 26 a guiding screen which shows the end of printing and the process after printing (step S23). As the process after printing, for example, there are, an instruction to remove the finger holding member 6 from the first finger inserting section 20*a*, an instruction to form the nail chips 70*a* to 70*e* (see FIG. 25) for each finger by cutting the nail chip sheet 7 along the outline lines R1 to R5 of the combined nail images G1 to G5, an instruction to peel off the peeling layer 73 of the nail chips 70*a* to 70*e* for each finger after cutting and to attach the nail chips 70*a* to 70*e* to each finger U1-1 to U1-5 of the user, and the like.

Figure 26:
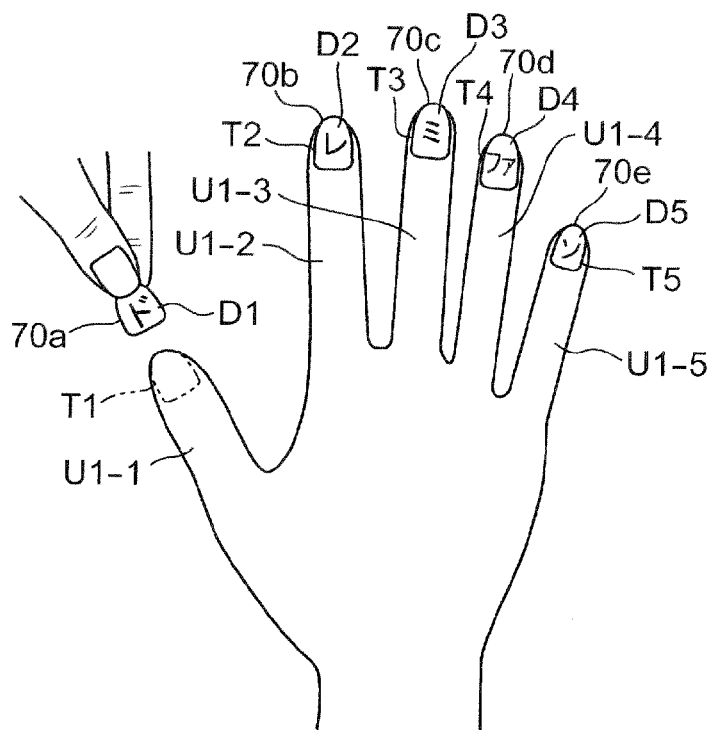
FIG. 26 is a diagram showing a state of the nail chip for five fingers shown in FIG. 25 attached to each of the five finger nails.
Figure 27:
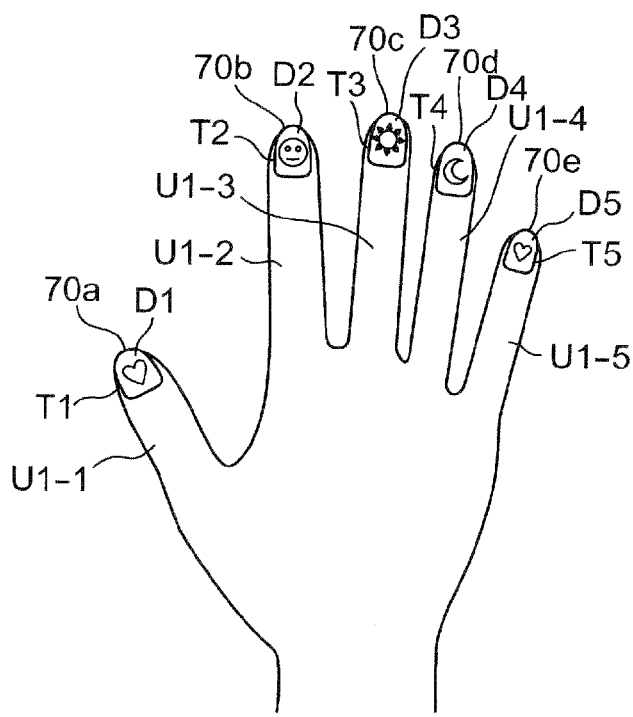
FIG. 27 is a diagram showing a state of the nail chip for five fingers printed with a fixed design attached to each of the five finger nails.

FIG. 26 shows a state where the user selects the arbitrary design mode, forms the nail chips 70*a* to 70*e* (see FIG. 26) for each finger, and attaches the nail chips 70*a* to 70*e* on each of the nails T1 to T5 of the target fingers U1-1 to U1-5. FIG. 27 shows a state where the user selects the fixed design mode, forms the nail chips 70*a* to 70*e* for each finger, and attaches the nail chips 70*a* to 70*e* to the nails T1 to T5 of the target fingers U1-1 to U1-5.

According to the above described embodiment, the design images D1 to D5 specified by the user are combined with the outline of the nail section extracted from the nail image of the nail section photographed by the photographing section 30 to generate the combined nail images G1 to G5 and the outline lines R1 to R5 of the combined nail images G1 to G5 are printed on the nail chip sheet 7. Therefore, nail chips 70*a* to 70*e* in an outline shape which match the outline shape of the nail section of the user can be easily formed.

The present embodiment includes the finger type detecting section 512 which detects the type of each finger from the finger image of a plurality of fingers, and the finger type detected by the finger type detecting section 512 is stored corresponded with the nail image of the nail section in the RAM 53, the nail image for each finger type is combined with the design image specified by the user to generate the combined nail images G1 to G5 and the outline lines R1 to R5 of the combined nail images G1 to G5 are printed on the nail chip sheet 7. Therefore, nail chips 70a to 70e with an outline shape which matches the outline shape of the nail section of the user can be formed easily and speedily for a plurality of fingers.

Since the nail chip sheet 7 for generating the nail chips 70a to 70e is provided with an adhesive layer, after separating each nail chip 70a to 70e from the nail chip sheet 7, the user can easily attach to one's own nail the nail chips 70a to 70e by simply peeling off the peeling layer. Therefore, the user can easily enjoy nail print.

Since the combined nail images G1 to G5 are generated by extracting the outline of the nail section from the nail image of the nail section and combining the above with the design image, when each nail chip 70 (70a to 70e) is separated from the nail chip sheet 7, the user can easily discriminate the outline lines R1 to R5 to be cut and therefore can easily form the nails chips 70a to 70e.

As it is clear from the above description, according to the present embodiment, a nail print apparatus (nail print apparatus 1 shown in FIG. 1, etc.) includes:

a photographing section (photographing section 30 as shown in FIG. 2, etc.) which photographs a plurality of fingers and a nail section of each finger to obtain a finger image including a nail image of the nail section of the plurality of fingers;

a finger type detecting section (finger type detecting section 512 shown in FIG. 5) which detects a type of each finger from the finger image of the plurality of fingers photographed by the photographing section;

a first storage controlling section (finger type detecting section 512 shown in FIG. 5) which stores the type of finger detected by the finger type detecting section corresponded with the nail image of the nail section photographed by the photographing section;

a design specifying section (design setting section 511 and operation section 25 shown in FIG. 5) which receives specification of a design image to be printed;

a second storage controlling section (design setting section 511 shown in FIG. 5) which stores the design image specified on the design specifying section;

a combined nail image generating section (combined nail image generating section 514 shown in FIG. 5) which combines the design image stored by control of the second storage controlling section with the nail image for each type of finger stored by control of the first storage controlling section to generate a combined nail image; and a print controlling section (printing section 40 shown in FIG. 3, etc.) which controls printing of the combined nail image combined by the combined nail image generating section on the nail chip sheet (nail chip sheet 7 shown in FIG. 9B).

Preferably, the nail print apparatus (nail print apparatus 1 shown in FIG. 1, etc.) further includes a nail outline extracting section (nail outline extracting section 513 shown in FIG. 5) which extracts an outline of a nail section from a nail image of the nail section photographed by the photographing section (photographing section 30 shown in FIG. 2, etc.), wherein the combined nail image generating section (combined nail image generating section 514 shown in FIG. 5) combines the outline of the nail section extracted by the nail outline extracting section from the nail image with the design image to generate the combined nail image.

According to the present embodiment, a nail print apparatus (nail print apparatus 1 as shown in FIG. 1) includes:

a photographing section (photographing section 30 shown in FIG. 2, etc.) which photographs a plurality of fingers and a nail section of each finger to obtain a finger image including the nail image of the nail section of the plurality of fingers;

a finger type detecting section (finger type detecting section 512 shown in FIG. 5) which detects a type of each finger from the finger image of the plurality of fingers photographed by the photographing section;

a first storage controlling section (finger type detecting section 512 shown in FIG. 5) which stores the type of finger detected by the finger type detecting section corresponded with the nail image of the nail section photographed by the photographing section;

a nail outline extracting section (nail outline extracting section 513 shown in FIG. 5) which extracts an outline of a nail section from the nail image of the nail section photographed by the photographing section; and a print controlling section (printing section 40 shown in FIG. 3, etc.) which controls printing of the outline of the nail section extracted from the nail outline extracting section according to type of finger stored by control of the first storage controlling section on the nail chip sheet (nail chip sheet 7 shown in FIG. 9B).

Preferably, the nail print apparatus (nail print apparatus 1 shown in FIG. 1, etc.), further includes a cut controlling section (cutter 5 shown in FIG. 3) which controls cutting of the nail chip sheet (nail chip sheet 7 shown in FIG. 9B) along the outline of the nail section printed on the nail chip sheet by the print controlling section (printing section 40 shown in FIG. 3, etc.).

According to the present embodiment, a print controlling method which is used in a nail print apparatus (nail print apparatus 1 shown in FIG. 1, etc.) including a photographing section (photographing section 30 shown in FIG. 2, etc.) which photographs a plurality of fingers and a nail section of each finger to obtain a finger image including a nail image of the nail section of the plurality of fingers and a design specifying section (design setting section 511 and operation section 25 shown in FIG. 5) which receives specification of a design image to be printed, the method includes:

a finger type detecting step (S11 shown in FIG. 11) which detects a type of each finger from the finger image of the plurality of fingers photographed by the photographing section;

a first storage controlling step (S12, S13 shown in FIG. 11) which stores the type of finger detected by the finger type detecting step corresponded with the nail image of the nail section photographed by the photographing section;

a second storage controlling step (S5, S7 shown in FIG. 10) which stores the design image specified on the design specifying section;

a combined nail image generating step (S17 shown in FIG. 11) which combines the design image stored by control of the second storage controlling step with the nail image for each type of finger stored by control of the first storage controlling step to generate a combined nail image; and a print controlling step (S24 shown in FIG. 12) which controls printing of the combined nail image combined by the combined nail image generating step on the nail chip sheet (nail chip sheet 7 shown in FIG. 9B).

Preferably, the print controlling method further includes a nail outline extracting step (S13 shown in FIG. 11) which extracts an outline of a nail section from a nail image of the nail section photographed by the photographing section (photographing section 30 shown in FIG. 2, etc.), wherein the combined nail image generating step (S17 shown in FIG. 11) combines the outline of the nail section extracted by the nail outline extracting step from the nail image with the design image to generate the combined nail image.

According to the present embodiment, a print controlling method which is used in a nail print apparatus (nail print apparatus 1 shown in FIG. 1, etc.) including a photographing section (photographing section 30 shown in FIG. 2, etc.) which photographs a plurality of fingers and a nail section of each finger to obtain a finger image including the nail image of the nail section of the plurality of fingers, the method includes:

a finger type detecting step (S11 shown in FIG. 11) which detects a type of each finger from the finger image of the plurality of fingers photographed by the photographing section;

a first storage controlling step (S12, S13 shown in FIG. 11) which stores the type of finger detected by the finger type detecting step corresponded with the nail image of the nail section photographed by the photographing section;

a nail outline extracting step (S13 shown in FIG. 11) which extracts an outline of a nail section from the nail image of the nail section photographed by the photographing section; and a print controlling step (S24 shown in FIG. 12) which controls printing of the outline of the nail section extracted from the nail outline extracting step according to type of finger stored by control of the first storage controlling step on the nail chip sheet (nail chip sheet 7 shown in FIG. 9B).

Preferably, the print controlling method (S24 shown in FIG. 12) further includes a cut controlling step (cutter 5 shown in FIG. 3) which controls cutting of the nail chip sheet along the outline of the nail section printed on the nail chip sheet (nail chip sheet 7 shown in FIG. 9B) by the print controlling section.

The embodiment of the present invention is described above, however, the present invention is not limited to the above embodiment, and various modifications are possible without leaving the scope of the present invention.

For example, the above described embodiment illustrates an example where the design image is combined with the nail image to generate the combined nail image, and the above is printed on the nail chip sheet 7, however, the nail image or only the line showing the outline of the nail section extracted from the nail image can be printed on the nail chip sheet 7.

Figure 28:
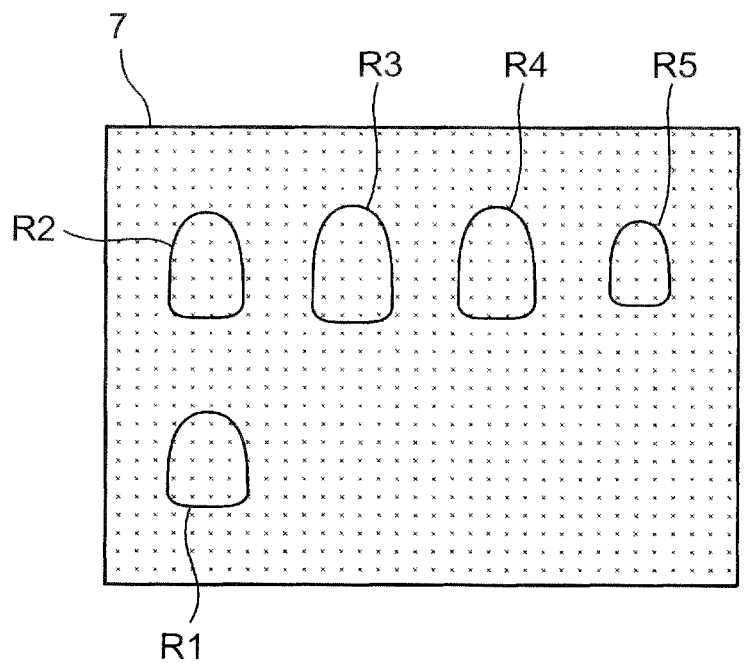
FIG. 28 is a diagram showing a nail chip sheet with a pattern on which combined nail images for five fingers are printed.
Figure 29:
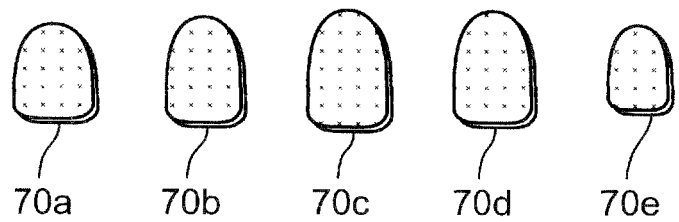
FIG. 29 is a diagram showing the nail chip for five fingers separated from the nail chip sheet shown in FIG. 28.

For example, as shown in FIG. 28, when printing is performed on a nail chip sheet 7 with a design, the user can select the nail chip sheet 7 with the desired design and print only the line indicating the outline of the nail section. Then, the user can cut along the printed outline lines R1 to R5 and easily form nail chips 70a to 70e as shown in FIG. 29.

By using a nail chip sheet 7 of various material (for example material with shine, material with glitter, material of a suede type, etc.) or by preparing the sheet by attaching rhinestones, etc. in advance, nail chips with even more variety can be easily made.

When printing only the line indicating the outline of the nail section, the user can cut the trouble of selecting the design on the display section 26. Moreover, only the line indicating the outline needs to be printed, therefore, ink of only one color is used in the printing and the used amount is small. When a design, etc. is provided on the nail chip sheet 7 itself, the picture is not easily peeled off by scraping compared to when the picture is printed by ink.

It is possible to configure the nail printer apparatus 1 shown in the present embodiment so that a mode to print only the line indicating the outline of the nail section can be selected.

The present embodiment describes an example where the user cuts off each nail chip 70a to 70e after the nail chip sheet 7 is printed. However, as shown in FIG. 3, a configuration where a cutting section such as a cutter 5, etc. is provided near the print head 46, etc. is possible, and after the printing operation by the print head 46 is finished, the nail chip 70 can be automatically cut by the cutter 5 along the outline lines R1 to R5 of the nail section printed on the nail chip sheet 7. In this case, the controlling section 51 functions as a cutting controlling section to control the cutting section such as the cutter 5, etc. The position of providing the cutting section is not limited to the illustrated example.

The configuration can be set so that not all of the layers of the nail chip sheet 7 are cut by the cutter 5, and the layers of the nail chip sheet 7 are cut except for the peeling layer 73. In this case, after cutting, the user peels off the layers (printed layer 71, adhesive layer 72) cut by the cutter 5 from the peeling layer 73 and can remove the nail chip 70 from the nail chip sheet 7 in a state where the adhesive layer 72 is exposed.

As described above, when the nail chip 70 is automatically cut, the nail chip 70 can be formed easily and fast without troubling the user.

According to the present embodiment, the sheet positioning section 65 is provided on both the finger holding member 6a for four fingers and the finger holding member 6b for thumb, however, the sheet positioning section 65 can be provided on either one of the finger holding member 6a for four fingers or the finger holding member 6b for thumb.

For example, by changing the depth of the sheet positioning section 65 between the finger holding member 6a for four fingers and the finger holding member 6b for thumb, nail chip sheet 7 of various thicknesses can be used, such as, using a thin nail chip sheet 7, or a thick nail chip sheet 7 provided with rhinestones, etc. on the sheet.

Second Embodiment

The second embodiment of the nail print apparatus of the present invention is described with reference to FIG. 30 to FIG. 48.

The nail print apparatus of the second embodiment has an inner configuration similar to the nail print apparatus of the first embodiment shown in FIG. 1 and the nail print apparatus shown in FIG. 2. Therefore, the portions with the same configuration are omitted.

In the present embodiment, the photographing section 30 functions as a first image obtaining section which illuminates the target finger U of other person a (in other words a first person) with the illuminating lamp 33, photographs the target finger U with the camera 32, and obtains the finger image including nail images Ga1 to Ga5 (see FIG. 30) of the plurality of nail sections T of the other person a (first person).

The photographing section 30 also functions as a second image obtaining section which illuminates the target finger U of the user (in other words, a second person) with the illuminating lamp 33, photographs the target finger U with the camera 32, and obtains the finger image including the nail images G1 to G5 (see FIG. 30) of the plurality of nail sections T of the user (second person).

The photographing section 30 is connected to the later described controlling section 51 of the controlling device 50 and the photographing section 30 is controlled by the controlling section 51. The nail images Ga1 to Ga5 of the other person a (first person) obtained by the photographing section 30 and the nail images G1 to G5 of the user (second person) are stored in the storage section such as the RAM 53, etc. for each finger type (see FIG. 30).

The printing section 40 is a printing section which prints on the nail section T of the target finger U of the user or the nail chip sheet 7 (see FIG. 9B, etc.) for generating the nail chip 70 based on the print data generated by combining the nail images Ga1 to Ga5 of the other person (first person) photographed by the photographing section 30 with the nail images G1 to G5 of the corresponding target finger U of the user (second person) and as shown in FIG. 2 to FIG. 4, the printing section 40 is provided in the device casing 11 (mainly upper device casing 11b).

In the present embodiment, the display section 26 displays, for example, a mode selection screen (see FIG. 36) which prompts the user to select an operation mode, a design confirmation screen which displays a design combined image in which the nail design is overlapped on the user's finger and which prompts confirmation to the user, and other various instruction screens (FIG. 37, FIG. 38, FIG. 39, FIG. 40, FIG. 45 and FIG. 46).

Figure 36:
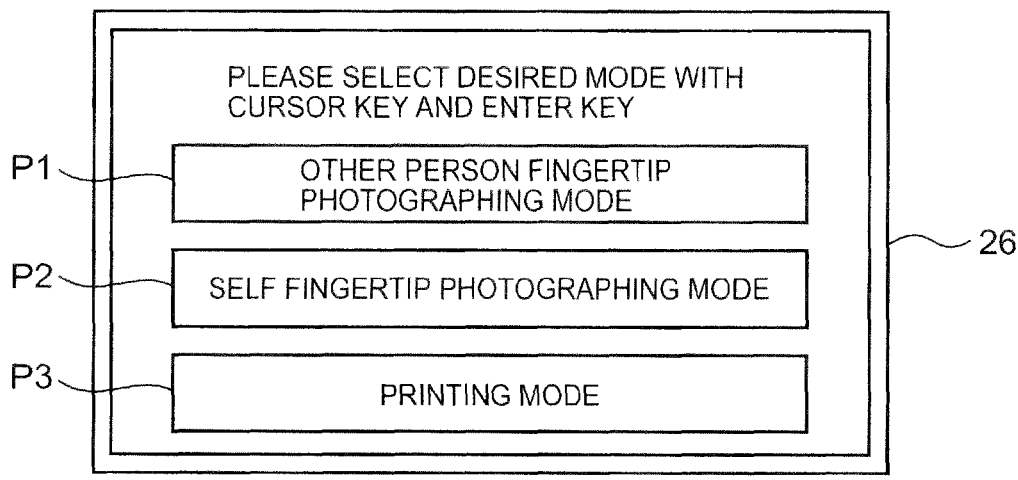
FIG. 36 is a diagram showing an example of an operation section and a mode selection screen on a display section.

As shown in FIG. 36, the mode selection screen of the present embodiment displays an other person fingertip photographing mode key P1 for selecting an other person fingertip photographing mode, a self fingertip photographing mode key P2 for selecting a self (in other words, the user) fingertip photographing mode, and a printing mode key P3 for selecting a printing mode and the user can select the desired operation mode by selecting any one of the other person fingertip photographing mode key P1, the self fingertip photographing mode key P2 and the printing mode key P3.

Although not illustrated, when the printing mode is selected, the user can select a nail printing mode which directly prints on the nail section T of the user or a sheet printing mode which prints on the nail chip sheet 7. When nail images (illustration of four other person a to other person d shown in FIG. 30) of a plurality of other person are stored in the later described storage section, the user can select which one of the nail design of the nail image of the other person is printed on the self nail section T or the nail chip sheet 7 on the display screen of the display section 26 or the operation section 25.

The controlling section 51 functionally includes a finger type detecting section 511, a nail outline extracting section 512, an adjusted nail image generating section 513, a combined nail image generating section 514, a print controlling section 515, a display controlling section 516, and the like. The functions as the finger type detecting section 511, the nail outline extracting section 512, the adjusted nail image generating section 513, the combined nail image generating section 514, the print controlling section 515, the display controlling section 516, etc. are realized in conjunction with programs stored in the CPU and the ROM 52.

The finger type detecting section 511 is a finger type detecting section which detects a type of each finger from the finger image of the plurality of target fingers U of the other person a (first person) photographed by the photographing section 30, and the finger image of the plurality of target fingers U of the user (second person) similarly photographed by the photographing section 30.

The finger type detecting section 511 detects the finger type of each finger image based on, for example, the position, length, width, etc. of the finger image. The detecting method of the finger type is not limited to the example illustrated here.

The finger type detecting section 511 also functions as a storage controlling section which stores the finger type detected based on the finger image corresponded with the nail images Ga1 to Ga5, G1 to G5 of the nail section T obtained by the photographing section 30 separately for the other person a (first person) and the user (second person) in the storage section such as the RAM 53, etc.

The nail outline extracting section 512 is a nail outline extracting section which extracts outlines Ra1 to Ra5, R1 to R5 of the nail section T from the nail images Ga1 to Ga5 of the nail section T of the other person a (first person) photographed by the photographing section 30 and the nail images G1 to G5 of the nail section T of the user (second person). The outlines Ra1 to Ra5, R1 to R5 of the nail section T extracted by the nail outline extracting section 512 are corresponded to the nail images Ga1 to Ga5, G1 to G5 and stored in the storage section RAM 53, etc. (see FIG. 30). The nail outline extracting section 512 is not a necessary component of the present invention, and a configuration in which the nail outline extracting section 512 is not provided and a processing is performed without extracting the outline R of the nail section T can be composed.

The adjusted nail image generating section 513 is an adjusted nail image generating section which adjusts the nail images Ga1 to Ga5 of the other person a (first person) stored in the storage section such as the RAM 53, etc. to match the nail images G1 to G5 of the corresponding target finger U of the user (second person) and to generate the adjusted nail images Ia1 to Ia5 (see FIG. 30).

The adjusted nail images Ia1 to Ia5 generated by the adjusted nail image generating section 513 are stored in the storage section such as the RAM 53, etc. corresponded to the person (other person (first person) or user (second person)) or finger type (see FIG. 30).

Figure 41:
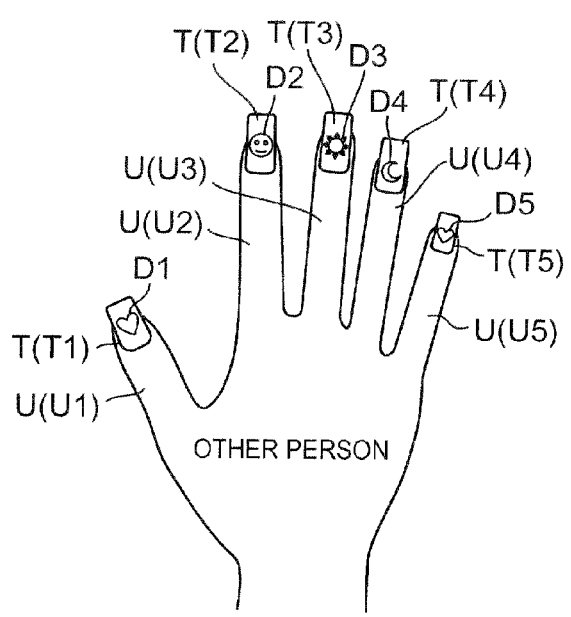
FIG. 41 is a diagram showing an example of a finger image including a nail image of a nail section of other person.
Figure 42:
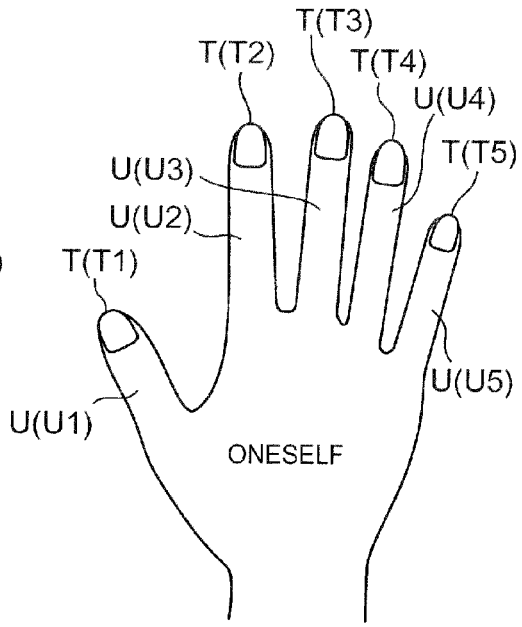
FIG. 42 is a diagram showing an example of a finger image including a nail image of a nail section of a user.
Figure 44:
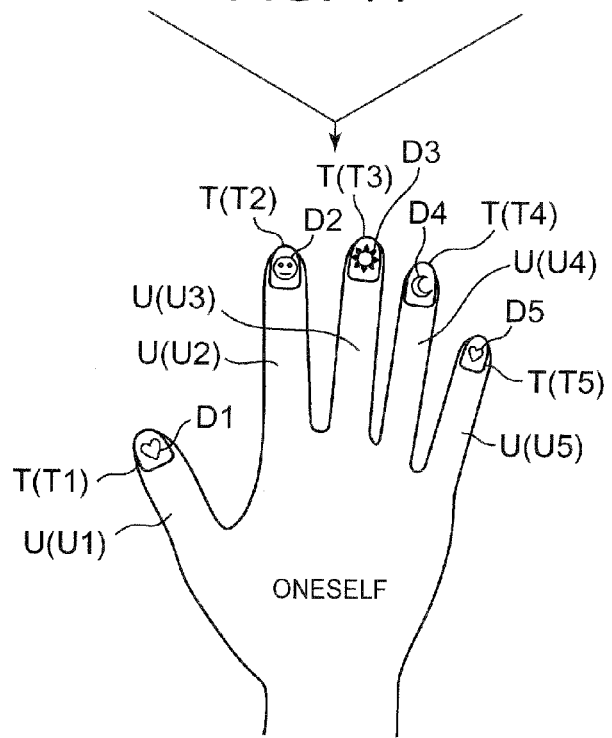
FIG. 44 is a diagram showing a state where combined nail images for five fingers are printed on the nail section of the user.
Figures 43A, 43B, 43C, 43D:
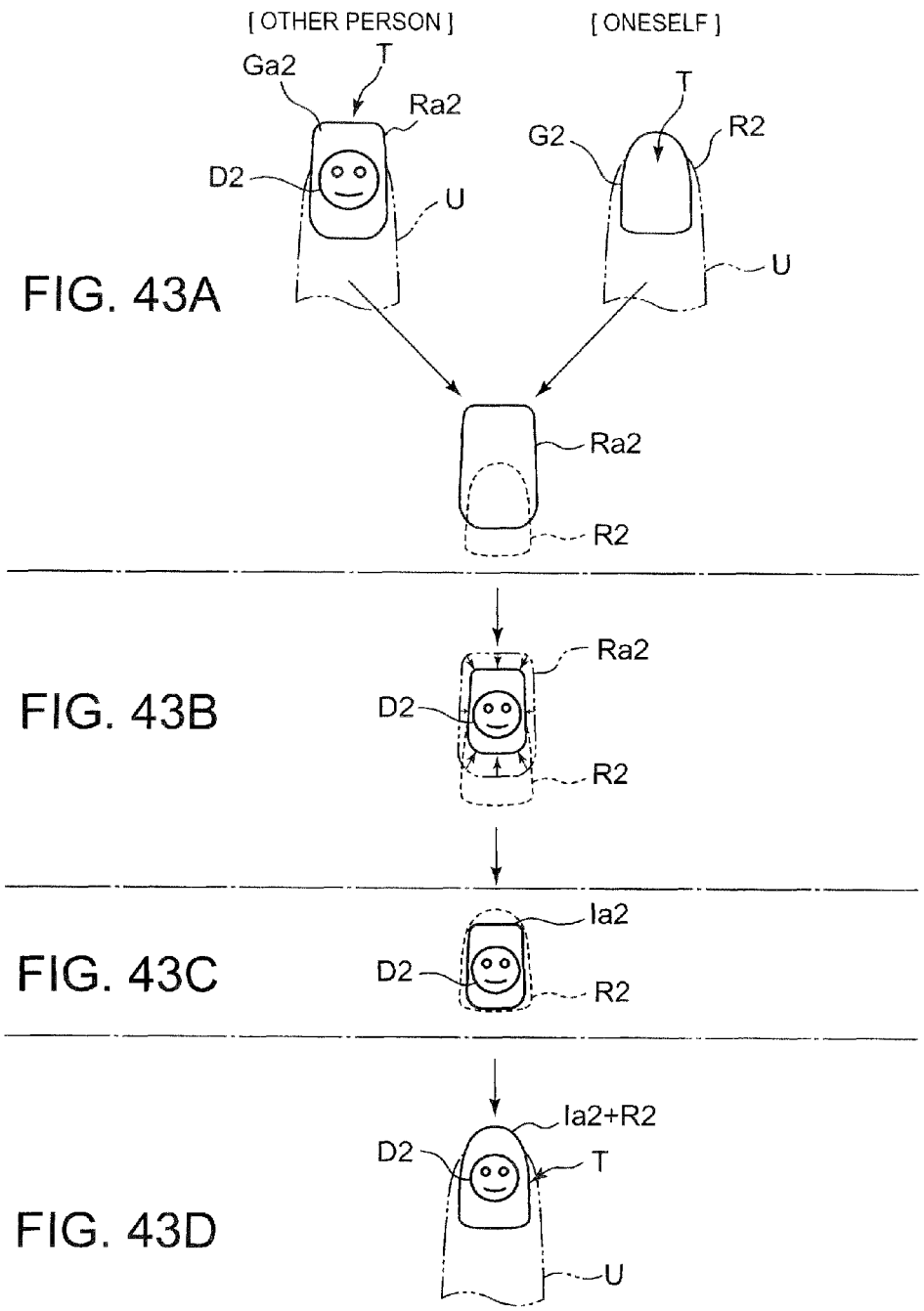
FIG. 43A is a diagram describing comparison between an outline of a nail section of other person and an outline of a nail section of oneself.
FIG. 43B is a diagram describing an example of reducing the nail image of the nail section of other person to match the outline of the nail section of oneself.
FIG. 43C is a diagram showing an example of an adjusted nail image.
FIG. 43D is a diagram showing an example of a combined nail image.
Figure 45:
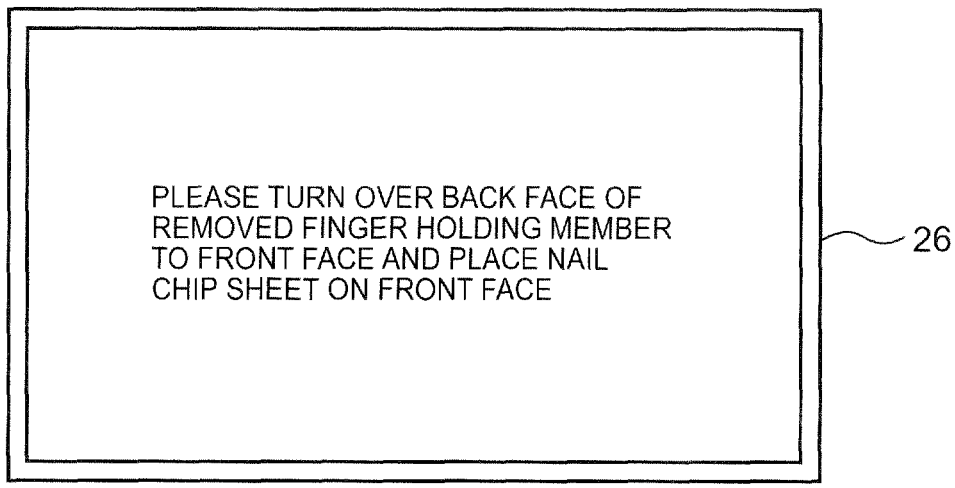
FIG. 45 is a diagram showing an example of a sheet placing instruction screen on the display section.
Figure 46:
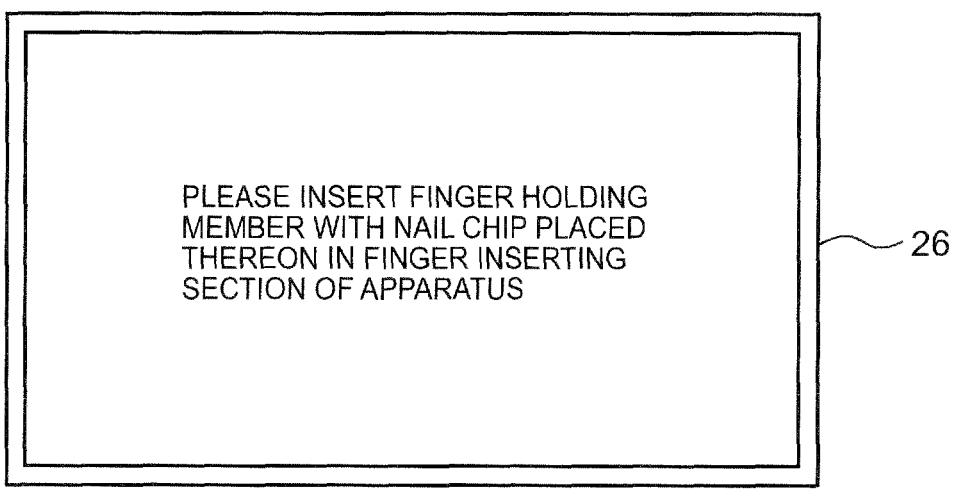
FIG. 46 is a diagram showing an example of a holding member reinserting instruction screen on the display section.

For example, when the nail sections T1 to T5 of the other person a is a size and shape as shown in FIG. 41, and the nail sections T1 to T5 of the user is a size and shape as shown in FIG. 42, the nail images Ga1 to Ga5 of the other person a are matched to the nail images G1 to G5 of the user by the processing shown in FIG. 43A to FIG. 43C. With this, when the nail images Ga1 to Ga5 of the other person a are printed to the nail sections T1 to T5 of the user, as shown in FIG. 44, the nail images Ga1 to Ga5 of the other person a can be matched to the size and shape of the nail sections T1 to T5 of the user.

Here, the generating processing of the adjusted nail images Ia1 to Ia5 of the adjusted nail image generating section 513 is described in detail with reference to FIG. 43A to FIG. 43C.

In the present embodiment, first, as shown in FIG. 43A, the adjusted nail image generating section 513 compares the outlines Ra1 to Ra5 (the outline Ra2 of the index finger of the other person a is shown in FIG. 43A, etc.) of the nail section T of the other person a (first person) extracted by the nail outline extracting section with the outlines R1 to R5 (the outline R2 of the index finger of the user is shown in FIG. 43A, etc.) of the nail section T of the user (second person). When the size of the outlines Ra1 to Ra5 of the nail section T of the other person a (first person) is larger than the size of the outlines R1 to R5 of the nail section T of the user (second person), the entire size of the nail images Ga1 to Ga5 of the other person a (first person) is reduced so that the outlines Ra1 to Ra5 of the nail section T of the other person a (first person) are within the outlines R1 to R5 of the nail section T of the user (second person) (see FIG. 43B, the nail image Ga2 of the index finger of the other person a is shown in FIG. 43B, etc.).

An example where the entire size of the nail image of the other person a (first person) is reduced when the size of the outlines Ra1 to Ra5 of the nail section T of the other person a (first person) is larger than the size of the outlines R1 to R5 of the nail section T of the user (second person) is described here, however, when the size of the outlines Ra1 to Ra5 of the nail section T of the other person a (first person) is smaller than the size of the outlines R1 to R5 of the nail section T of the user (second person) adjustment of enlarging the entire size of the nail images Ga1 to Ga5 of the other person a (first image) can be performed to print in a balanced manner.

The adjustment of the adjusted nail image generating section 513 is not limited to reducing and enlarging the entire size of the nail images Ga1 to Ga5 and for example, adjustment of changing the shape of the nail images Ga1 to Ga5 is possible such as changing nail images Ga1 to Ga5 which are long vertically to a shape long horizontally, etc. When printing is performed on the nail chip sheet 7, an outline R can be employed where only the width direction of the nail images Ga1 to Ga5 can be adjusted to match the outlines R1 to R5 of the nail section T of the user (second person) and regarding the vertical direction of the nail images Ga1 to Ga5, the outlines Ra1 to Ra5 of the nail section T of the other person a (first person) can be printed on the nail chip sheet 7.

In a case where the nail image of the other person a is printed on the nail section T of the user, when the position of the outlines Ra1 to Ra5 of the nail section T of the other person a is not within the range of the outlines R1 to R5 of the nail section T of the user, the adjusted nail image generating section 513 moves the coordinates of the printing position of the outlines Ra1 to Ra5 so that the position is within the range of the outlines R1 to R5. In the case illustrated in FIG. 43A and FIG. 43B, since the position of the outlines Ra1 to Ra5 of the nail section T of the other person a is misaligned upward than the outlines R1 to R5 of the nail section T of the user, the coordinates of the printing position of the outlines Ra1 to Ra5 are moved lower and therefore, the position of the outlines Ra1 to Ra5 are within the range of the outlines R1 to R5 (see FIG. 43C).

As described above, the size, shape and position of the outlines Ra1 to Ra5 of the nail section T of the other person a are suitably adjusted to generate the adjusted nail images Ia1 to Ia5 as shown in FIG. 43C (FIG. 43C shows the adjusted nail image Ia2 of the index finger of the other person a).

The adjusted nail image generating section 514 is a combined nail image generating section which combines the nail images (in other words, adjusted nail images Ia1 to Ia5) of the other person a (first person) after adjustment adjusted by the adjusted nail image generating section 513 with the outlines R1 to R5 of the nail section T of the user (second person) to generate combined nail images Ia1+R1 to Ia5+R5 as shown in FIG. 43D (FIG. 43D shows the combined nail image Ia2+R2 of the index finger of the other person a). In the printing mode, when the nail printing mode which prints on the nail section T of the user is selected (in other words, when the sheet printing mode which prints on the nail chip sheet 7 is not selected), the generation of the combined nail image in the combined nail image generating section 514 does not have to be performed.

The combined nail images Ia1+R1 to Ia5+R5 generated by the combined nail image generating section 514 are stored in the storage section such as the RAM 53, etc. corresponded to each person (other person a (first person) or user (second person)) or to finger type (see FIG. 30).

The print controlling section 515 is a print controlling section which controls the print operation of the printing section 40 to print on the nail section T of the user (second person) or the nail chip sheet 7.

Specifically, in the printing mode, when the user selects the nail printing mode to perform printing on the nail section T of the user (second person), the print controlling section 515 generates print data including design to be printed on the nail section T of each corresponding target finger U of the user (second person), printing position, etc. based on the adjusted nail images Ia1 to Ia5 for each finger generated by the adjusted nail image generating section 513, outputs the print data to the printing section 40 and controls the printing operation of the printing section 40.

In the printing mode, when the sheet printing mode which prints on a nail chip sheet 7 is selected, the print controlling section 515 generates print data in which the combined nail images Ia1+R1 to Ia5+R5 generated in the combined nail image generating section 514 are positioned so that a certain space is provided between the combined nail images of each finger when the combined nail images Ia1+R1 to Ia5+R5 are printed on the nail chip sheet 7, outputs the print data to the printing section 40 and controls the printing operation of the printing section 40.

Figure 47:
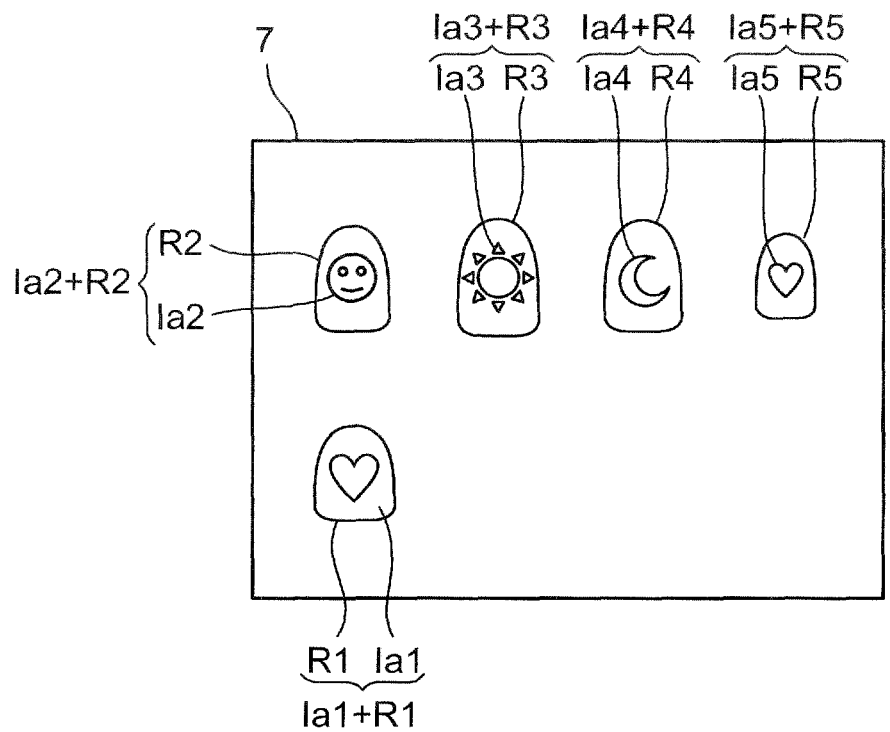
FIG. 47 is a diagram showing a nail chip sheet on which combined nail images of five fingers are printed.

In the present embodiment, when printing is performed on the nail chip sheet 7, the print controlling section 515 adjusts the position of the combined nail image of each finger so that five fingers from the thumb to the little finger of one hand can be printed on one nail chip sheet 7 and generates the print data (see FIG. 47).

The number of fingers of the combined nail images positioned on one nail chip sheet can be set in advance or can be set arbitrarily by the user according to the status of use. For example, the print data can be generated so that only the combined nail images of four fingers excluding the thumb is positioned on one nail chip sheet 7 or the print data can be generated by after the combined nail image is generated for all ten fingers of both hands, the combined nail image of ten fingers is provided on one nail chip sheet.

The display controlling section 516 is a display controlling section which displays various display on the display section 26 as the display section. In the present embodiment, the display controlling section 516 displays on the display section 26 the mode selection screen, the design confirmation screen, various instruction screens, and the like as described above.

The ROM 52 as a storage section which stores various programs such as a finger type detecting program which detects type of each finger from the finger image, a nail outline extracting program which extracts the outline of the nail section, an adjusted nail image generating program which generates an adjusted nail image in which the nail image of the other person (first person) is changed and adjusted to match the nail image of the corresponding nail section of the user (second person), a combined nail image generating program which combines the adjusted nail image with the outline of the nail section of the user (second person) to generate the combined nail image, a print data generating program which generates print data, a printing processing program which performs printing processing, etc. The above programs are executed by the controlling device 50 to centrally control each section of the nail print apparatus 1.

The RAM 53 which is a storage section of the present embodiment includes a storage area 531 which stores various data, etc. and a work area (not shown) to expand a program, etc. when the controlling section 51 performs various processing. The storage area 531 of the RAM 53 stores, for example the nail images Ga1 to Ga5 of the other person a (first person) obtained by the photographing section 30 and the nail images G1 to G5 of the user (second person) corresponded with the data of the finger type detected by the finger type detecting section 511 for the plurality of fingers. The RAM 53 stores data of the outlines Ra1 to Ra5, R1 to R5 of the nail section T extracted from the nail images Ga1 to Ga5, G1 to G5 by the nail outline extracting section 512 corresponded with the corresponding nail images Ga1 to Ga5, G1 to G5. When the adjusted nail image generating section 513 generates adjusted nail images Ia1 to Ia5 for each target finger U of the other person a (first person) the data of the adjusted nail images Ia1 to Ia5 is stored corresponded to each finger type of the other person a. When the combined nail image generating section 514 generates the combined nail images Ia1+R1 to Ia5+R5 for each finger, the data of the combined nail images Ia1+R1 to Ia5+R5 is stored corresponded to each finger type of the other person.

FIG. 30 is a diagram conceptually showing an example of a storage area 531 of the RAM 53.

FIG. 30 shows an example of storing data of the other person (first person) where data for four people of other person a to other person d is already obtained in the first field 531a, second field 531b, third field 531c and fourth field 531d. The data of the other person (first person) stored in the RAM 53 is not limited to data of four people. The number of pieces of data which can be stored in the RAM 53 is not limited, however, data can be deleted from the old data when data of the other person (first person) stored as history in the past reaches a certain number.

For example, data regarding the other person a of the first field 531a of FIG. 30 is described below.

In the item "nail image" of "fingertip of other person" of the first field 531a, the nail image of the finger of the other person a is stored for each finger type as thumb Ga1, index finger Ga2, middle finger Ga3, ring finger Ga4 and little finger Ga5. In the present embodiment, the finger number is applied to each finger and the thumb is 1, the index finger is 2, the middle finger is 3, the ring finger is 4 and the little finger is 5.

In the item "outline" of "fingertip of other person", the outline extracted from the nail images Ga1 to Ga5 of each finger is stored for each finger type as thumb Ra1, index finger Ra2, middle finger Ra3, ring finger Ra4, and little finger Ra5.

In the item "nail image" of "fingertip of oneself", the nail image of the user corresponding to each finger type of the other person a is stored for each finger type as thumb G1, index finger G2, middle finger G3, ring finger G4, and little finger G5.

In the item "outline" of "fingertip of oneself", the outline extracted from the nail images G1 to G5 of each finger is stored for each finger type as thumb R1, index finger R2, middle finger R3, ring finger R4, and little finger R5.

In the item "adjusted nail image", the adjusted nail images of the nail images Ga1 to Ga5 of each finger of the other person a adjusted to match the nail images G1 to G5 of the user are stored for each finger type as thumb Ia1, index finger Ia2, middle finger Ia3, ring finger Ia4, and little finger Ia5. As described above, the adjusted nail images Ia1 to Ia5 are images where the size, shape and printing position of the nail images Ga1 to Ga5 of each finger of the other person a are adjusted to match the nail images G1 to G5 of the user.

When the combined nail image is generated in the combined nail image generating section 514, the image data after combining is stored in the item "combined nail image". Here, as shown in item "combined nail image" shown in FIG. 30, the combined nail image is the adjusted nail images Ia1 to Ia5 for each finger of the other person a (first person) combined with the outlines R1 to R5 of the nail section T of the finger of the user corresponding to the adjusted nail images Ia1 to Ia5.

Already made design data can be stored in the storage area 531 of the ROM 53 and in this case, the user is able to select a design to be printed on the nail section of oneself from not only the nail image of the other person (first person) obtained by the photographing section 30 but also from already made design stored in the ROM 53. When the user selects a desired design from the already made design data stored in the storage area 531 of the ROM 53, the design data is stored in the storage area 531 of the RAM 53.

Next, the flow of the nail printing processing of the nail print apparatus 1 is described with reference to the flowchart of FIG. 31 to FIG. 33 and FIG. 36 to FIG. 48. In the example described below, the nail design applied on a nail section of the other person a (first person) such as a friend is printed on the nail section of the user (second person) or the nail chip sheet 7.

Figure 31:
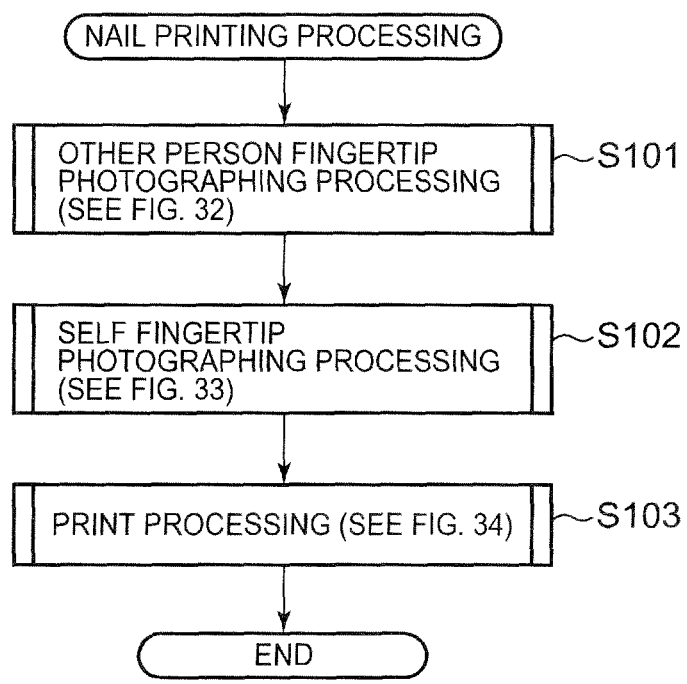
FIG. 31 is a flowchart showing a nail printing processing.

FIG. 31 conceptually shows the nail printing processing of the present embodiment.

As shown in FIG. 31, in the nail printing processing of the present embodiment, first, other person fingertip photographing processing (see FIG. 32) is performed (step S101) and then self fingertip photographing processing (see FIG. 33) is performed (step S102). When the nail image, etc. of the nail section of the other person such as a friend from which the user desires to copy the nail design is obtained by the other person fingertip photographing processing and the nail image, etc. of the nail section of the user is obtained by the self fingertip photographing processing, the printing processing (see FIG. 34) is performed and the nail image, etc. of the other person is printed on the nail section T of the user or the nail chip sheet (step S103).

It is presumed that the nail printing processing is typically performed in the order of the other person fingertip photographing processing (step S101, see FIG. 32), the self fingertip photographing processing (step S102, see FIG. 33), and printing processing (step S103, see FIG. 34), however, the self fingertip photographing processing can be performed first and then the other person fingertip photographing processing can be performed, and the order can be changed.

The self fingertip photographing processing (step S102, see FIG. 33) does not have to be performed each time printing is performed, and for example, can be performed once when the nail print apparatus 1 is first used. In this case, the data (see item "fingertip of oneself" of FIG. 30) of the nail section T of the user obtained by the self fingertip photographing processing can be stored in the storage section such as the RAM 53, etc. and the stored data can be used when printing is performed for the second time and after. When data already obtained is used, the time and trouble necessary for self fingertip photographing processing can be omitted in printing performed for the second time and after.

The other person fingertip photographing processing (step S101, see FIG. 32) does not have to be performed each time the printing is performed, and after data is imported in the storage section such as the RAM 53, etc., by simply selecting the desired other person (in FIG. 30, any one of the other person a to other person d), the nail design of the other person (first person) (for example, when the other person a is selected, the nail design of the nail image of the other person a) can be printed on the nail section T of the user or the nail chip sheet 7. After the data of the later described adjusted nail images Ia1 to Ia5 or the data of the combined nail images Ia1+R1 to Ia5+R5 is generated, by storing the above data for each other person (first person), when printing is performed later, the desired nail design can be printed easily and speedily by selecting the other person without performing the generating processing of the adjusted nail images Ia1 to Ia5 or the combined nail images Ia1+R1 to Ia5+R5 again.

Figure 32:
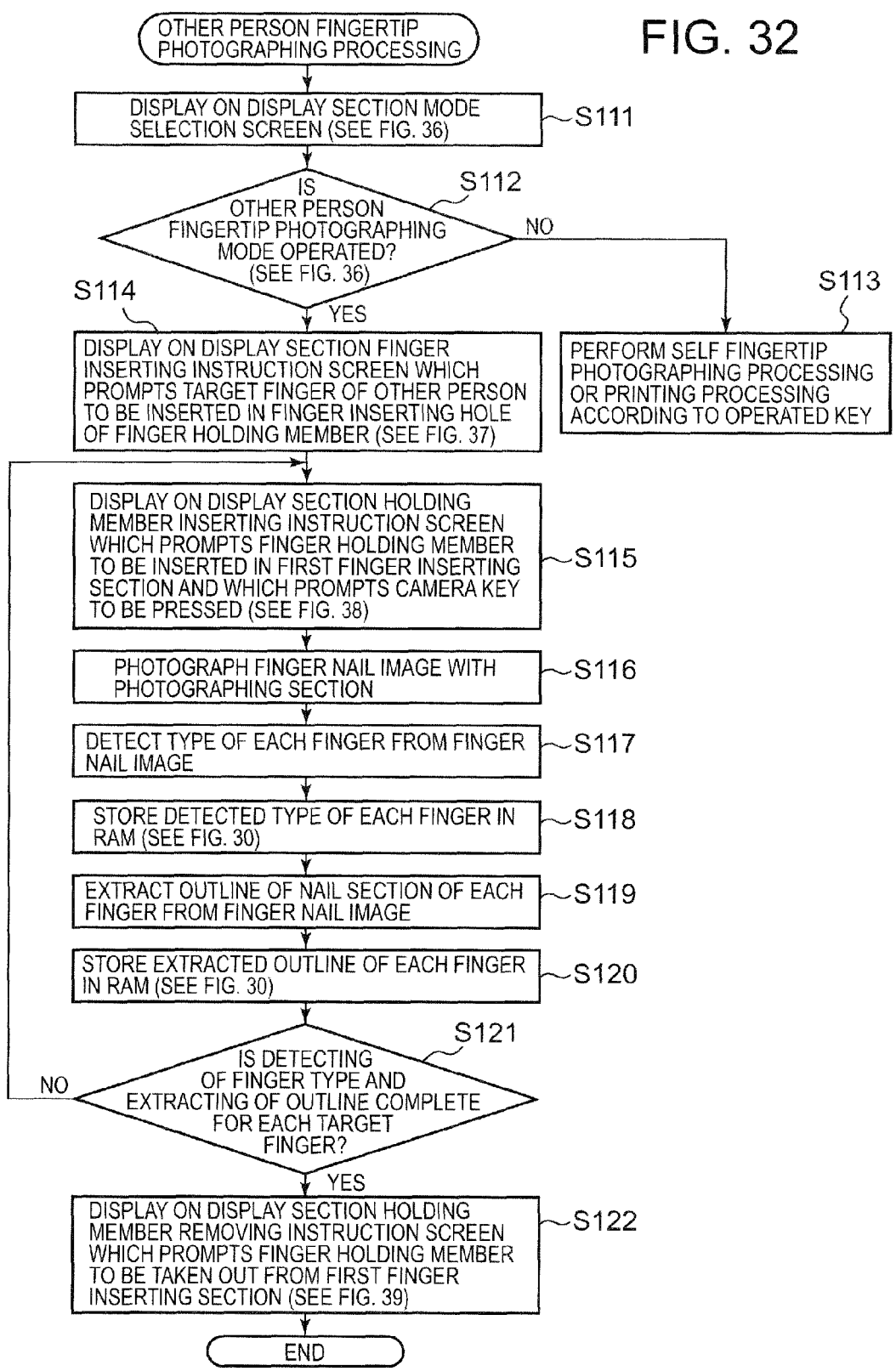
FIG. 32 is a flowchart showing an other person fingertip photographing processing.

FIG. 32 is a flow chart showing the other person fingertip photographing processing (step S101 shown in FIG. 31).

As shown in FIG. 32, in the other person fingertip photographing processing, first the controlling section 51 displays on the display section 26 the mode selection screen (see FIG. 36) (step S111), and judges whether or not the other person fingertip photographing mode key P1 is operated (step S112). When the other person fingertip photographing mode key P1 is not operated (step S112; NO), the self fingertip photographing processing (see FIG. 33) or the printing processing (see FIG. 34) is performed according to the operated key (step S113).

Figure 37:
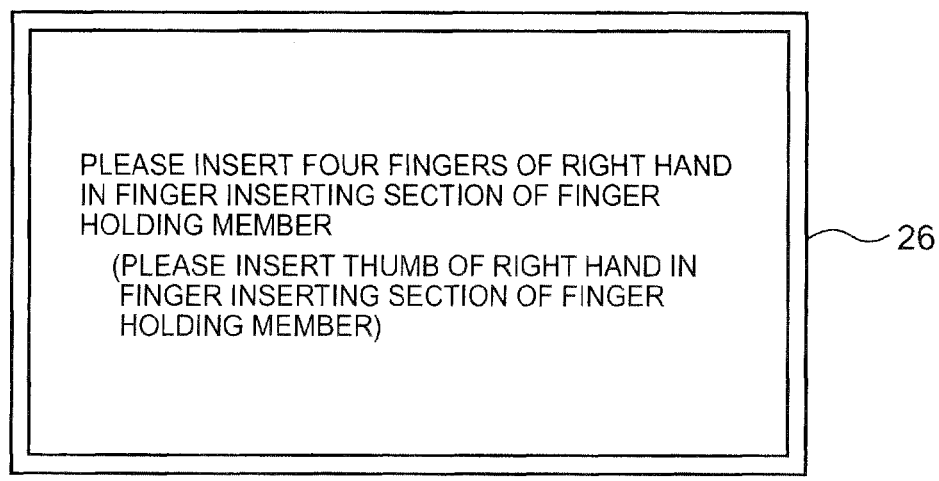
FIG. 37 is a diagram showing an example of a finger inserting instruction screen on the display section.
Figure 38:
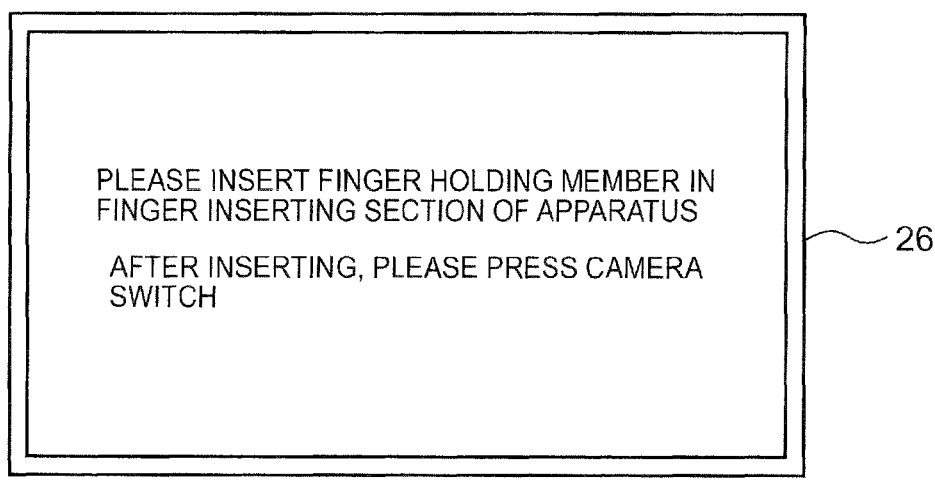
FIG. 38 is a diagram showing an example of a holding member inserting instruction screen on the display section.
Figure 39:
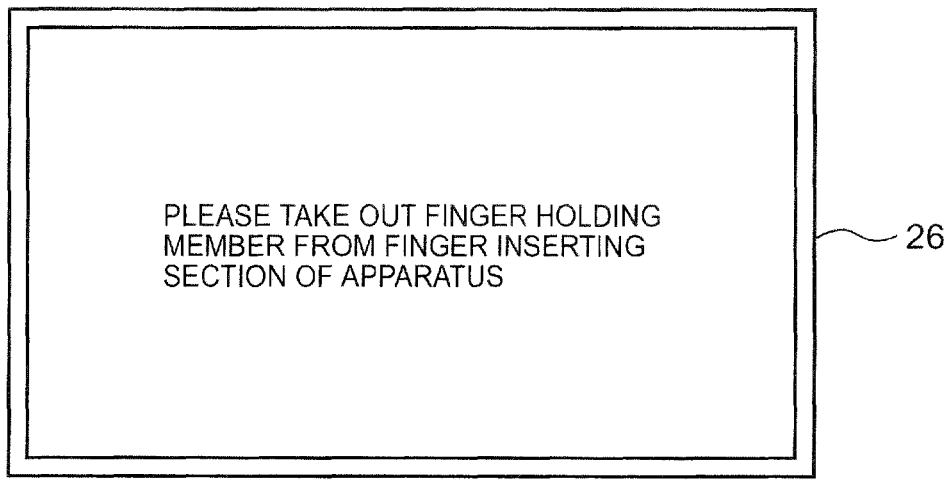
FIG. 39 is a diagram showing an example of a holding member removing instruction screen on the display section.
Figure 40:
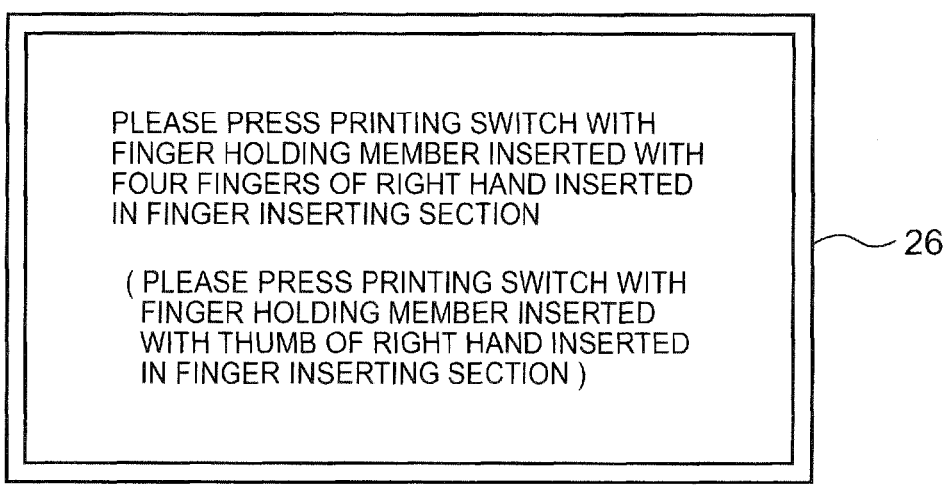
FIG. 40 is a diagram showing an example of a holding member inserting continuing instruction screen on the display section.

When the other person fingertip photographing mode key P1 is operated (step S112; YES), the finger inserting instruction screen (see FIG. 37) which prompts the target finger U of the other person a to be inserted in the finger inserting hole 61 of the finger holding member 6 is displayed on the display section 26 (step S114). FIG. 37 displays an instruction to insert the four fingers of the right hand or the thumb of the right hand, however the content of the display of the finger inserting instruction screen is not limited to this. For example, the screen can sequentially display instructions such as after the sequence of processing is finished for the four fingers of the right hand, an instruction to insert the thumb of the right hand is displayed, and after the processing of all fingers of the right hand is finished, similar instruction to insert the finger of the left hand is performed.

Then, in a state where the target finger U of the other person a is inserted in the finger inserting hole 61, the controlling section 51 displays on the display section 26 a holding member inserting instruction screen (see FIG. 38) to prompt the finger holding member 6 to be inserted in the first finger inserting section 20a and to instruct operation of the switch (camera key 25b) of the camera 32 after inserting (step S115).

When the finger holding member 6 is inserted in the first finger inserting section 20a (see FIG. 17 to FIG. 18), the nail section T of the target finger U of the other person a held by the finger holding member 6 is exposed from the nail section exposing hole 63, and is positioned below the photographing section 30 so as to be able to be photographed. The photographing of the finger image by the photographing section 30 is performed in this state where the target finger U of the other person a is held in the finger holding member 6 (step S116).

When the photographing of the finger image is performed by the photographing section 30, the finger type detecting section 511 detects the type of each finger from the finger image (step S117). The finger type detected by the finger type detecting section 511 is stored in the RAM 53 (see FIG. 30) (step S118).

The nail outline extracting section 512 extracts the outline (nail area) Ra1 to Ra5 of the nail section T from the nail images Ga1 to Ga5 of the nail section T included in the finger image (step S119). The outlines Ra1 to Ra5 of the nail section T extracted by the nail outline extracting section 512 is corresponded with the "finger type" and the "nail images Ga1 to Ga5" and is stored as the "outlines Ra1 to Ra5" in the RAM 53 (see FIG. 30) (step S120).

The controlling section 51 constantly judges whether or not the detecting of the finger type and the extracting of the outlines Ra1 to Ra5 of the nail section T is complete for all target fingers U (step S121), and when it is not complete (step S121; NO), the processing of step S115 to step S120 is repeated. When the controlling section 51 judges that the detecting of finger type and the extracting of outlines Ra1 to Ra5 of the nail section T is complete for all target fingers U (step S121; YES), the controlling section 51 displays on the display section 26 a holding member removing instruction screen (see FIG. 39) to prompt the finger holding member 6 to be taken out from the first finger inserting section 20a (step S122). With this, the other person fingertip photographing processing (step S101 of FIG. 31) ends.

Figure 33:
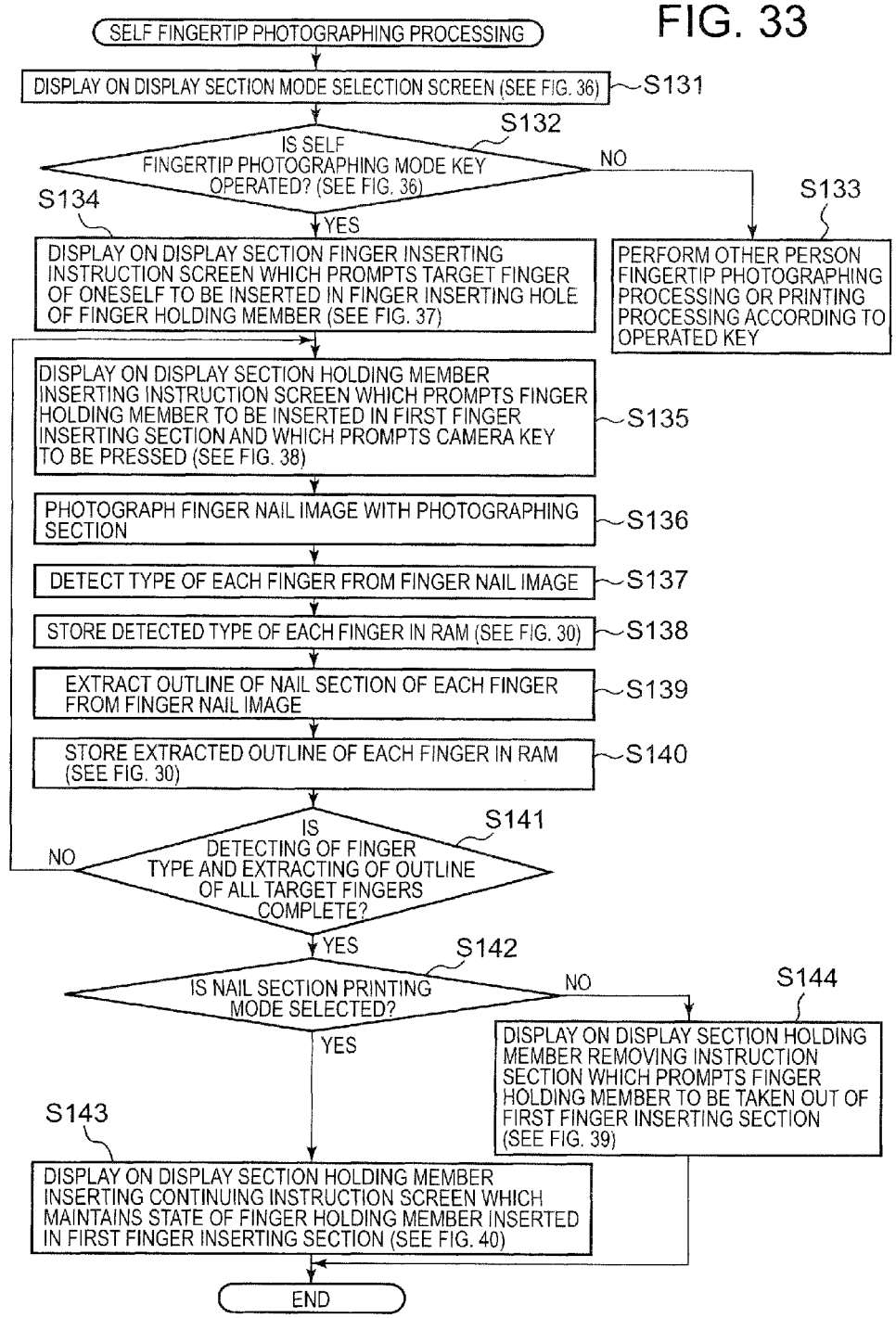
FIG. 33 is a flowchart showing a self fingertip photographing processing.

FIG. 33 is a flowchart showing the self fingertip photographing processing (step S102 of FIG. 31).

As shown in FIG. 33, in the self fingertip photographing processing, first, the controlling section 51 displays on the display section 26 the mode selection screen (see FIG. 36) (step S131), and judges whether or not the self fingertip photographing mode key P2 is operated (step S132). When the self fingertip photographing mode key P2 is not operated (step S132; NO), the other person fingertip photographing processing (see FIG. 32) or the printing processing (see FIG. 34 to FIG. 35) is performed according to the operated key (step S133).

When the self fingertip photographing mode key P2 is operated (step S132; YES), the finger inserting instruction screen (see FIG. 37) which prompts the target finger U of the user to be inserted in the finger inserting hole 61 of the finger holding member 6 is displayed on the display section 26 (step S134). The finger inserting instruction screen is similar to the screen shown in the other person fingertip photographing processing, and therefore the description is omitted.

Then, in a state where the target finger U of the user is inserted in the finger inserting hole 61, the controlling section 51 displays on the display section 26 a holding member inserting instruction screen (see FIG. 38) to prompt the finger holding member 6 to be inserted in the first finger inserting section 20a and to instruct operation of the switch (camera key 25b) of the camera 32 after inserting (step S135).

As shown in FIG. 17 to FIG. 18, when the finger holding member 6 is inserted in the first finger inserting section 20a, the nail section T of the target finger U of the user held by the finger holding member 6 is exposed from the nail section exposing hole 63, and is positioned below the photographing section 30 so as to be able to be photographed. The photographing of the finger image by the photographing section 30 is performed in this state where the target finger U of the user is held in the finger holding member 6 (step S136).

When the photographing of the finger image is performed by the photographing section 30, the finger type detecting section 511 detects the type of each finger from the finger image (step S137). The finger type detected by the finger type detecting section 511 is stored in the RAM 53 (see FIG. 30) (step S138).

The nail outline extracting section 512 extracts the outline (nail area) R1 to R5 of the nail section T from the nail images G1 to G5 of the nail section T included in the finger image (step S139). The outlines R1 to R5 of the nail section T extracted by the nail outline extracting section 512 is corresponded with the "finger type" and the "nail images G1 to G5" and is stored as the "outlines R1 to R5" in the RAM 53 (see FIG. 30) (step S140).

The controlling section 51 constantly judges whether or not the detecting of the finger type and the extracting of the outlines R1 to R5 of the nail section T is complete for all target fingers U (step S141), and when it is not complete (step S141; NO), the processing of step S135 to step S140 is repeated.

When the controlling section 51 judges that the detecting of finger type and the extracting of outlines R1 to R5 of the nail section T is complete for all target fingers U (step S141; YES), as shown in FIG. 36, the controlling section 51 judges as the printing processing, whether or not the mode to print directly on the nail section of the user (in other words, the nail section printing mode) is selected (step S142). When the nail section printing mode is selected (step S142; YES), the holding member inserting continuing instruction screen (see FIG. 40) which prompts the state of the finger holding member 6 inserted in the first finger inserting section 20a to be continued is displayed on the display section 26 (step S143). In this case, the state where the user allows the target finger U to be held in the finger holding member 6 inserted in the first finger inserting section 20a is continued, and the processing can advance to the printing processing (see step S156 and after shown in FIG. 34) on the nail section T as is.

When the nail section printing mode is not selected as the printing processing (step S142; NO, in other words, when the sheet printing mode which prints on the nail chip sheet 7 is selected), the controlling section 51 displays on the display section 26 the holding member removing instruction screen (see FIG. 39) to prompt the finger holding member 6 to be taken out from the first finger inserting section 20a (step S144). With this, the self fingertip photographing processing (step S102 of FIG. 33) ends.

Figure 34:
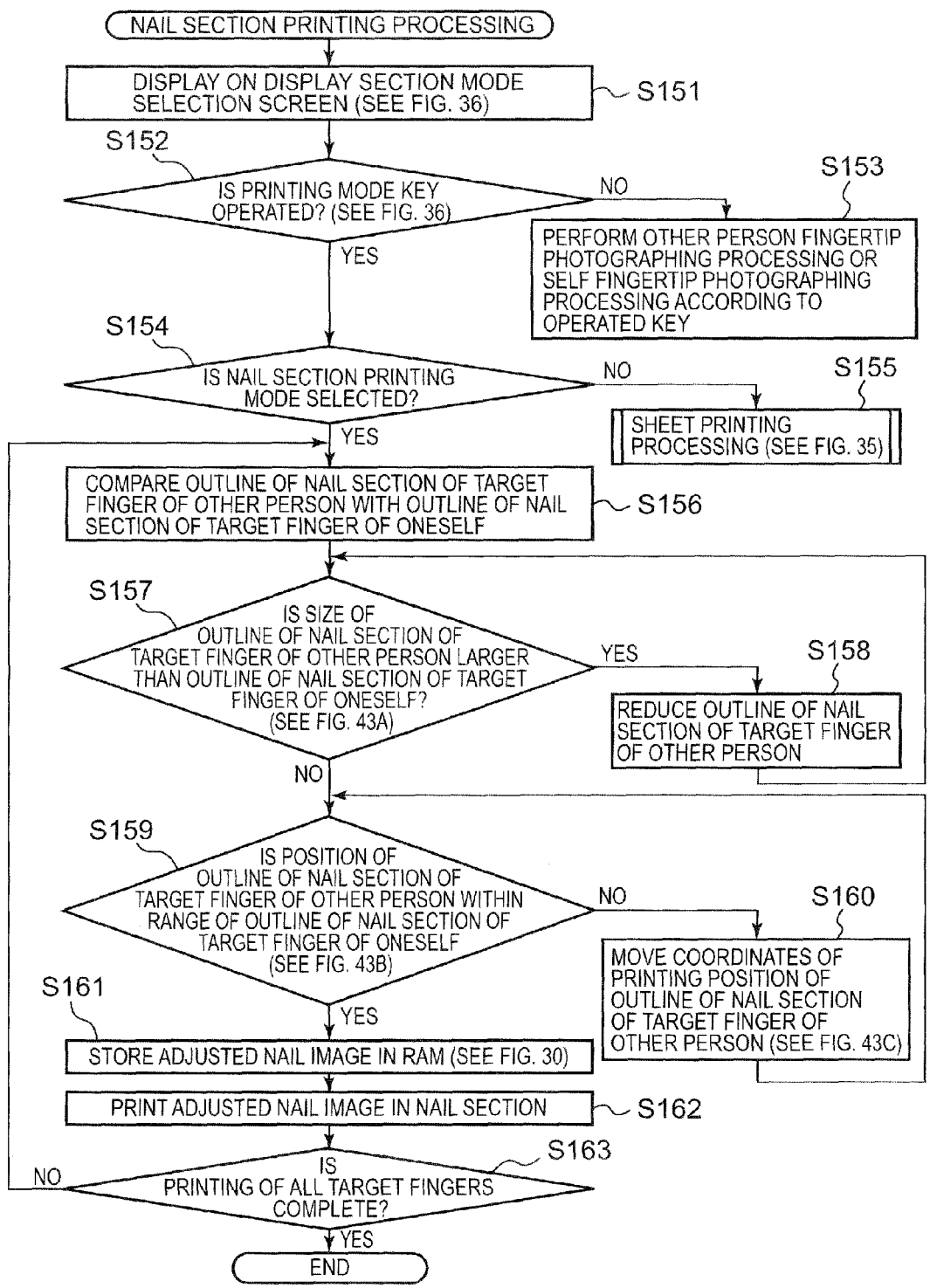
FIG. 34 is a flowchart of a nail section printing processing.

FIG. 34 is a flowchart showing a printing processing (step S103 of FIG. 31) when the mode to print directly on the nail section T of the user (nail section printing mode) is selected.

As shown in FIG. 34, in the printing processing, first, the controlling section 51 displays on the display section 26 the mode selection screen (see FIG. 36) (step S151), and judges whether or not the printing mode key P3 is operated (step S152). When the printing mode key P3 is not operated (step S152; NO), the other person fingertip photographing processing (see FIG. 32) or the self fingertip photographing processing (see FIG. 33) is performed according to the operated key (step S153).

When the printing mode key P3 is operated (step S152; YES), it is judged whether or not the nail section printing mode is selected as the printing mode (step S154), and when the nail section printing mode is not selected (step S154; NO), the sheet printing processing (see FIG. 38 and FIG. 35) is performed (step S155). When the nail section printing mode is selected (step S154; YES), the nail section printing processing is performed and the nail images Ga1 to Ga5 of the nail section of each target finger U of the other person a stored in the RAM 53 are printed on the nail sections T1 to T5 of each corresponding target finger U of the user. Below, the nail section printing processing is described specifically with reference to FIG. 41 to FIG. 44.

Here, it is assumed that the plurality of nail sections T1 to T5 composing the nail section T of the other person a are a size and shape as shown in FIG. 41 and the plurality of nail sections T1 to T5 are applied with nail designs D1 to D5 with a different shape (in other words, design D1 of a "large heart" on the nail section T1 of the thumb, design D2 of a "face" on the nail section T2 of the index finger, design D3 of a "sun" on the nail section T3 of the middle finger, design D4 of a "moon" on the nail section T4 of the ring finger, and design D5 of a "heart small" on the nail section T5 of the little finger) whereas the plurality of nail sections T1 to T5 composing the nail section T of the user is a size and shape as shown in FIG. 42 and the plurality of nail sections T1 to T5 are not applied with any nail designs.

In the nail section printing processing, processing of matching the nail images Ga1 to Ga5 of the other person a to the outlines G1 to G5 of the nail section of the user is performed by a processing shown in for example, FIG. 43A to FIG. 43D. FIG. 43A to FIG. 43D illustrates a processing of the index finger, however, the same can be said for the other fingers.

In the nail section printing processing, first, the outlines Ra1 to Ra5 of the finger section T of the target finger U of the other person a (first person) is compared with the outlines R1 to R5 of the nail section T of the target finger U of the user (second person) (step S156, see FIG. 43A). Then, the adjusted nail image generating section 513 judges whether or not the size of the outlines Ra1 to Ra5 of the nail section T of the other person a is larger than the size of the outlines R1 to R5 of the nail section T of the user (step S157) and when the size is larger (step S157; YES), the entire size of the nail images Ga1 to Ga5 of the other person a is reduced so that the outlines Ra1 to Ra5 of the nail section T of the other person a is within the outlines R1 to R5 of the nail section T of the user (step S158, see FIG. 43B). The adjusted nail image generating section 513 repeats the judging of step S157 and the reducing processing of step S158 until the outlines Ra1 to Ra5 of each nail section T of the other person a and the nail designs D1 to D5 are within the range of the outlines R1 to R5 of each nail section T of the user.

When it is judged that the size of the outlines Ra1 to Ra5 of the nail section T of the other person a is the same or smaller than the size of the outlines R1 to R5 of the nail section T of the user (step S157; NO), the adjusted nail image generating section 513 judges whether or not the position of the outlines Ra1 to Ra5 of the nail section T of the other person a is within the range of the outlines R1 to R5 of the nail section T of the user (step S159). When it is judged that the position of the outlines Ra1 to Ra5 of the nail section T of the other person a is not within the range of the outlines R1 to R5 of the nail section T of the user (step S159; NO, see FIG. 43B), the adjusted nail image generating section 513 moves the coordinates of the printing position of the outlines Ra1 to Ra5 of the nail section T of the other person a (step S160, see FIG. 43C), and repeats the judging of step S159 and moving processing of step S160 until the position of the outlines Ra1 to Ra5 of the nail section T of the other person a is within the range of the outlines R1 to R5 of the nail section T of the user.

When it is judged that the position of the outlines Ra1 to Ra5 of the nail section T of the other person a is within the range of the outlines R1 to R5 of the nail section T of the user (step S159; YES, (see FIG. 43D)) the adjusted nail image generating section 513 stores the adjusted nail images Ia1 to Ia5 including the nail designs D1 to D5 after adjustment in the RAM 53 (step S161).

When the adjusted nail images Ia1 to Ia5 are generated, the print controlling section 515 controls the printing section 40, and as shown in FIG. 43D, to print the adjusted nail images Ia1 to Ia5 including the nail designs D1 to D5 of the other person on the corresponding nail section T of the finger of the user (step S162).

The controlling section 51 constantly judges whether or not the printing is complete regarding the nail section T of all of the target fingers U (step S163) and when the printing is not complete (step S163; NO), repeats the processing of step S156 to step S162. When it is judged that the printing of all of the target fingers U is complete (step S163; YES), the printing processing on the nail section T ends.

According to the present embodiment, as shown in FIG. 44, the adjusted nail images Ia1 to Ia5 including the nail designs D1 to D5 of the other person can be printed on the plurality of nail sections T1 to T5 composing the nail section T of the user. Therefore, the nail design applied on the nail section T of the other person (celebrities, friends, etc.) can be speedily and easily printed as is on the nail section T of the user with a simple method.

Figure 35:
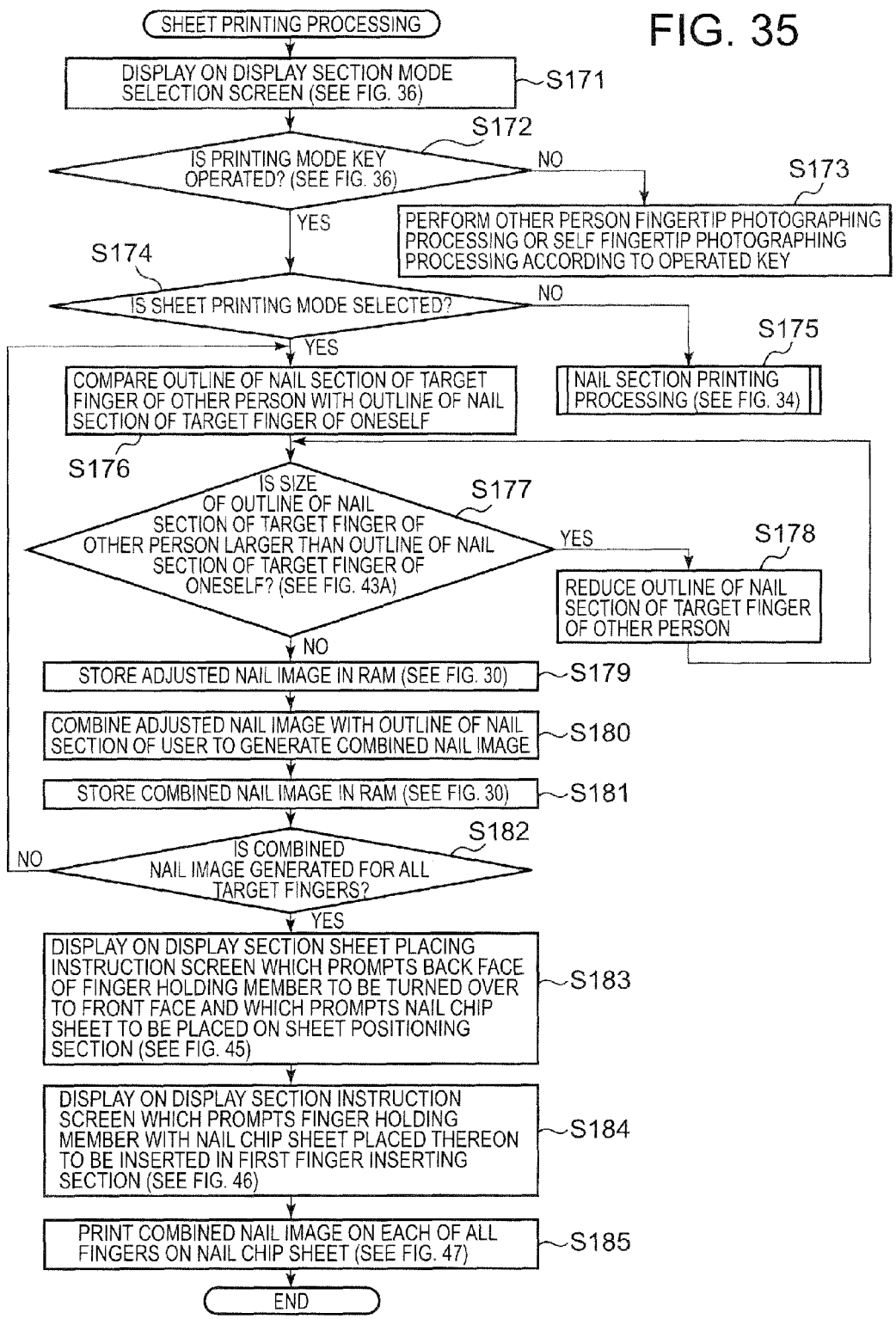
FIG. 35 is a flowchart of a sheet printing processing.

FIG. 35 is a flowchart showing a printing processing (step S103 shown in FIG. 33) when a mode which prints on a nail chip sheet 7 (sheet printing mode) is selected. The printing processing is a processing to print on the nail chip sheet the nail images Ga1 to Ga5 of the nail section T of the target fingers U of the other person a stored in the RAM 53 to match the outlines R1 to R5 of the nail section T of each corresponding target finger U of the user. The processing from step S171 to step S177 is similar to the processing from step S151 to step S157 shown in FIG. 34, and therefore the description is omitted.

As a result of the adjusted nail image generating section 513 judging whether or not the size of the outlines Ra1 to Ra5 of T is larger than the size of the outlines R1 to R5 of the nail section T of the user (step S177), when the adjusted nail image generating section 513 judges that the size of the outlines Ra1 to Ra5 of the nail section T is the same or smaller than the size of the outlines R1 to R5 of the nail section T of the user (step S177; NO), the adjusted nail image generating section 513 stores the adjusted nail images Ia1 to Ia5 after adjustment in the RAM 53 (step S179).

When the adjusted nail images Ia1 to Ia5 are generated, the combined nail image generating section 514 combines the adjusted nail images Ia1 to Ia5 to the outlines R1 to R5 of the nail section T of the corresponding target finger U of the user and generates the combined nail images Ia1+R1 to Ia5+R5 (step S180). Then, the combined nail image generating section 514 stores the generated combined nail images Ia1+R1 to Ia5+R5 in the RAM 53 (step S181).

As shown in FIG. 35, when printing is performed on the nail chip sheet 7, the controlling section 51 displays on the display section 26 a sheet placing instruction screen (see FIG. 45) which prompts the finger holding member 6 to be turned over and the nail chip sheet 7 to be placed on the sheet positioning section 65 (step S183). The controlling section 51 also displays on the display section 26 a holding member reinserting instruction screen (see FIG. 46) which prompts the finger holding member 6 to be inserted in the first finger inserting section 20*a* in a state with the nail chip sheet 7 placed (step S184).

When the holding member reinserting instruction screen (see FIG. 46) is displayed, as shown in FIG. 22, the user turns over the finger holding member 6 and places the nail chip sheet 7 on the sheet positioning section 65. Then, the finger holding member 6 is inserted in the first finger inserting section 20*a* again so that the sheet positioning section 65 on which the nail chip sheet 7 is placed faces up. FIG. 23 shows a state of the finger holding member 6 inserted in the first finger inserting section 20*a* in a state where the nail chip sheet 7 is placed on the sheet positioning section 65. As shown in FIG. 23, when the finger holding member 6 is inserted in the first finger inserting section 20*a* with the nail chip sheet 7 placed on the sheet positioning section 65, the nail chip sheet 7 is positioned below the printing section 40 and is in a printable state.

Then, the combined nail images (Ia1+R1 to Ia5+R5) are printed for all of each finger on the nail chip sheet 7 (step S185, see FIG. 47). With this, the printing processing on the nail chip sheet 7 ends.

Figure 48:
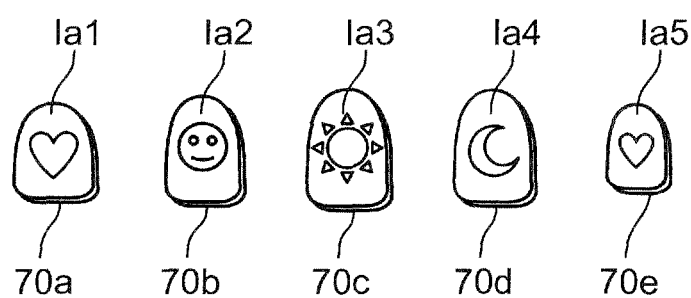
FIG. 48 is a diagram showing a nail chip for five nails separated from the nail chip sheet shown in FIG. 47.

After the printing processing ends, each nail chip 70 is cut with scissors, cutting knife, etc. along the outlines R1 to R5 of the nail section T printed on the nail chip sheet 7. With this, nail chips 70*a* to 70*e* for each finger as shown in FIG. 48 can be formed, and the peeling layer 73 of each nail chip 70 can be peeled off and each nail chip 70 can be attached to the nail section T of the corresponding target finger U.

According to the above described embodiment, the finger image including nail images Ga1 to Ga5 of a plurality of nail sections T of the other person (first person) such as friends, family, etc. and the finger image including nail images G1 to G5 of a plurality of nail sections T of the user (second person) are obtained by the photographing section 30, type of each finger is detected from the obtained finger image of each finger, the detected finger type is corresponded to the nail images Ga1 to Ga5, G1 to G5 of the nail section T and stored for each person in the RAM 53. Then, the nail images Ga1 to Ga5 of the other person (first person) stored in the RAM 53 are adjusted to match the nail images G1 to G5 of the corresponding target finger U of the user and the adjusted nail images Ia1 to Ia5 are generated. The adjusted nail images Ia1 to Ia5 are printed on the nail sections T1 to T5 of the corresponding target fingers U1 to U5 of the user (second person).

With this, the nail design of the other person which the user desires to copy can be easily matched to the shape of the nail section T of the user and the nail design can be printed on the nail section T of the user, and the user can easily enjoy excellent nail art without performing troublesome setting, operation, etc.

The adjusted nail images Ia1 to Ia5 can be combined with the outlines R1 to R5 of the nail sections T1 to T5 of the user (second person) to generate combined nail images Ia1+R1 to Ia5+R5 and the combined nail images Ia1+R1 to Ia5+R5 can be printed on the nail chip sheet 7.

Therefore, the nail design of the other person which the user desires to copy can be easily printed on the nail chip 70 which matches the shape of the nail section T of the user, and the user can easily enjoy excellent nail art without the trouble of ink attaching directly to the hands and fingers of the user.

Moreover, the outlines of the nail section T is extracted from the nail images Ga1 to Ga5 of the nail section T of the other person (first person) and the nail images G1 to G5 of the nail section of the user (second person), and when the size of the extracted outlines Ra1 to Ra5 of the nail section T of the other person (first person) is larger than the size of the outlines R1 to R5 of the nail section T of the user (second person), the size of the entire nail image of the other person (first person) is reduced so that the outlines Ra1 to Ra5 of the nail section of the other person (first person) is within the outlines R1 to R5 of the nail section T of the user (second person) to generate the adjusted nail images Ia1 to Ia5. Therefore, even when the nail section T of the other person (first person) is larger than that of the user (second person), the size can be adjusted so that the nail design is not outside the nail section T and the nail design with a suitable size can be printed on the nail section T of the user.

Third Embodiment

Next, the third embodiment of the nail print apparatus of the present embodiment is described with reference to FIG. 49. The present embodiment is different from the second embodiment regarding only the configuration of the first image obtaining section which obtains a finger image including a nail image of the nail section of the other person (first person). Therefore, the points different from the second embodiment are described below.

Figure 49:
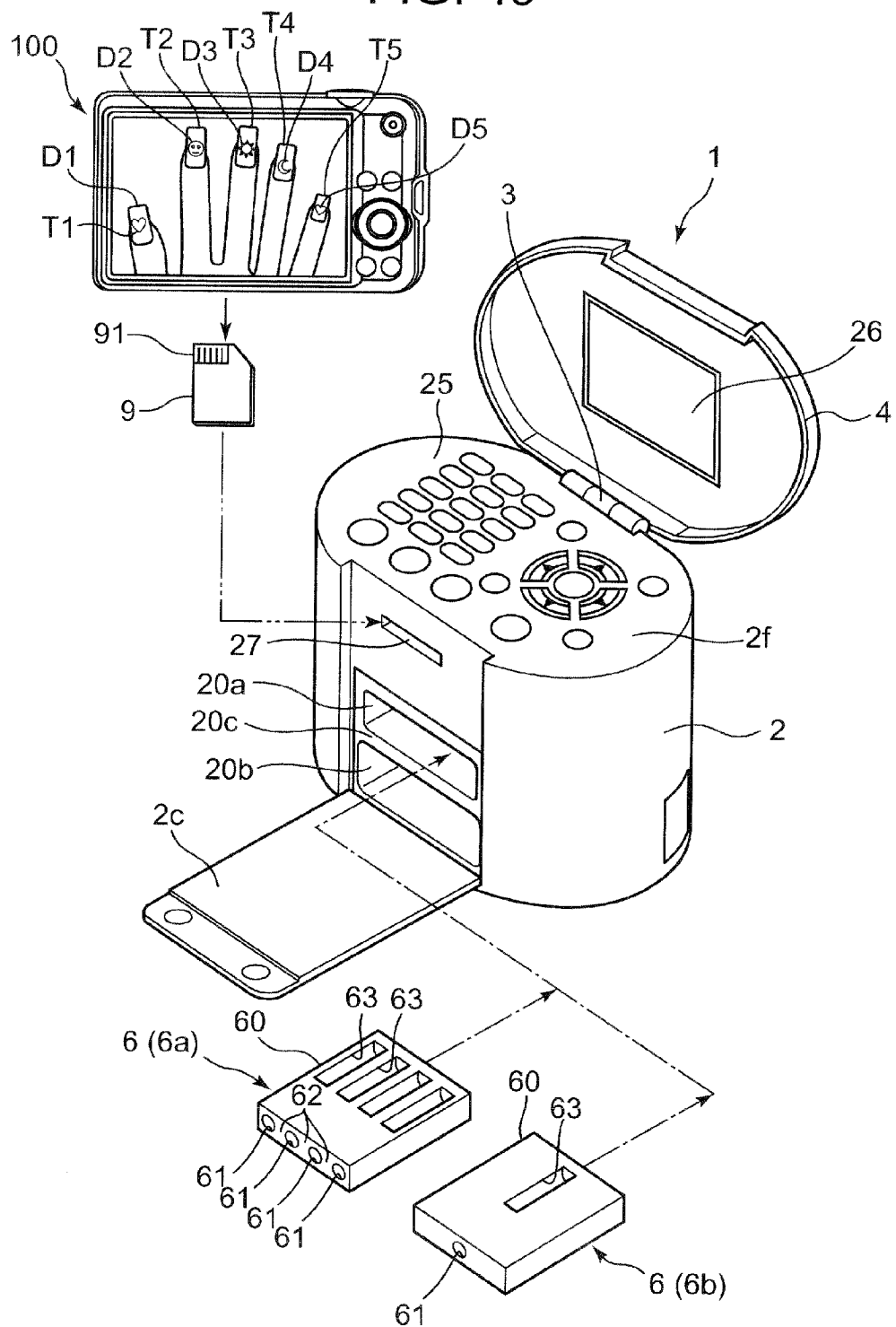
FIG. 49 is a conceptual perspective view of a third embodiment of the nail print apparatus of the present invention in a state where a cover is open.
Figure 50:
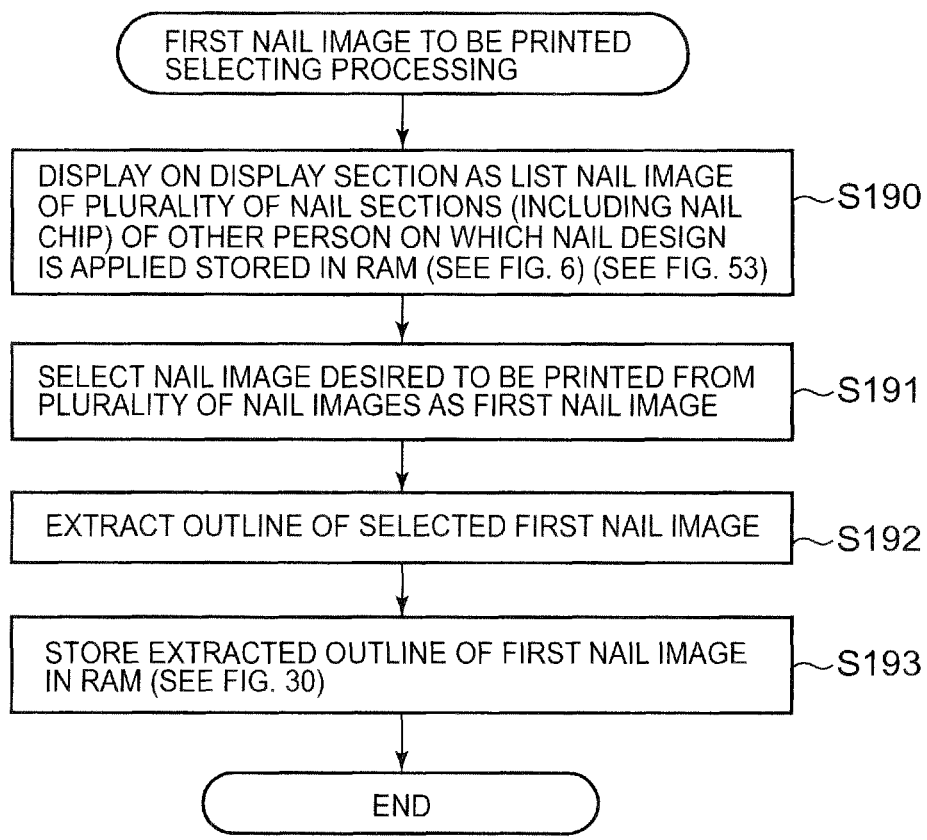
FIG. 50 is a flowchart of a first nail image selecting processing.

FIG. 49 is a perspective view showing an outer appearance of a nail print apparatus of the present embodiment.

In the present embodiment, a medium inserting opening 27 in which a storage medium 9 such as a memory card, etc. can be inserted from outside is provided on the upper section of the case main body 2 of the nail print apparatus. The print apparatus main body 10 included inside the case main body 2 is provided with a connecting section (not illustrated) which can be connected to a terminal section 91 of the storage medium 9 inserted in the medium inserting opening 27 in a position corresponding to the medium inserting opening 27. The connecting section is connected to the controlling device 50, and when the storage medium 9 is inserted from the medium inserting opening 27, and the terminal section 91 is connected to the connecting section of the print apparatus main body 10, the data stored in the storage medium 9 is sent to the controlling section 51 of the controlling device 50 through the connecting section.

In the present embodiment, as shown in FIG. 49, the finger image includes a nail image of the nail section T of the other person (first person) photographed by the digital camera 100, and the storage medium 9 in which the photographed finger image is stored is inserted in the medium inserting opening 27 of the nail print apparatus. The controlling section 51 obtains the data stored in the storage medium 9 and functions as a first image obtaining section which obtains a finger image including the nail image of the nail section T of the other person (first person).

The finger image including the nail image of the nail section T of the other person (first person) obtained by the controlling section 51 is stored in the storage section inside the nail print apparatus such as the RAM 53, etc. Similar to the second embodiment, the finger type detecting section 511 detects the type of each finger based on the finger image. Moreover, the nail outline extracting section 512 extracts the outline of the nail section T from the nail image of the nail section T.

The nail image of the nail section T of the other person (first person) obtained by the control section 51, the finger type detected by the finger type detecting section 511, and the outline of the nail section T extracted by the nail outline extracting section 512 are stored corresponded for each finger in the item "fingertip of other person" (see FIG. 30) of the RAM.

When the user attempts to print the nail image of the nail section T of the other person obtained from the storage medium 9 on the nail section T of oneself or the nail chip sheet, similar to the second embodiment, the adjusted nail image generating section 513 adjusts the nail image of the other person (first person) stored in the storage section such as the RAM 53, etc. to match the nail image of the target finger U corresponding to the user (second person) to generate the adjusted nail image (see FIG. 32). When printing is performed on the nail chip sheet, the combined nail image generating section 514 combines the adjusted nail image of the other person (first person) with the outline of the nail section T of the user (second person) to generate the combined nail image.

The other configuration is similar to those described in the second embodiment, therefore the same reference numerals are applied to the same members and the description is omitted.

Next, the print controlling method of the present embodiment is described.

When the nail designs D1 to D5 of the other person (first person) which the user desires to copy is applied on the plurality of nail sections T1 to T5 which compose the nail section T, the hands and fingers of the other person is photographed by the digital camera 100, and the finger image including the nail image of the nail section T of the other person (first person) is obtained. The photographed finger image of the other person is stored in the storage medium 9 of the digital camera 100.

The user removes the storage medium 9 from the digital camera 100 and inserts the storage medium 9 into the medium inserting opening 27 of the nail print apparatus. With this, the connecting section is connected to the terminal section 91 of the storage medium 9, and the image data stored in the storage medium 9 is sent to the controlling section 51 and obtained.

The finger image of the other person obtained by the controlling section 51 is used to detect the type of each finger by the finger type detecting section 511 and to extract the outline of the nail section T from the nail image of the nail section T by the nail outline extracting section 512 and the above is corresponded to the nail image of each nail section T and stored in the item "fingertip of other person" of the storage section such as the RAM, etc.

The user obtains the finger image including the nail image of the nail section T of the user using the photographing section 30 in the self fingertip photographing processing (see FIG. 33).

The finger image obtained by the user is used to detect the type of each finger by the finger type detecting section 511 and to extract the outline of the nail section T from the nail image of the nail section T by the nail outline extracting section 512, and the above is corresponded to the nail image of each nail section T and stored in the item "fingertip of oneself" of the storage section such as the RAM, etc.

When the user performs the printing processing of the nail design of the other person on the nail of oneself, the adjusted nail image generating section 513 adjusts the nail image of the other person (first person) stored in the item "fingertip of other person" of the storage section to match the nail image of the corresponding target finger U of the user (second person) to generate the adjusted nail image (see FIG. 30). Then, the adjusted nail image is printed on the nail section of the user.

When the user performs printing processing of the nail design of the other person on the nail chip sheet, after the adjusted nail image generating section 513 generates the adjusted nail image (see FIG. 30), the combined nail image generating section 514 combines the adjusted nail image with the outline of the nail section of the user and generates the combined nail image. Then, the combined nail image is printed on the nail section of the user.

The other specific content of processing is similar to that of the second embodiment, therefore the description is omitted.

According to the present embodiment, the finger image including the nail image of the nail section T of the other person (first person) photographed with a digital camera 100 can be used to print a design similar to the nail designs D1 to D5 applied on the nail section of the other person on the nail section of the user (second person) as described in FIG. 44.

With this, when the finger image cannot be photographed by a nail print apparatus, such as when the other person from which the user desires to copy a nail design is a celebrity or is a person introduced in a magazine, by simply photographing the finger image with the digital camera, the nail design of the other person can be easily matched to the shape of the nail section T of oneself and printed on the nail section T of the user. Therefore, the user can easily enjoy excellent nail art without troublesome setting, operation, etc.

The adjusted nail image can be combined with the outline of the nail section T of the user (second person) to generate the combined nail image and the combined nail image can be printed on the nail chip sheet 7.

Therefore, the nail design of the other person which the user desires to copy can be easily printed on the nail chip 70 which matches the shape of the nail section T of oneself, and the user can easily enjoy excellent nail art without the trouble of ink attaching directly to the hands and fingers of the user.

Moreover, the outline of the nail section is extracted from the nail image of the nail section of the other person (first person) and the nail image of the nail section of the user (second person), and when the size of the extracted outline of the nail section of the other person (first person) is larger than the size of the outline of the nail section of the user (second person), the size of the entire nail image of the other person (first person) is reduced so that the outline of the nail section of the other person (first person) is within the outline of the nail section of the user (second person) to generate the adjusted nail images. Therefore, even when the nail section of the other person (first person) is larger than that of the user (second person), the size can be adjusted so that the nail design is not outside the nail section T and the nail design with a suitable size can be printed on the nail section T of oneself.

According to the present embodiment, the photographed finger image including the nail image of the nail section of the other person (first person) is used to print the design similar to the nail design applied on the nail section of the other person on the nail section of the user (second person), however, the finger image including the nail image of the nail section of oneself photographed in the past can be used to print a design similar to the nail design applied on the nail section of oneself in the past on the nail section of oneself (second person) in the present.

In the present embodiment, after the finger image, etc. of the other person or oneself in the past is obtained using a digital camera 100, etc., the nail design applied on the nail section of the other person or oneself in the past can be printed on the nail section of oneself in the present or the nail chip sheet. However, by using the finger image of the other person or oneself in the past prepared or stored in advance, the nail design applied on the nail section of the other person (including nail chip) or oneself in the past can be printed on the nail section of oneself in the present or the nail chip sheet without obtaining the finger image of the other person or oneself in the past.

In this case, for example, first, the user selects the nail design to be printed on the nail section of the user from the finger image of the other person (including nail chip) or oneself in the past prepared or stored in advance (processing of selecting the first nail image (see nail images Ga1 to Ga5 shown in FIG. 30, etc.) to be printed).

Figure 53:
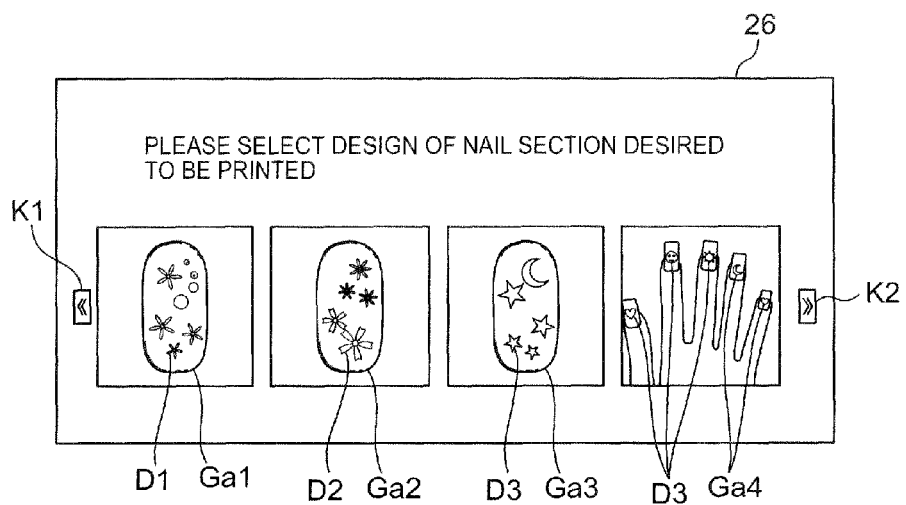
FIG. 53 is a diagram showing an example of a design selection screen on the display section.

Specifically, as shown in FIG. 53, the finger images which include nail images Ga1 to Ga4 of the plurality of nail sections of the other person (including nail chip) or the nail section of oneself in the past on which the nail design is applied and which are stored in the RAM 53 (see FIG. 30) which is an image storage section are displayed as a list on the display section 26 (step S190, see FIG. 53). When the number of images stored is too large to be displayed on the display section 26, the images can be displayed so as to be displayed sequentially on the display screen by scrolling the screen left and right with operation of the left and right cursor keys K1 and K2 on the operation section 25.

The user uses the operation section 25, etc. to select one of the nail images Ga1 to Ga4 including the desired nail design D1 to D4 which the user desires to print on the nail section of oneself from the finger images including the plurality of nail images Ga1 to Ga4 displayed on the display section 26. When one of the nail images Ga1 to Ga4 is selected, the selected nail image Ga1 to Ga4 is selected as the first nail image (for example, nail image Ga1) to be printed (step S191). When the first nail image Ga1 is selected, the nail outline extracting section 512 of the controlling section 51 extracts the outline of the first nail image Ga1 (step S192) and stores the extracted outline of the first nail image Ga1 in the RAM 53 (step S193).

Next, processing is performed to obtain the nail image (see nail image G1 to G5 shown in FIG. 32, etc.) of the second nail section (in other words, the nail section of the user) on which printing is to be performed.

Figure 51:
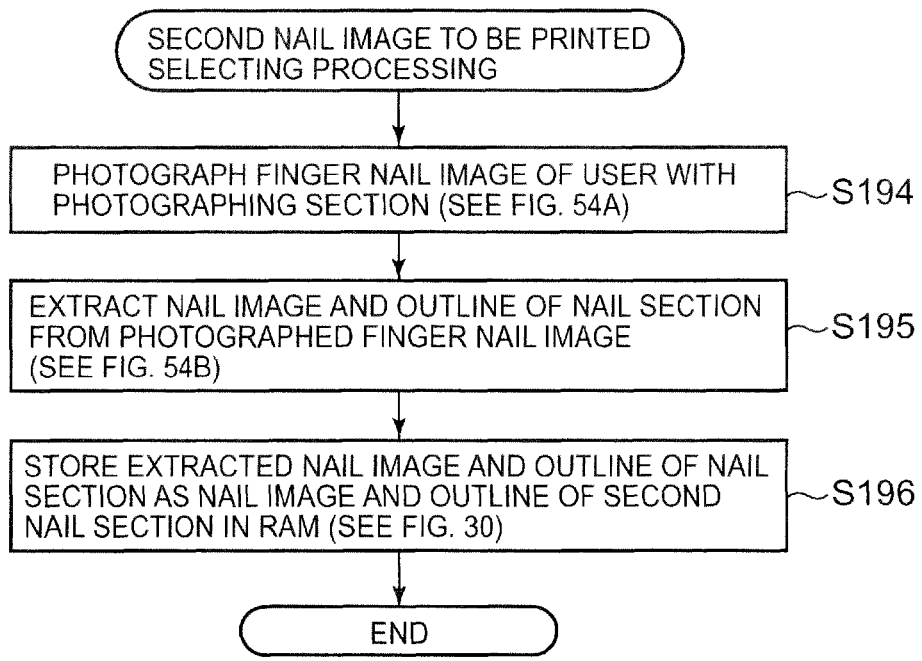
FIG. 51 is a flowchart showing a second nail section image obtaining processing.
Figures 54A, 54B, 54C, 54D, 54E:
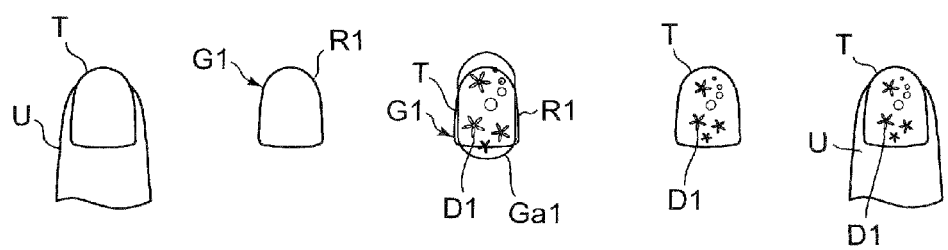
FIG. 54A is a diagram showing an example of a finger image of a user.
FIG. 54B is a diagram showing a nail image and outline extracted from the finger image shown in FIG. 54A.
FIG. 54C is a diagram explaining overlapping an outline of a first nail image with an outline of a nail section of the user.
FIG. 54D is a diagram showing an example of an adjusted nail image where the first nail image is reduced to match the outline of the nail section of the user.
FIG. 54E is a diagram showing an example in which the design shown in FIG. 54D is printed on the nail section of the user.

Specifically, as shown in FIG. 51, the photographing section 30 photographs the nail section T of the finger U of the user (step S194, see FIG. 54A) and the nail image G1 and the outline R1 are extracted from the photographed nail section (step S195, see FIG. 54B). The extracted nail image G1 and outline R1 are stored as the nail image and the outline of the second nail section in the RAM 53 (see FIG. 30) (step S196).

Then, the nail section printing processing of printing the first nail image which is to be printed on the second nail section (in other words, the nail section of the user) is performed.

Figure 52:
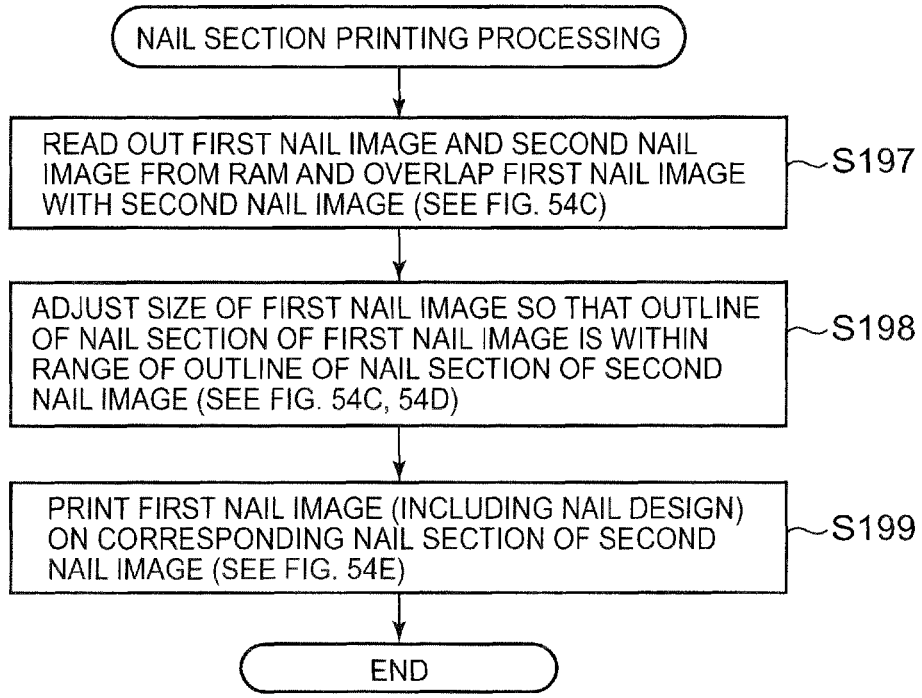
FIG. 52 is a flowchart of a nail section printing processing.

Specifically, as shown in FIG. 52, the first nail image (object to be printed) and the second nail image (image of the nail section of the user) are read out from the RAM 53 and overlapped (step S197, see FIG. 54C). When the selected finger image is an image of five fingers from the thumb to the little finger as shown in the right edge of FIG. 53, the first nail image (object to be printed) for each finger is overlapped with the image (second nail image) of the nail section of the user of the corresponding finger.

Next, the size of the first nail image is adjusted so that the outline of the nail section of the first nail image is within the range of the outline of the nail section of the second nail image (step S198, see FIG. 54C, FIG. 54D). Then, the print controlling section 515 which is the print controlling section controls the printing section 40 to print the first nail image Ga1 (including nail design) after adjustment or only the nail design D1 on the nail section (nail section corresponding to the second nail image) T of the finger U of the user (step S199, see FIG. 54E).

When the first nail images Ga1 to Ga4 (including nail design) or only the nail designs D1 to D4 are printed on the nail chip sheet (see FIG. 47) instead of the nail section (nail section corresponding to the second nail image) T of the user, after the size of the first nail image is adjusted, the first nail image is combined with the outline of the nail section of the user and the combined nail image is printed on the nail chip sheet. The printed combined nail image is cut from the nail chip sheet and the nail chip on which the nail design is printed can be made.

With such configuration, by preparing a plurality of finger images or nail images in advance, one of the nail images including the desired nail design can be selected freely from the images and can be printed on the nail section of the user or on the nail chip sheet (in a case of the nail chip sheet, a nail chip can be made), and therefore nail art can be enjoyed easily.

Moreover, the third embodiment illustrates (see FIG. 49) a memory card as the storage medium 9, however, the storage medium 9 is not limited to various memory cards as long as the image data can be transmitted to the nail print apparatus. For example, the storage medium 9 can be a USB memory. Moreover, the external device such as a digital camera can be directly connected to a nail print device with a USB cable, etc. and the image data can be transmitted to the nail print apparatus.

The present embodiment describes an example where the user cuts off each nail chip 70a to 70e after the nail chip sheet 7 is printed. However, as shown with dotted lines in FIG. 3, a configuration where a cutting section such as a cutter 5, etc. is provided near the print head 46, etc. is possible, and after the printing operation by the print head 46 is finished, the nail chip 70 can be automatically cut by the cutter 5 along the outline lines R1 to R5 of the nail section printed on the nail chip sheet 7. In this case, the controlling section 51 functions as a cutting controlling section to control the cutting section such as the cutter 5, etc. The position of providing the cutting section is not limited to the illustrated example.

The configuration can be set so that not all of the layers of the nail chip sheet 7 are cut by the cutter 5, and the layers of the nail chip sheet 7 are cut except for the peeling layer 73. In this case, after cutting, the user peels off the layers (printed layer 71, adhesive layer 72) cut by the cutter 5 from the peeling layer 73 and can remove the nail chip 70 from the nail chip sheet 7 in a state where the adhesive layer 72 is exposed.

As described above, when the nail chip 70 is automatically cut, the nail chip 70 can be formed easily and fast without troubling the user.

In the present embodiment, it is judged whether or not the outline of the nail section of the first nail image is within the range of the outline of the nail section of the second nail image, and the size of the first nail image is adjusted (step S157 to step S159, S198 of the nail section printing processing shown in FIG. 34, FIG. 52). However, the photographed or prepared first nail image (including nail design) or only the nail design can be printed on the nail section (nail section corresponding to the second nail image) T of the finger U of the user without performing the above judgment or size adjustment processing.

According to the present embodiment, a nail print apparatus (nail print apparatus 1 shown in FIG. 1, etc.) includes:

a first image obtaining section (photographing section 30 shown in FIG. 2, etc.) which obtains a finger image including a nail image (nail images Ga1 to Ga5 shown in FIG. 6, etc.) of a plurality of nail sections (nail section T shown in FIG. 18, etc.) of a first person;

a second image obtaining section (photographing section 30 shown in FIG. 2, etc.) which obtains a finger image including a nail image (nail images G1 to G5 shown in FIG. 6, etc.) of a plurality of nail sections (nail section T shown in FIG. 18, etc.) of a second person;

a finger type detecting section (finger type detecting section 511 shown in FIG. 5) which detects a type of each finger from the finger image of the plurality of fingers of the first person obtained by the first image obtaining section and the finger image of the plurality of fingers of the second person obtained by the second image obtaining section;

a storage controlling section (finger type detecting section 511 shown in FIG. 5) which stores the type of finger detected by the finger type detecting section corresponded with the nail image of the nail section obtained by the first image obtaining section and the second image obtaining section for each of the first person and the second person;

an adjusted nail image generating section (adjusted nail image generating section 513 shown in FIG. 5) which adjusts the nail image of the first person stored by the control of the storage controlling section to match the nail image of the corresponding finger of the second person to generate an adjusted nail image (nail images Ia1 to Ia5 shown in FIG. 6, etc.); and a print controlling section (print controlling section 515 shown in FIG. 5) which controls printing of the adjusted nail image generated by the adjusted nail image generating section on the nail section of the corresponding finger of the second person.

According to the present embodiment, a nail print apparatus (nail print apparatus 1 shown in FIG. 1, etc.) includes:

a first image obtaining section (photographing section 30 shown in FIG. 2, etc.) which obtains a nail image (nail images Ga1 to Ga5 shown in FIG. 6, etc.) of a nail section (nail section T shown in FIG. 18, etc.) of a first person;

a second image obtaining section (photographing section 30 shown in FIG. 2, etc.) which obtains a nail image (nail images G1 to G5 shown in FIG. 6, etc.) of a nail section (nail section T shown in FIG. 18, etc.) of a second person;

a storage controlling section (controlling section 51 shown in FIG. 5) which stores the nail image of the first person obtained by the first image obtaining section and the nail image of the second person obtained by the second image obtaining section for each of the first person and the second person;

an adjusted nail image generating section (adjusted nail image generating section 513 shown in FIG. 5) which adjusts the nail image of the first person stored by control of the storage controlling section to match the nail image of the second person to generate an adjusted nail image (nail images Ia1 to Ia5 shown in FIG. 6, etc.); and a print controlling section (print controlling section 515 shown in FIG. 5) which controls printing of the adjusted nail image generated by the adjusted nail image generating section on the nail section of the second person.

Preferably, the nail print apparatus (nail print apparatus 1 shown in FIG. 1, etc.) further includes, a nail outline extracting section (nail outline extracting section 512 shown in FIG. 5) which extracts an outline (outlines Ra1 to Ra5, R1 to R5 shown in FIG. 6, etc.) of each nail section from the nail image (nail images Ga1 to Ga5 shown in FIG. 6, etc.) of the nail section (nail section T shown in FIG. 18, etc.) of the first person and the nail image (nail images G1 to G5 shown in FIG. 6, etc.) of the nail section (nail section T shown in FIG. 18, etc.) of the second person, wherein the adjusted nail image generating section (adjusted nail image generating section 513 shown in FIG. 5) compares the outline of the nail section of the first person extracted by the nail outline extracting section with the outline of the nail section of the second person, and when size of the outline of the nail section of the first person is larger than size of the outline of the nail section of the second person, the entire size of the nail image of the first person is reduced so that the outline of the nail section of the first person is within the outline of the nail section of the second person to generate the adjusted nail image (nail images Ia1 to Ia5 shown in FIG. 6, etc.); and the print controlling section (print controlling section 515 shown in FIG. 5) controls the printing of the adjusted nail image of the first person where entire size is reduced by the adjusted nail image generating section on the nail section of the second person.

According to the present embodiment, a nail print apparatus (nail print apparatus 1 shown in FIG. 1, etc.) includes:

a first image obtaining section (photographing section 30 shown in FIG. 2, etc.) which obtains a finger image including a nail image (nail images Ga1 to Ga5 shown in FIG. 6, etc.) of a plurality of nail sections (nail section T shown in FIG. 18, etc.) of a first person;

a second image obtaining section (photographing section 30 shown in FIG. 2, etc.) which obtains a finger image including a nail image (nail images G1 to G5 shown in FIG. 6, etc.) of a plurality of nail sections (nail section T shown in FIG. 18, etc.) of a second person;

a finger type detecting section (finger type detecting section 511 shown in FIG. 5) which detects a type of each finger from the finger image of the plurality of fingers of the first person obtained by the first image obtaining section and the finger image of the plurality of fingers of the second person obtained by the second image obtaining section;

a storage controlling section (finger type detecting section 511 shown in FIG. 5) which stores the type of finger detected by the finger type detecting section corresponded with the nail image of the nail section obtained by the first image obtaining section and the second image obtaining section for each of the first person and the second person;

an adjusted nail image generating section (adjusted nail image generating section 513 shown in FIG. 5) which adjusts the nail image of the first person stored by control of the storage controlling section to match the nail image of the corresponding finger of the second person to generate an adjusted nail image (nail images Ia1 to Ia5 shown in FIG. 6, etc.);

a combined nail image generating section (combined nail image generating section 514 shown in FIG. 5) which combines the adjusted nail image generated by the adjusted nail image generating section with the outline of the nail section of the second person to generate a combined nail image; and a print controlling section (print controlling section 515 shown in FIG. 5) which controls the printing of the combined nail image generated by the combined nail image generating section on the nail chip sheet.

According to the present embodiment, a nail print apparatus (nail print apparatus 1 shown in FIG. 1, etc.) includes:

a first image obtaining section (photographing section 30 shown in FIG. 2, etc.) which obtains a nail image (nail images Ga1 to Ga5 shown in FIG. 6, etc.) of a nail section (nail section T shown in FIG. 18, etc.) of a first person;

a second image obtaining section (photographing section 30 shown in FIG. 2, etc.) which obtains a nail image (nail images G1 to G5 shown in FIG. 6, etc.) of a nail section (nail section T shown in FIG. 18, etc.) of a second person;

a storage controlling section (a controlling section 51 shown in FIG. 5) which stores the nail image of the first person obtained by the first image obtaining section and the nail image of the second person obtained by the second image obtaining section for each of the first person and the second person;

an adjusted nail image generating section (adjusted nail image generating section 513 shown in FIG. 5) which adjusts the nail image of the first person stored by control of the storage controlling section to match the nail image of the second person to generate an adjusted nail image (nail images Ia1 to Ia5 shown in FIG. 6, etc.);

a combined nail image generating section (combined nail image generating section 514 shown in FIG. 5) which combines the adjusted nail image generated by the adjusted nail image generating section with an outline of the nail section of the second person to generate a combined nail image; and a print controlling section which controls printing of the combined nail image generated by the combined nail image generating section on the nail chip sheet.

According to the present embodiment, a print controlling method includes:

a first image obtaining step which obtains a finger image including a nail image (nail images Ga1 to Ga5 shown in FIG. 6, etc.) of a plurality of nail sections (nail section T shown in FIG. 18, etc.) of a first person;

a second image obtaining step which obtains a finger image including a nail image (nail images G1 to G5 shown in FIG. 6, etc.) of a plurality of nail sections (nail section T shown in FIG. 18, etc.) of a second person;

a finger type detecting step which detects a type of each finger from the finger image of the plurality of fingers of the first person obtained by the first image obtaining step and the finger image of the plurality of fingers of the second person obtained by the second image obtaining step;

a storage controlling step which stores the type of finger detected by the finger type detecting section corresponded with the nail image of the nail section obtained by the first image obtaining step and the second image obtaining step for each of the first person and the second person;

an adjusted nail image generating step which adjusts the nail image of the first person stored by the control of the storage controlling section to match the nail image of the corresponding finger of the second person to generate an adjusted nail image (nail images Ia1 to Ia5 shown in FIG. 6, etc.); and a printing control step which controls printing of the adjusted nail image generated by the adjusted nail image generating section on the nail section of the corresponding finger of the second person.

According to the present embodiment, a nail print apparatus (nail print apparatus 1 shown in FIG. 1, etc.) includes:

an image storage section (RAM 531 shown in FIG. 6) which stores a finger image including nail image (nail image Ga2 shown in FIG. 6, etc.) of a first nail section (nail section T shown in FIG. 18, etc.);

an image obtaining section (photographing section 30 shown in FIG. 2, etc.) which obtains a finger image including a nail image (nail images G1 to G5 shown in FIG. 6, etc.) of a second nail section (nail section T shown in FIG. 18, etc.); and a print controlling section (print controlling section 515) which overlaps the first finger image stored in the image storage section with the second finger image obtained by the image obtaining section to control printing of the first image (nail images Ia1 to Ia5) on the second nail section corresponding to the second finger image obtained by the image obtaining section.

According to the present embodiment, a print controlling method used in a nail print apparatus including an image storage section (RAM shown in FIG. 2, etc.) which stores a finger image including nail image (nail image Ga2 shown in FIG. 6, etc.) of a first nail section (nail section T shown in FIG. 18, etc.); the method includes:

an image obtaining step (photographing section 30 shown in FIG. 2, etc.) which obtains a finger image including a nail image (nail images G1 to G5 shown in FIG. 6, etc.) of a second nail section (nail section T shown in FIG. 18, etc.); and a print controlling step (print controlling section 515 shown in FIG. 5) which overlaps the first finger image stored in the image storage section with the second finger image obtained by the image obtaining step to control printing of the first image (nail images Ia1 to Ia5) on the second nail section corresponding to the second finger image obtained by the image obtaining section.

The embodiments of the present invention are described above, however, the invention is not limited to the above embodiments and can be suitably modified without leaving the scope of the invention.

For example, the above described embodiment describes the plurality of fingers are to be the target finger U and the plurality of fingers are inserted at once in the nail print apparatus 1 and photographing and printing is performed, however, the photographing and the printing of the target finger U can be performed one finger at a time.

When the nail print apparatus is configured so that the target finger U is photographed and printed one finger at a time, the apparatus can be made smaller and lighter.

The present embodiment describes the finger holding member 6 is inserted in the first finger inserting section 20a in a state where the target finger U is inserted in the finger holding member 6, however, the finger holding member 6 is not a necessary component of the present invention, and the target finger U can be directly inserted in the first finger inserting section 20a and photographed and printed.

The present embodiment describes in the nail printer apparatus 1, both the nail printing processing which directly prints on the nail section T of the user and the sheet printing processing which prints on the nail chip sheet 7 can be selected as the printing mode. However, the nail printer apparatus 1 can be an exclusive device for only nail printing processing which directly prints on the nail section T of the user or an exclusive device for only sheet printing processing which prints on the nail chip sheet 7.

When the nail printer apparatus 1 is an exclusive device which performs only nail printing processing, there is no need to provide a sheet positioning section 65 on the back face of the finger holding member 6.

According to the present embodiment, a sheet positioning section 65 is provided on both the finger holding member 6a for four fingers and the finger holding member 6b for thumb, however, the sheet positioning section 65 can be provided on either one of the finger holding member 6a for four fingers or the finger holding member 6b for thumb.

For example, by changing the depth of the sheet positioning section 65 between the finger holding member 6a for four fingers and the finger holding member 6b for thumb, nail chip sheet 7 of various thicknesses can be used, such as, using a thin nail chip sheet 7, or a thick nail chip sheet 7 provided with rhinestones, etc. on the sheet.

In the second embodiment, the digital camera 100 is illustrated as the section which obtains the finger image of the other person. However, the section is not limited to the digital camera 100 and the section which obtains the finger image of the other person can be any device which can store the storage medium 9 of the finger image of the other person. For example, a cellular phone, etc. can be used.

The entire disclosure of Japanese Patent Application No. 2010-247091 filed on Nov. 4, 2010 and Japanese Patent Application No. 2010-291771 filed on Dec. 28, 2010 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A nail print apparatus comprising:
a first image obtaining section which obtains a finger image including a nail image of a plurality of nail sections of a first person;
a second image obtaining section which obtains a finger image including a nail image of a plurality of nail sections of a second person;
a finger type detecting section which detects a type of each finger from the finger image of the plurality of fingers of the first person obtained by the first image obtaining section and the finger image of the plurality of fingers of the second person obtained by the second image obtaining section;
a storage controlling section which stores the type of finger detected by the finger type detecting section corresponded with the nail image of the nail section obtained by the first image obtaining section and the second image obtaining section for each of the first person and the second person;
an adjusted nail image generating section which adjusts the nail image of the first person stored by the control of the storage controlling section to match the nail image of the corresponding finger of the second person to generate an adjusted nail image; and
a print controlling section which controls printing of the adjusted nail image generated by the adjusted nail image generating section on the nail section of the corresponding finger of the second person.

2. The nail print apparatus according to claim 1, further comprising,
a nail outline extracting section which extracts an outline of each nail section from the nail image of the nail section of the first person and the nail image of the nail section of the second person,
wherein the adjusted nail image generating section compares the outline of the nail section of the first person extracted by the nail outline extracting section with the outline of the nail section of the second person, and when size of the outline of the nail section of the first person is larger than size of the outline of the nail section of the second person, the entire size of the nail image of the first person is reduced so that the outline of the nail section of the first person is within the outline of the nail section of the second person to generate the adjusted nail image; and
the print controlling section controls the printing of the adjusted nail image of the first person where entire size is reduced by the adjusted nail image generating section on the nail section of the second person.

3. A nail print apparatus comprising:
a first image obtaining section which obtains a finger image including a nail image of a plurality of nail sections of a first person;
a second image obtaining section which obtains a finger image including a nail image of a plurality of nail sections of a second person;
a finger type detecting section which detects a type of each finger from the finger image of the plurality of fingers of the first person obtained by the first image obtaining section and the finger image of the plurality of fingers of the second person obtained by the second image obtaining section;
a storage controlling section which stores the type of finger detected by the finger type detecting section corresponded with the nail image of the nail section obtained by the first image obtaining section and the second image obtaining section for each of the first person and the second person;
an adjusted nail image generating section which adjusts the nail image of the first person stored by control of the storage controlling section to match the nail image of the corresponding finger of the second person to generate an adjusted nail image;
a combined nail image generating section which combines the adjusted nail image generated by the adjusted nail image generating section with the outline of the nail section of the second person to generate a combined nail image; and
a print controlling section which controls the printing of the combined nail image generated by the combined nail image generating section on a nail chip sheet.

4. A print controlling method comprising:
a first image obtaining step which obtains a finger image including a nail image of a plurality of nail sections of a first person;
a second image obtaining step which obtains a finger image including a nail image of a plurality of nail sections of a second person;
a finger type detecting step which detects a type of each finger from the finger image of the plurality of fingers of the first person obtained by the first image obtaining step and the finger image of the plurality of fingers of the second person obtained by the second image obtaining step;

a storage controlling step which stores the type of finger detected by the finger type detecting section corresponded with the nail image of the nail section obtained by the first image obtaining step and the second image obtaining step for each of the first person and the second person;

an adjusted nail image generating step which adjusts the nail image of the first person stored by the control of the storage controlling section to match the nail image of the corresponding finger of the second person to generate an adjusted nail image; and a printing control step which controls printing of the adjusted nail image generated by the adjusted nail image generating section on the nail section of the corresponding finger of the second person.

* * * * *